United States Patent [19]
Calfo et al.

[11] Patent Number: 4,720,898
[45] Date of Patent: Jan. 26, 1988

[54] REPLACEMENT OF SPLIT PINS IN GUIDE TUBES

[75] Inventors: Raymond M. Calfo, Braddock Hills; Raymond P. Castner, Monroeville; George F. Dailey, Plum Borough, all of Pa.

[73] Assignee: Westinghouse Electric Corp., Pittsburgh, Pa.

[21] Appl. No.: 817,857

[22] Filed: Jun. 6, 1984

[51] Int. Cl.[4] .............................................. B23P 6/00
[52] U.S. Cl. .................................... 29/33 K; 29/705; 29/707; 29/717; 29/723; 376/260
[58] Field of Search ...................... 376/260, 353, 463; 29/33 K, 50, 565, 705, 706, 707, 708, 710, 711, 712, 720, 721, 723, 564.1; 408/11, 16

[56] References Cited

U.S. PATENT DOCUMENTS

| | | | |
|---|---|---|---|
| 3,213,528 | 10/1965 | O'Donnell et al. | 29/712 |
| 4,265,011 | 5/1981 | Lebouc | 29/720 |
| 4,526,311 | 7/1985 | Schroder | 29/400 N |
| 4,585,613 | 4/1986 | Styskal et al. | 376/260 |

OTHER PUBLICATIONS

"Dealing with Control Rod Guide Tube Support Pin Cracking in French PWRs", by Laurent Guicherd, *Nuclear Engineering International*, Nov. 1984, pp. 29–33.

*Primary Examiner*—Gil Weidenfeld
*Assistant Examiner*—Daniel W. Howell
*Attorney, Agent, or Firm*—H. Diamond

[57] ABSTRACT

The guide tube is disconnected and removed from the upper internals of the reactor to a work station in a pool of borated water. The work station includes a clamp-and-index tool, a metal-disintegration-machining (MDM) tool, pick-and-put tool, a brush tool, a nut hopper, a pin-insertion/torque tool, and a crimping tool. These tools are hydraulically operable. The clamp-and-index tool positions and, by repeated centering maintains the guide tube in precise position for removal and replacement of its split pins, the MDM burns through an old pin-and-nut assembly severing it into readily removeable fragments. This pin fragment is removed by an expeller on the clamp-and-index tool. This pick-and-put tool removes the burned nut fragment and replaces it with the new nut. The pin-insertion/torque tool inserts the new pin and torques the new nut onto the new pin. The crimping tool crimps a locking cap secured to the nut onto the pin. The tools are controlled from a command center external to the pool.

20 Claims, 122 Drawing Figures

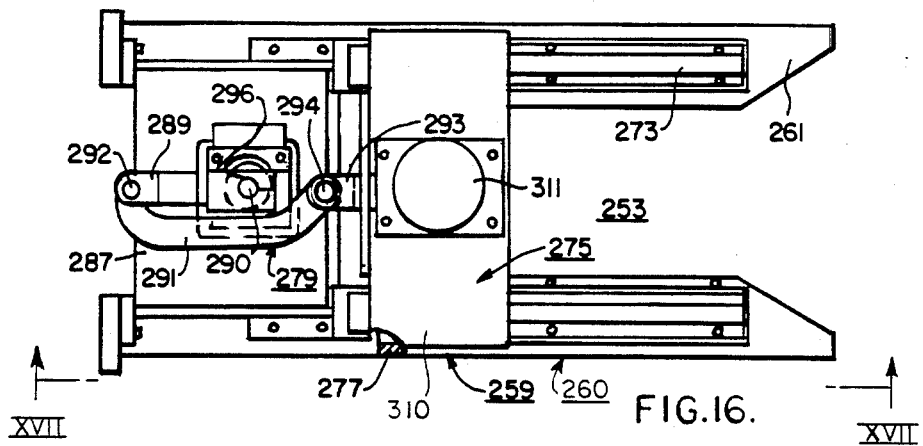
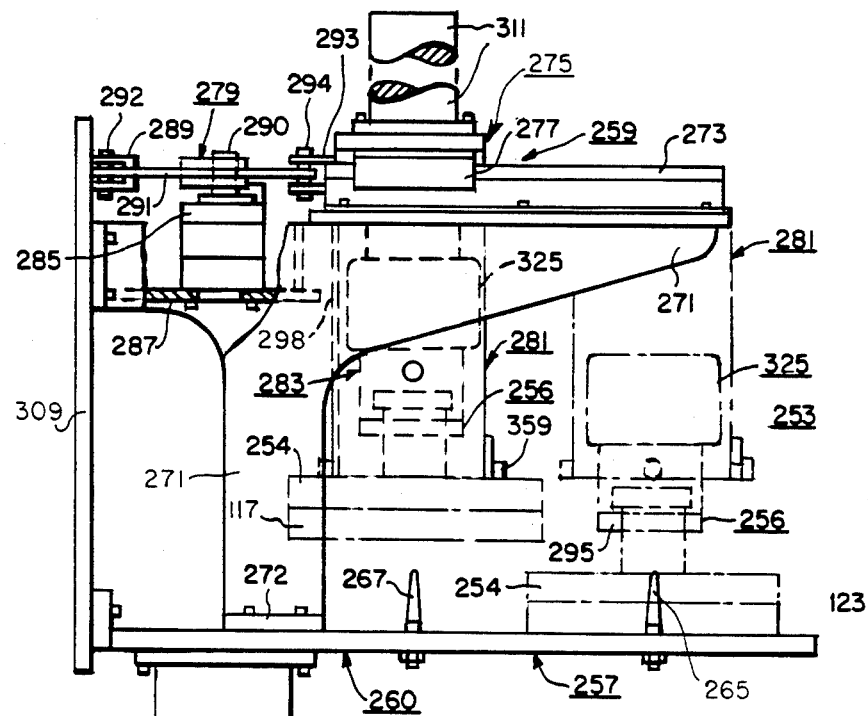
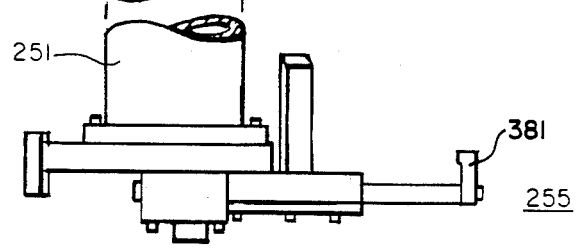

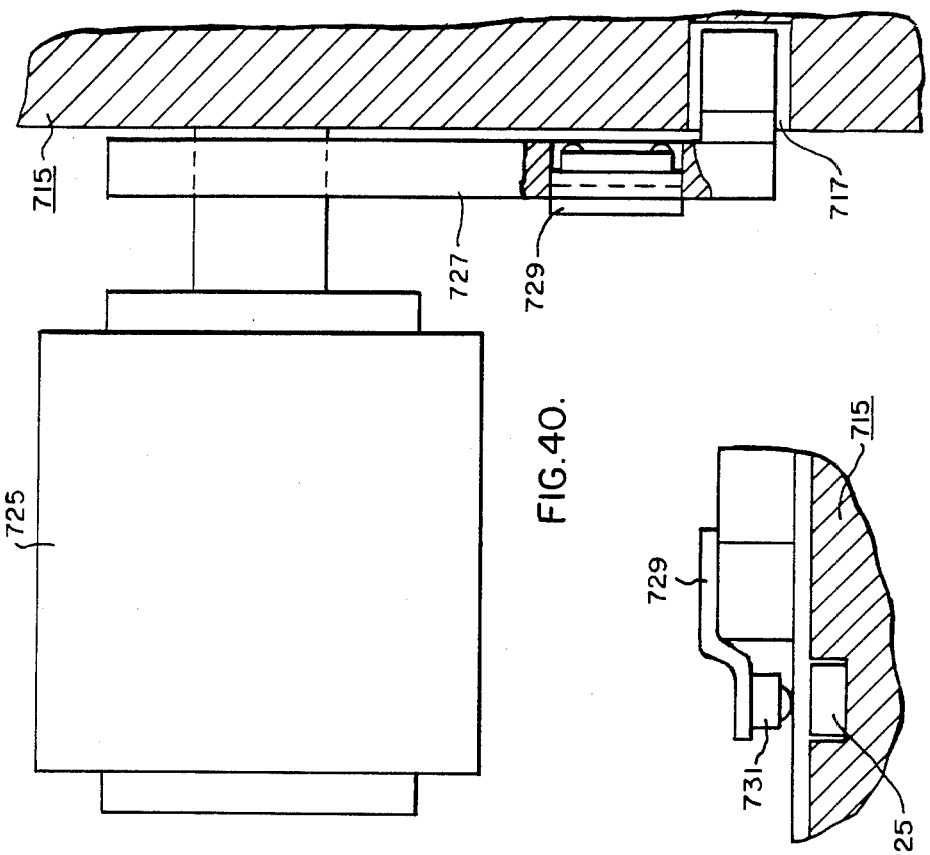
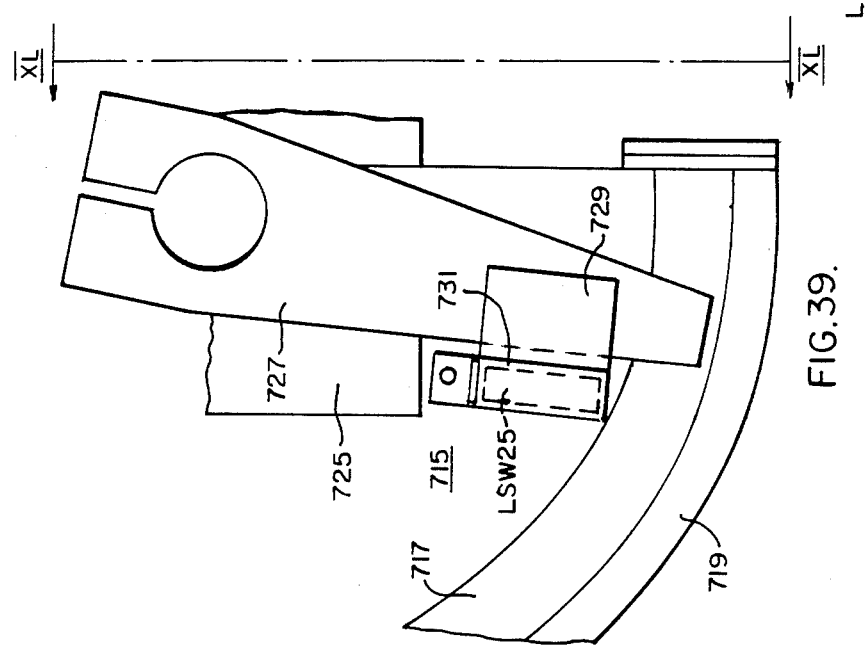

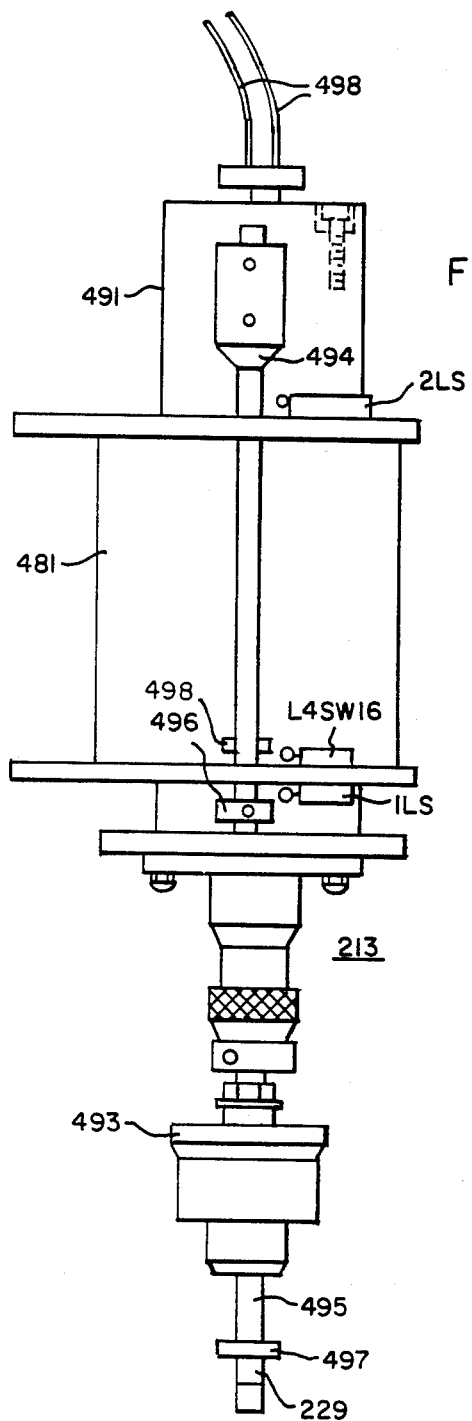
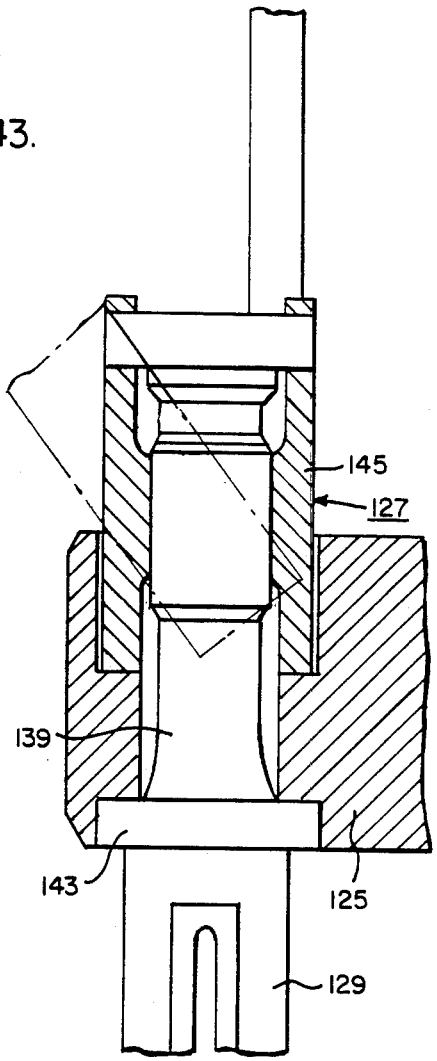
FIG. 43.
FIG. 46.

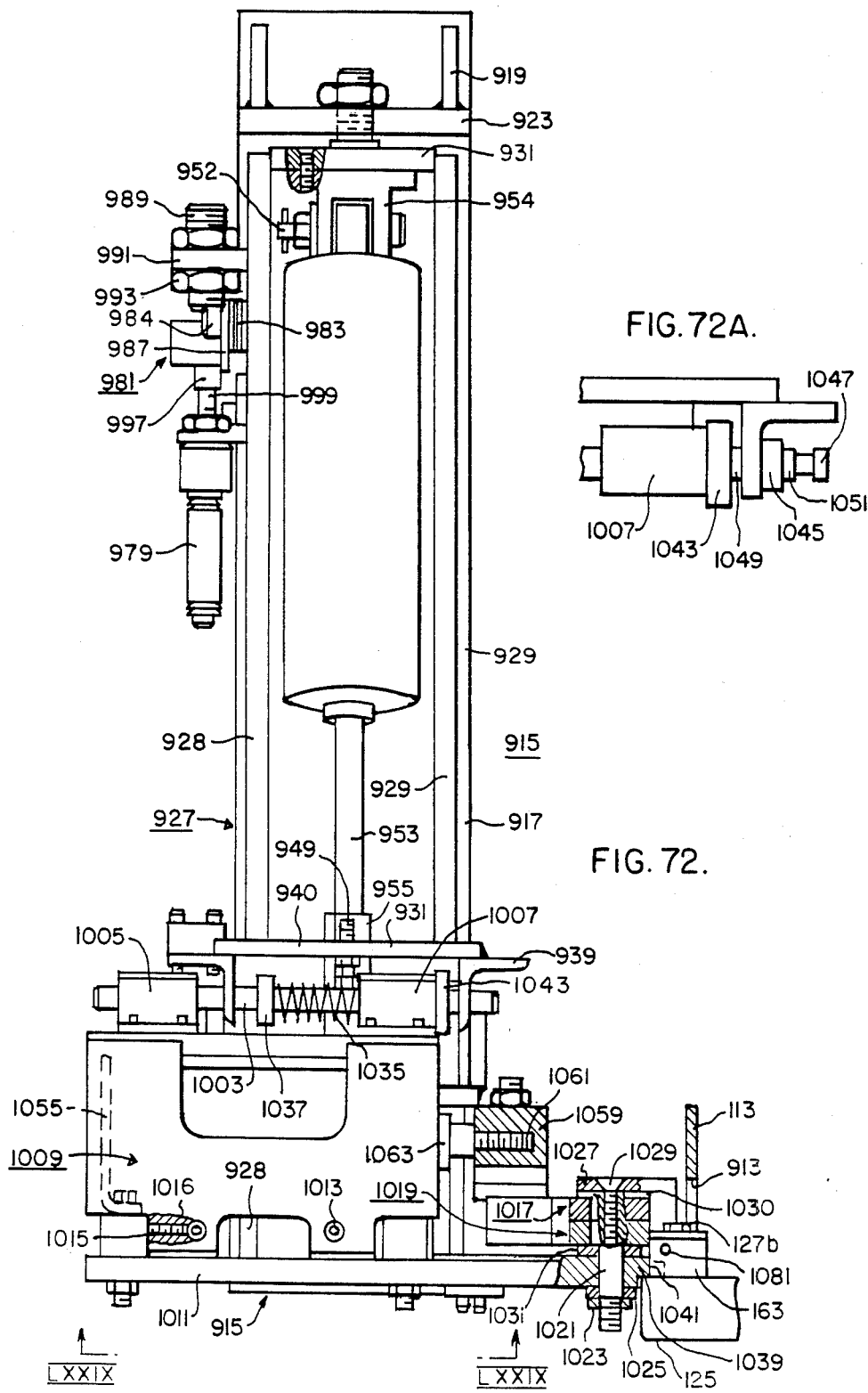

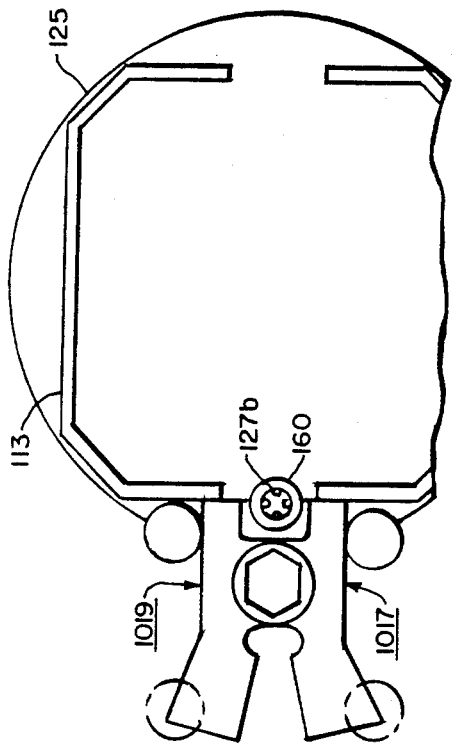
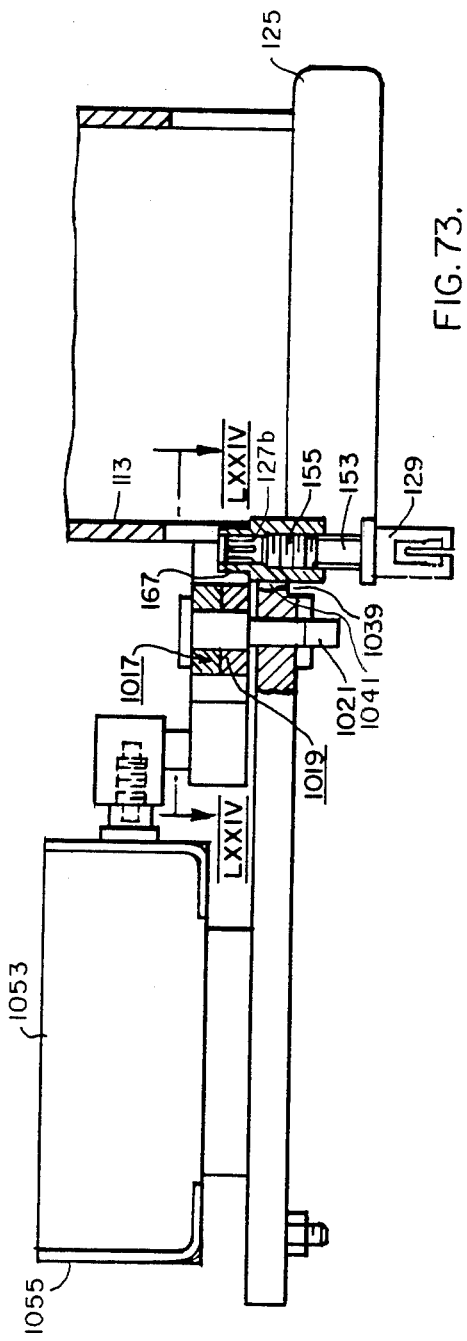

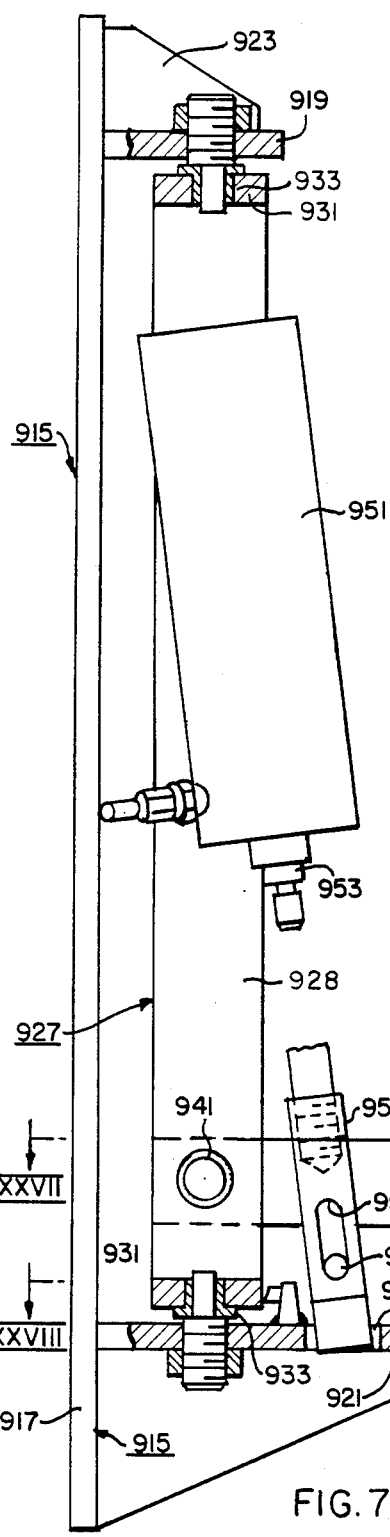
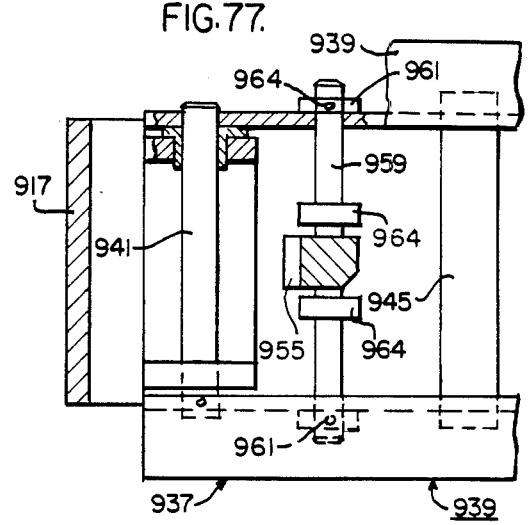
FIG.77.
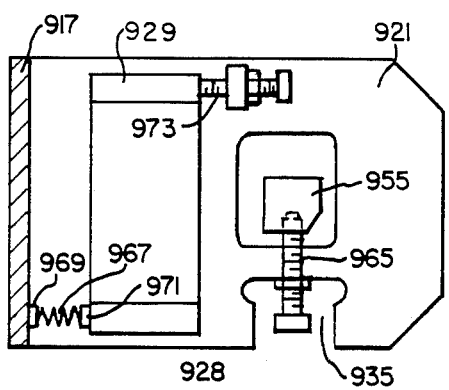
FIG.78.
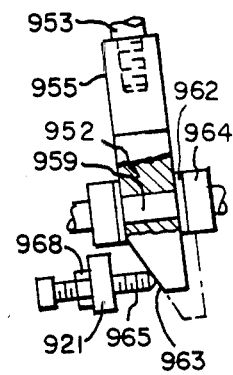
FIG.76.
FIG.75.

REPLACEMENT OF SPLIT PINS IN GUIDE TUBES

CROSS-REFERENCE TO RELATED APPLICATIONS

The following applications, filed concurrently herewith and all assigned to Westinghouse Electric Corporation are incorporated herein by reference:

Application Ser. No. 576,645, filed Feb. 3, 1984 to John L. Land, Ronald J. Hopkins, and Jose M. Morting for Replacement Support Pin for Guide Tubes for Operating Plants (herein Laud).

Application Ser. No. 617,852 filed to Lorraine Fucich, Bruce Spoffard, David Howell, John Nee, Richard A. Green for "Replacement of Split-Pin Assemblies in Guide Tubes".

U.S. Pat. No. 4,577,361 granted Mar. 25, 1986 to Leonard P. Hornak for "Brush Tool".

U.S. Pat. No. 4,624,042 granted to Richard A. Green for "Clamp and Index Tool" on Nov. 25, 1986.

Application Ser. No. 617,856 filed to D. C. Burns, Charles Kauric, Joseph E. Perfong, L. R. Golick for "Metal Disintegrated Machining Tool".

Application Ser. No. 617,854 filed to Richard A. Green and John D. Nee for "Removal of Old Split-Pin Assembly Fragments and Installation of New Split-Pin Assembly".

U.S. Pat. No. 4,627,142 granted to Leonard P. Hornak for "Crimper Tool" on Dec. 9, 1986.

BACKGROUND OF THE INVENTION

This invention relates to nuclear reactors and it has particular relationship to the repair of guide tubes of a nuclear reactor. The guide tube is part of the upper internals of a nuclear reactor. A guide tube is mounted above a fuel assembly of the core of the reactor and it serves to guide the control-rod cluster of an assembly and the control-rod drive as the cluster is displaced upwardly or downwardly with reference to the core. Each guide tube is made up of an upper section sometimes called "thermal sleeve" and a lower section called a lower guide tube and is positioned by, and held transversely to, the upper core plate of the reactor. Typically, a pair of bifurcated or split pins are suspended, spaced 180°, from the lower end of the guide tube. Each split pin is held by a nut which is locked to an upper counterbore in the flange of the lower guide tube plate. The split pin has a flange which engages the lower counterbore of the flange of the lower guide tube. The diameter of the flange of the split pin is slightly smaller (typically 0.0006 inch) than the diameter of the counterbore. The flange is forced into the counterbore by tightening up on the nut which engages the split pin. The tines or leaves of the pins resiliently engage walls of corresponding holes in the upper core plate of the reactor positioning the guide tube to receive the control-rod cluster as the control-rod cluster is moved upwardly or downwardly. The coolant of the reactor which bathes the pins is corrosive with respect to the pin material. It has been found that as a result of stress-corrosion cracking of a split pin, the hold-down nut for the pin may be released. Under the action of the coolant, the released nut may migrate through the upper internals into the piping and steam generator of the nuclear-reactor power plant and may damage the piping or the generator. In operation of a reactor, repair of a steam generator was required following discovery that a split-pin nut had migrated into the channel head of the steam generator.

The presence of cracks in split pins which may lead to failure can be determined by ultrasonic testing. Discovery of a crack in a split pin would indicate that corrective action be taken not only with respect to the guide tube involved but with respect to all guide tubes, typically about 60, in the reactor. The ultrasonic test is difficult to perform and has not proven itself entirely reliable. Corrective action is taken as to all guide tubes of a reactor if a nut is discovered in the channel head of a steam generator or in other parts of the reactor power plant. There are also reactors as to which it is anticipated that the split-pin nuts may fail. Corrective action is taken as to all guide tubes of such suspected reactors.

In accordance with the teachings of the prior art, it has been the practice, implemented in July and August of 1982, to replace the guide tubes as a whole. This practice has the disadvantage that the cost of replacement is high particularly in light of the fact that the guide tubes are composed of stainless steel and the pins of Inconel alloy and the cost of, and time consumed in, fabricating the guide tubes is high and new guide tubes are not readily available. A guide tube may cost as much as $80,000.00. A more important drawback is that the guide tubes are highly radioactive and disposal of so massive radioactive objects presents serious problems.

Another prior art practice which was developed and used in Japan in late 1978 and later, in early 1979, in France, is to replace only the split pins in a "hot" cell environment with non-robotic devices. This practice was further developed in France in late 1982 and early 1983. The old split pin is welded to the old nut. Typically the nut is composed of type AISI 304 stainless steel. The "hot" cell practice has the advantage that in a "hot" cell the new split pin can be welded to the nut. This practice has the drawback that it demands high personnel radiation exposure for long time intervals and is necessarily highly labor intensive and highly costly. The radiation levels may be as high as 1,000 REM per hour. An expedient which has been adopted is to decontaminate the whole guide tube but this is costly.

It is an object of this invention to overcome the disadvantages and drawbacks of the prior art and to provide apparatus and a method for correcting for the failure or potential failure of the split pins of the guide tubes of a nuclear reactor.

SUMMARY OF THE INVENTION

In accordance with this invention, the old split pins of a guide tube are replaced by new split pins without treatment of the guide tube. Each split pin and nut which holds it is sometimes referred to as a "split-pin assembly" in this application, the old split pin and old nut being referred to as an "old" assembly and the new split pin and new nut being referred to as a "new" assembly. The lower guide tube is, in the practice of this invention, separated from the upper section and is mounted in a robotic work station submerged in a pool of water. Typically the water is borated to protect against radioactivity. The work station has a plurality of tools for carrying out the replacement of each split pin. The work station is controlled from a command center external to the pool and not contaminated by the radioactivity of the guide tubes or the split pins. Exposure of personnel is precluded.

The tools in the work station include a clamp-and-index tool, a metal-disintegration-machining tool (MDM), a pick-and-put tool, a brush tool, a pin insertion/torque tool and a crimping tool. There is also a nut hopper which supplies new nuts, a trash chute and a television camera for closed-circuit television. A guide tube (sometimes referred to as "lower guide tube (LGT)" to be processed is disconnected from the top support plate of the upper internals and from the thermal sleeve (sometimes referred to as "upper guide tube" or upper section), which extends above the lower guide tube, and is mounted rotatably on the clamp-and-index tool. The clamp-and-index tool clamps the guide tube with one of its split pins in precise position to be removed and replaced. Once the guide tube is properly positioned by the clamp-and-index tool, the MDM burns away the nut severing the nut and pin assembly into fragments including predominantly a nut fragment and a pin fragment. The clamp-and-index tool carries a pin puller and expeller at its lower end. The pin puller and expeller has a collet which engages and exerts a pulling force on the old pin below the lower counterbore before and during the MDM burning operation. The pin fragment, freed from the nut fragment by the burning, is pulled out of the counterbore by the pin puller and expeller. The expeller is a plunger which moves upwardly expelling the pin, after it is pulled out of the counterbore, into the trash chute. If there is no pin in the guide tube, as sometimes happens at the start of replacement process and happens several times during the process, the expeller moves upwardly and centers the guide tube. The pick-and-put tool removes the remnants of the burned-away nut and deposits them in the trash chute.

Next, the guide tube is conditioned for processing by the brush tool. The brush tool thoroughly cleans the upper counterbore in the lower guide-tube flange where the nut is seated and the lower counterbore where the flange of the split pin is seated. The brush tool has an upper brush for cleaning the upper counterbore and a lower brush for cleaning the lower counterbore.

Now the pick-and-put tool transfers the new nut from the nut hopper to the upper counterbore and positions the nut to be threaded onto the split pin. The new split pin is now positioned in the lower counterbore. The new split pin is screwed into the end of a long-handled tool and lowered into a loading tube of the pin insertion/torque tool in the work station with its tines downwardly. The loading tube has a funnel to guide the long-handled tool. At the end of the funnel, there is a vertical plate or blade which is straddled by the tines and permits the pin to be transferred from the long-handled tool to the loading tube.

The pin-insertion torque tool places the new pin directly under the lower counterbore in position to be secured by the nut which is derived from the nut hopper. Torque is now applied to the nut by the pin-insertion/torque tool to thread the nut onto the new split pin. The pin is pushed upwardly from the bottom to engage the nut. Low torque is applied to thread the nut onto the pin until the nut seats on the base of the upper counterbore. Then precisely-controlled high torque is applied to pull the flange of the pin into the lower counterbore and to lock the nut to the base of the upper counterbore. The turns of the wrench of the pin-insertion/torque tool at low torque are counted to take precautions against the wrench locking on a thread.

Finally, the crimping tool crimps the locking cup securing the split pin to the nut. The crimping is necessary because stainless steel, particularly type 304, cannot be welded underwater so that the welded channel-pin structure of the old split-pin assembly cannot be adapted.

The above-described tools include electromechanical reed limit switches and magnetically operable Hall-effect proximity switches. These switches serve as sensors to provide intelligence as to the state of operation of the corresponding components of the tools.

The tools perform their operations in a predetermined sequence. Each tool operation consists of a plurality of sub-operations or sub-routines performed step-by-step in a predetermined sequence. The performance of the complete replacement of the split-pins assemblies in a guide tube automatically throughout, following an initiating operation, is within the scope of this invention. In this case, each tool would in its turn perform its sub-operations in the predetermined sequence on a signal from a sensor that the operation of a prior tool in the sequence had been completed. However, in view of the fact that the replacement of the split pin-assemblies is highly complicated and is performed deep in a pool of water where mishaps and maloperation could occur for many obscure reasons, it is preferred that each tool operation be enabled manually and that once enabled the sub-operations of each tool should proceed automatically. All operations are carefully monitored by the closed-circuit TV and the practice of enabling each tool operation manually affords a ready facility to the operating personnel for performing their tasks successfully.

The command center serves to control the tools. The command center includes the following functional components which may be physically separate or combined:
1. Robotic control center
2. Operators control panel
3. Operations display
4. Manual control panel
5. Input diagnostic control interface
6. Hydraulic solenoid unit which is supplied by a hydraulic pump
7. MDM control console and panel The robotic control center operates as the brains of the apparatus. It includes a computer which is programmed to command the carrying out of the various tool operations, input modules through which inputs from the sensors are impressed on the computer and output modules through which the computer commands are transmitted. The components of the operators control panel and of the operations display are located on the front panel of the robotic control center. The operator control panel includes selector switches and pushbuttons for setting the operation of the tools. The operations display includes a signal lamp or light for each position of the components of the various tools. The lamps are mounted in an array corresponding to the sequencing operating mode for each sub-operation of each tool. By observing the display, the operating personnel can determine the exact status of the components of each tool as each tool progresses through its sub-operations. The cathode-ray tube of the closed circuit TV is within the cabinet of the robotic control center and is used only when close observation of the work station is necessary.

The manual control panel provides full manual control of the tool operations and of the sub-operations of which each consists. With the manual control the operator can check the operation of the tools and of the other components of the apparatus including the hydraulic solenoids.

The input diagnostic interface panel provides the operating personnel with the option of bypassing the feedback position sensors. The bypassing is effected by operation of a pushbutton on the operators control panel. This facility is necessary because it has been found that a sensor may fail to function during a sequence of operations and may function during a subsequent sequence. A sensor may also stick in operating setting. For such a contingency, a switch is provided for opening each sensor circuit.

The hydraulic solenoid unit contains hydraulic pressure manifolds, flow regulators, solenoid and pressure sensors. The solenoid valves follow commands from the robotic control center to control the tool motion drives which are fluid driven pistons in hydraulic cylinders. Each valve is connected to the corresponding drive through hydraulic hoses. The solenoid unit has pressure switches which signal the positions of the tool-motion drives. Some of these switches served as backup sensors for the limit-switch sensors, others serve as the only sensors for sub-operations.

In the use of the apparatus, the lower guide tube is mounted in the work station with an old split-pin assembly in position to be replaced. The operator sets a selector switch on the operator control panel for the successive tool operations. The intelligence for each setting is impressed on the computer in the robotic control center. The computer then commands each selected tool in its turn to carry out the sub-operations of the set operation. The commands are transmitted through the control components of the robotic control center to the hydraulic control unit whose valves operate in accordance with the commands. The operation of each valve causes a tool to carry out a sub-operation as commanded. On the completion of each sub-operation a sensor, a limit switch and/or a pressure switch, is actuated and transmits intelligence of the completion of the sub-operation to the computer. The computer then commands the performance of the next sub-operation in the sequence or the signalling of the completion of the tool operation as the case may be. The computer also signals that a sensor has failed to operate if this happens. In this case, the operator may bypass the sensor by operating a switch on the diagnostic interface panel or, if the sensor has stuck, by operating a switch to open the sensor circuit.

The pin-insertion/torque tool has an untorque feature which is commanded to come into play by the computer when it is necessary to remove a new split pin and new nut on the occurrence of a maloperation. Among the maloperations which may occur are the following:
1. The split pin installed in the guide-tube flange may be oversized particularly in its leaf or tines dimension.
2. The locking cup which locks the new split pin to the new nut may be torn or damaged.
3. Excessive high torque may be applied to the new nut because of equipment failure; for example, failure of the pressure regulator or improper pressure settings by error of an operator.

In the untorque operation, the nut is unscrewed from the pin. Since the nut is being held down while it is being unscrewed, as it is in the torque operation, the pin is forced out of the lower counterbore and is deposited in the trash chute. Once released, the nut is also deposited in the trash chute.

The normal automatic stepping of sub-operations or subroutines which takes place for each tool in the replacement of an old split-pin assembly is herein referred to as a "positive sequence". Each tool is also capable of reversing the stepping of its sub-operations to undo a tool operation. Such a reverse stepping is herein referred to as a "negative sequence". The negative sequence can only be carried out in the "step mode", i.e., manually, step by step backwards. This feature is important because it is desirable that the operator be assured by confirmation signal that a reverse step has been completed before proceeding to the next reverse step.

The necessity of a negative sequence arises on the occurrence of a maloperation. In this case, the stepping in the positive sequence stops and the computer usually indicates a problem or that a light is not turned on. Among the maloperations which may occur are the following:
1. A sensor may fail; for example, the sensor may fail to operate or the corresponding light on the operator's panel may fail to confirm functioning of a sensor.
2. Mechanical jamming may occur; i.e., the appropriate limit switch may fail to operate because motion of a part of a tool is not completed. Typically, a slide on the clamp-and-index tool may stick.
3. A hydraulic fault may occur; for example, the absence of pressure may preclude complete motion of a part of a tool.

For maloperation 1, the operating personnel can verify, either visually or by closed TV, if the mechanical action is satisfactory. If the mechanical action is satisfactory, the sensor may then be bypassed or, if a sensor has stuck, the sensor circuit may be opened, and the sub-operation may continue. If the mechanical action is unsatisfactory, the negative sequence may be enabled. For maloperation 2, the operating personnel can determine visually or by closed TV if there is mechanical interference such as the sticking of a slide. If there is, the negative sequence is enabled. When the sub-operation is reset in the "home" position, the positive sequence is reinitiated. If the sub-operation is now carried out normally, no further action need be taken; if not, repair may be necessary. For maloperation 3, the absence of confirmation of functioning of a sensor, halts the apparatus in a safe setting so that the fault can be cleared. The negative sequence may now be enabled to back the tool to the "home" position. The repairs can then be made and the sub-operation in the positive sequence reinitiated.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 16 is a plan view of the clamp-and-index tool taken in the direction XVI—XVI of FIG. 13;

FIG. 17 is a view in side elevation, with a part broken away of the upper level of the clamp-and-index tool taken in the direction XVII—XVII of FIG. 16;

FIG. 39 is a fragmental plan view showing the limit switch involving the nut hopper;

FIG. 40 is a fragmental view in side elevation taken in direction XL—XL of FIG. 39;

FIG. 41 is a view in side elevation and partly in section of the limit switch taken in the direction XLI—XLI of FIG. 39;

FIG. 43 is a diagrammatic view showing the principle components of the MDM;

FIG. 46 (Sheet 27) is a view in longitudinal section partly diagrammatic showing the manner in which the shank of the pin is burned through by the MDM;

FIG. 72 is a view in side elevation taken in the direction LXXII—LXXII of FIG. 71;

FIG. 72A is a fragmental plan view showing an adjusting structure for the crimping mechanism;

FIG. 73 (Sheet 47) is a fragmental view in side elevation of the part of the crimper tool which performs the crimper operation;

FIG. 74 is a view in transverse section taken along line LXXIV—LXXIV of FIG. 73;

FIG. 75 is a fragmental view in front elevation of the support for the crimper tool in the retracted position;

FIG. 76 is a fragmental view in side elevation taken in the direction LXXVI—LXXVI of FIG. 75 showing the camming action which advances the crimping head of the crimper horizontally;

FIG. 77 is a fragmental view in transverse section taken along line LXXVII—LXXVII of FIG. 75;

FIG. 78 is a fragmental view in transverse section taken along line LXXVIII—LXXVIII of FIG. 75;

DETAILED DESCRIPTION OF EMBODIMENT AND PRACTICE OF INVENTION

Figure 1:
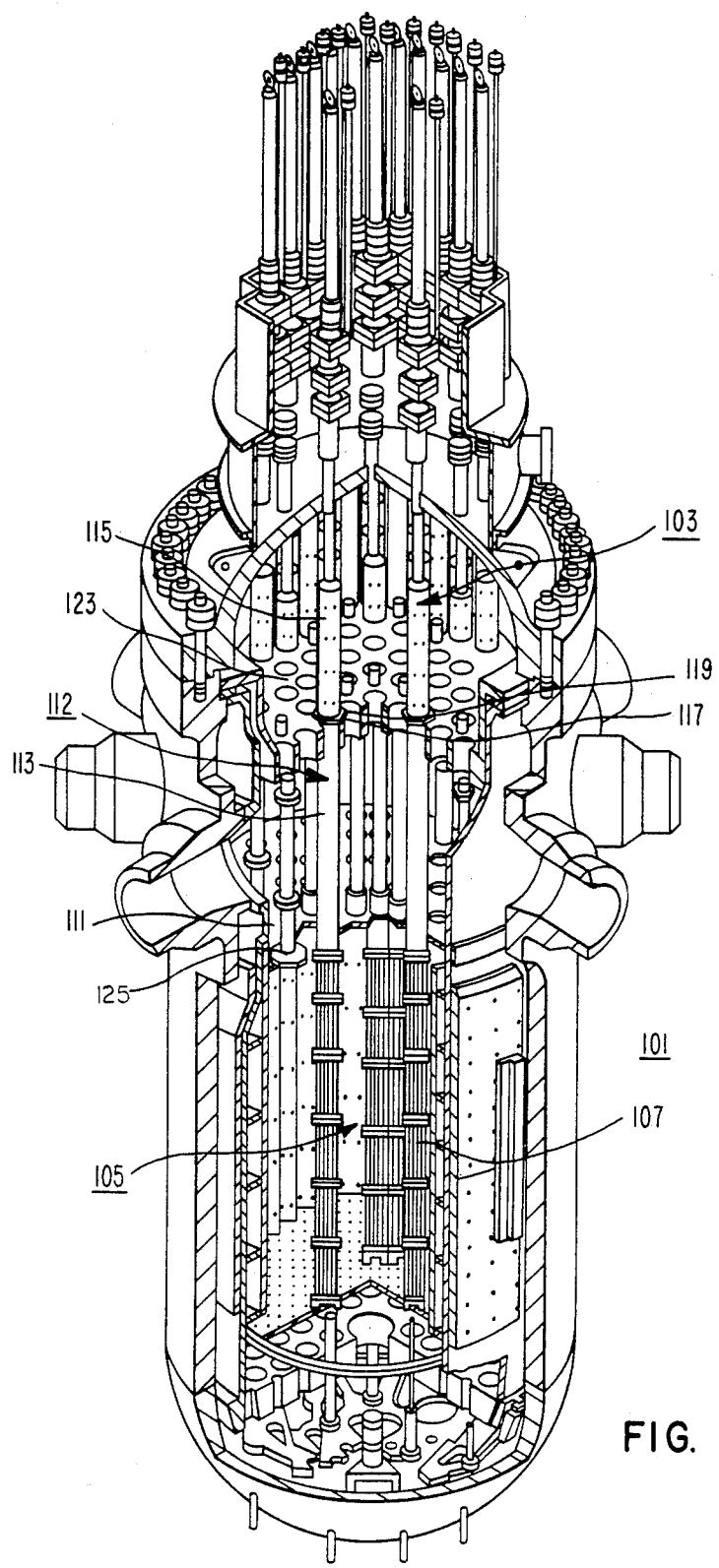
FIG. 1 is a view in isometric of a nuclear reactor having guide tubes whose split pins are replaced in the practice of this invention, the reactor being shown with a part of the pressure vessel broken away and the head removed.
Figure 1A:
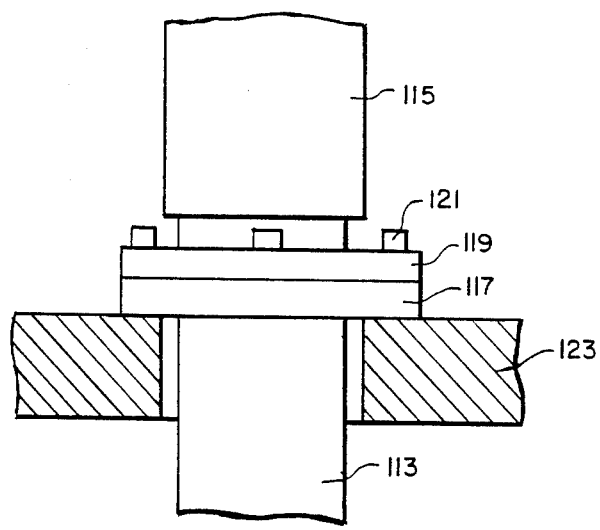
FIG. 1A is a fragmental view in side elevation showing the manner in which the top support of the upper internals of a reactor supports the guide tube.
Figure 2:
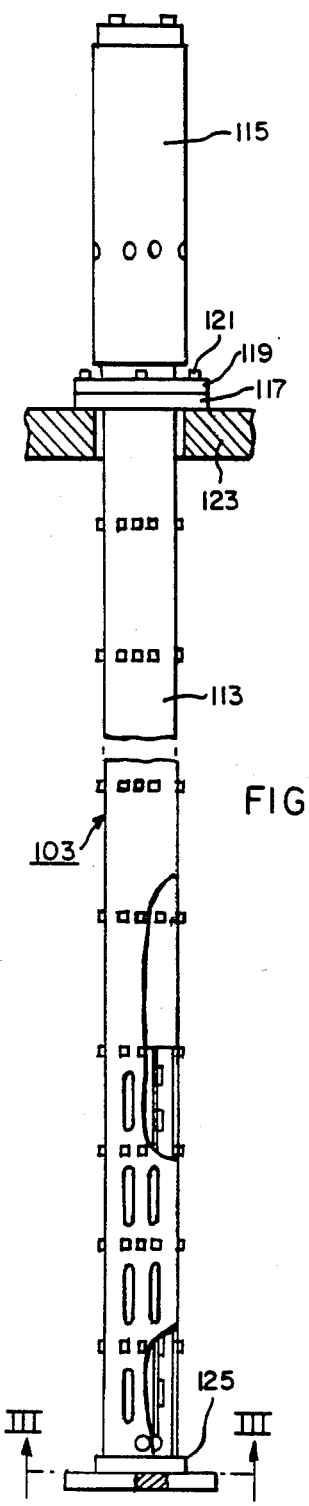
FIG. 2 is a view in side elevation showing a guide tube of the reactor shown in FIG. 1.
Figure 4:
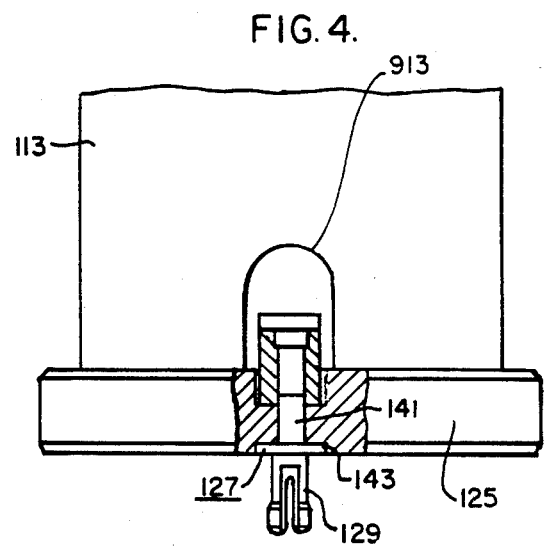
FIG. 4 is a fragmental view in side elevation enlarged and partly sectional showing the lower end of the guide tube and a split pin.
Figure 5:
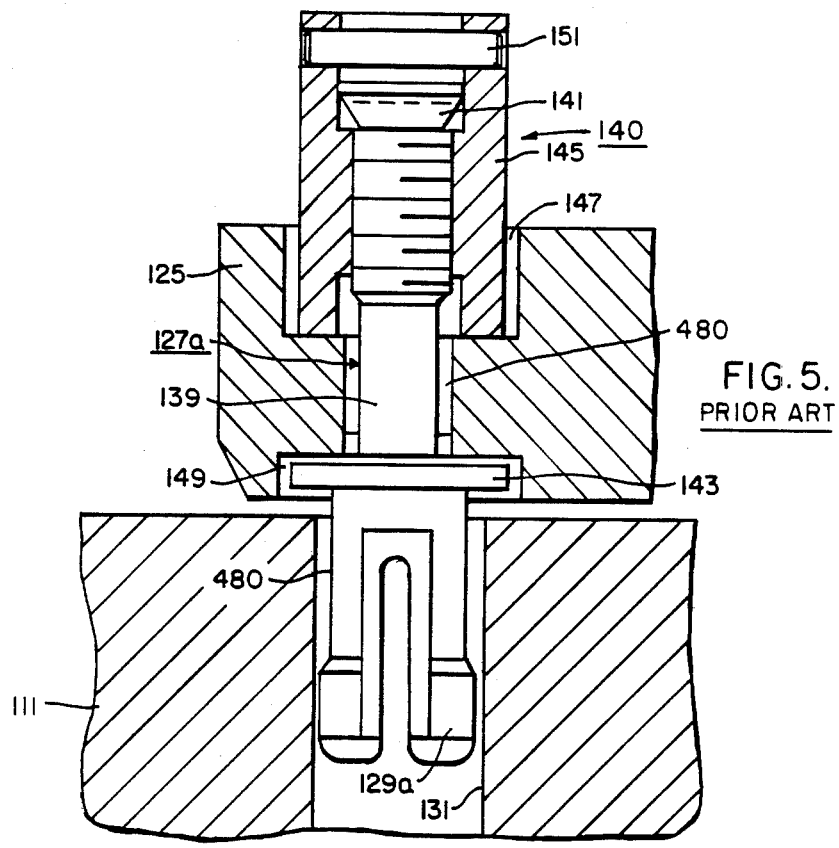
FIG. 5 is a fragmental view in section enlarged showing an old split-pin assembly of the type that is being replaced and its relationship to the flange of its guide tube and the upper core plate of the reactor.
Figure 11:
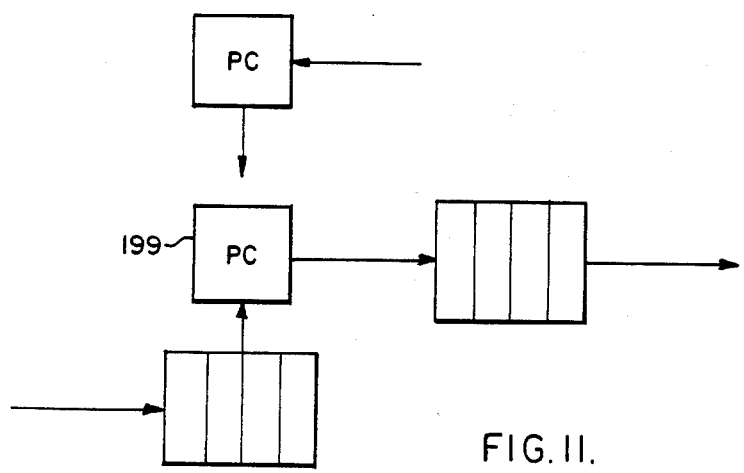
FIG. 11 (Sheet 4) is a block diagram showing the manner in which intelligence is impressed on the computer of the apparatus according to this invention and derived from the computer.
Figure 6:
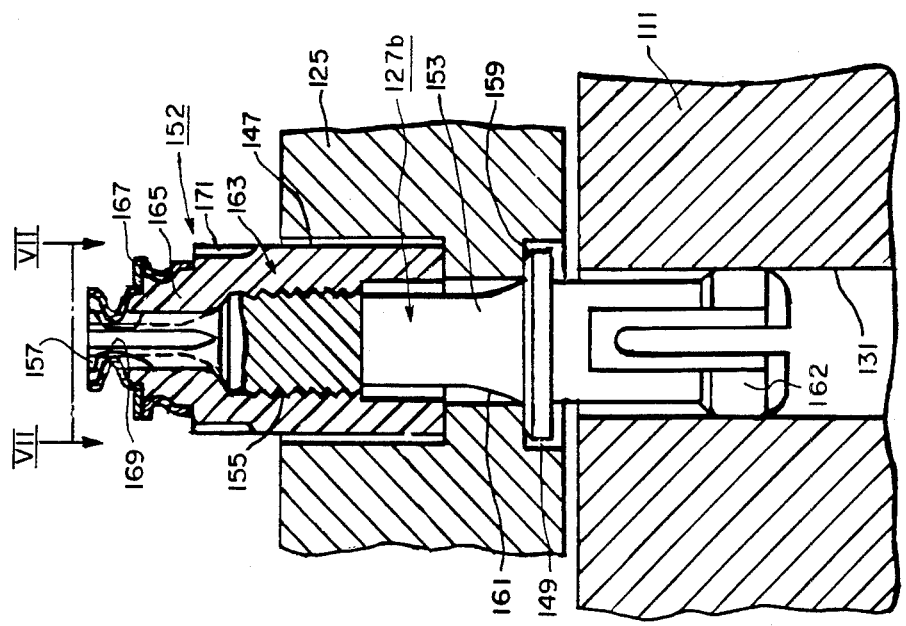
FIG. 6 is a fragmental view similar to FIG. 5 but showing a new split pin assembly which replaces the split pin assembly shown in FIG. 5.

FIG. 1 shows a nuclear reactor 101 having guide tubes 103 whose old split pins require replacement. The reactor 101 includes a core 105 containing fuel assemblies 107 within some of which control-rod clusters (not shown) are moveable vertically. The guide tubes 103 serve as guides for the control-rod clusters as they move upwardly out of the fuel assemblies 107. The core is bounded by an upper core plate 111. The guide tubes 103 form a part of the upper internals 112 of the reactor 101. Each guide tube 103 consists of a lower section or lower guide tube (LGT) 113 and a thermal sleeve 115 which may be, and is sometimes, described as an upper guide-tube section or upper guide. Each LGT 113 has at the top a rectangular flange 117 (FIG. 1A) and the thermal sleeve 115 has a rectangular flange 119. Each LGT is joined to its corresponding thermal sleeve 115 by their rectangular flanges 117 and 119 which are secured together by bolts 121 in their corners (FIG. 2). The flange 117 extending from the upper end of each LGT 113 engages the top support plate 123 of the upper internals 112. The bolts 121 pass through clearance holes in the flanges 117 and 119 and engage threads in the top support plate 123. Each LGT 113 has a flange 125 at its lower end which rests on the upper core plate 111. Split pins 127 (FIG. 4) extend from the lower ends of each LGT. The tines or leaves 129 of each split pin resiliently engages the wall 131 of a hole in the upper core plate 111 (FIGS. 5, 6). The opening in the flange 125 is covered by a sheath 133 (FIG. 3) which supports guides 135 with slots with expansions 136, the slot and expansions to be penetrated by the spider and control rods or pins (not shown) of the control rod clusters. The sheath 133 has holes 137 for penetration of the coolant. C-shaped tubes 138 extend from sheath 133 through which control rods or pins from the cluster penetrate.

Figure 3:
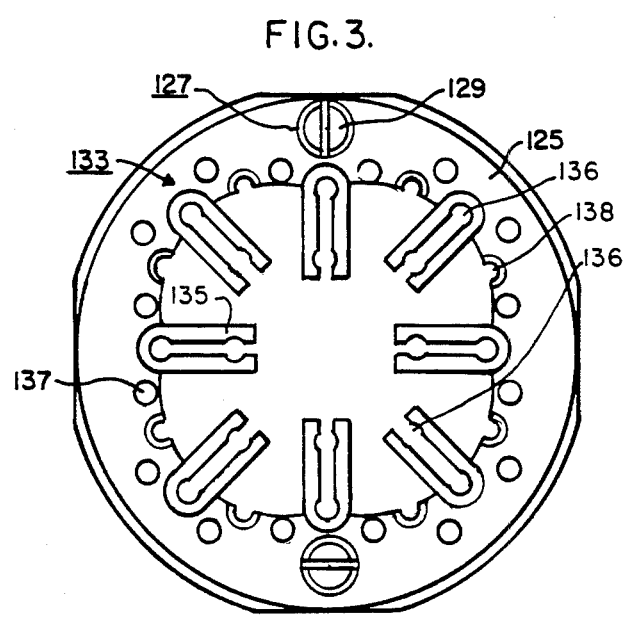
FIG. 3 is a view in section enlarged taken along line III—III of FIG. 2.

Each old split-pin assembly 14D (FIG. 5) which is replaced in the practice of the invention has an old pin 127a including a shank 139 terminating in a head 141 at one end and in a flange 143 at the opposite end. The tines 129 extend from the flange 143 and penetrate into the hole in the core plate 111. As shown in FIG. 3, pins 129 extend from the LGT flange 125 at positions spaced by 180°. The pin 127a is secured to the flange 125 by an old nut 145 which is threaded onto the upper portion of the shank 139. The nut 145 extends into an upper counterbore 147 in the flange 125 and firmly engages the inner surface of this counterbore. The flange 143 of the split pin 127a is accommodated by a lower counterbore 149 in the flange 125 of the LGT 113. The flange is a close slip fit in the lower counterbore 149. Typically, the diameter of the flange is about 0.0006 inch less than the diameter of the counterbore. A dowel pin 151 extends through the upper skirt of the old nut 145 and is welded to a button in the head 141 of the old split pin.

Each new split-pin assembly 152 has a new split pin 127b (FIGS. 6, 7) (see Land) including a shank 153 having an intermediate threaded section 155. An unthreaded portion 157 fluted near the top extends from the threaded section 155. A flange 159 extends from the bottom of the shank 153. The shank terminates in a parabolic fillet 161 at the flange. The tines 162 extend from the flange. A new nut 163 is threaded on the threaded section 155 and engages the inner surface of the upper counterbore 147. The new nut 163 has an attenuated grooved section 165 at the top which terminates in a taper. It has splines 171 below the upper section 165. A locking cup 167 is secured above the splined section of the nut 163. During replacement, the locking cup 167 is crimped onto the upper section 157 of the pin 127b. The cap 167 engages opposite flutes 169 in the upper portion 159 of the shank 153 and grooves spaced by 90° in the grooved section 165 of the new nut 163.

Figure 8:
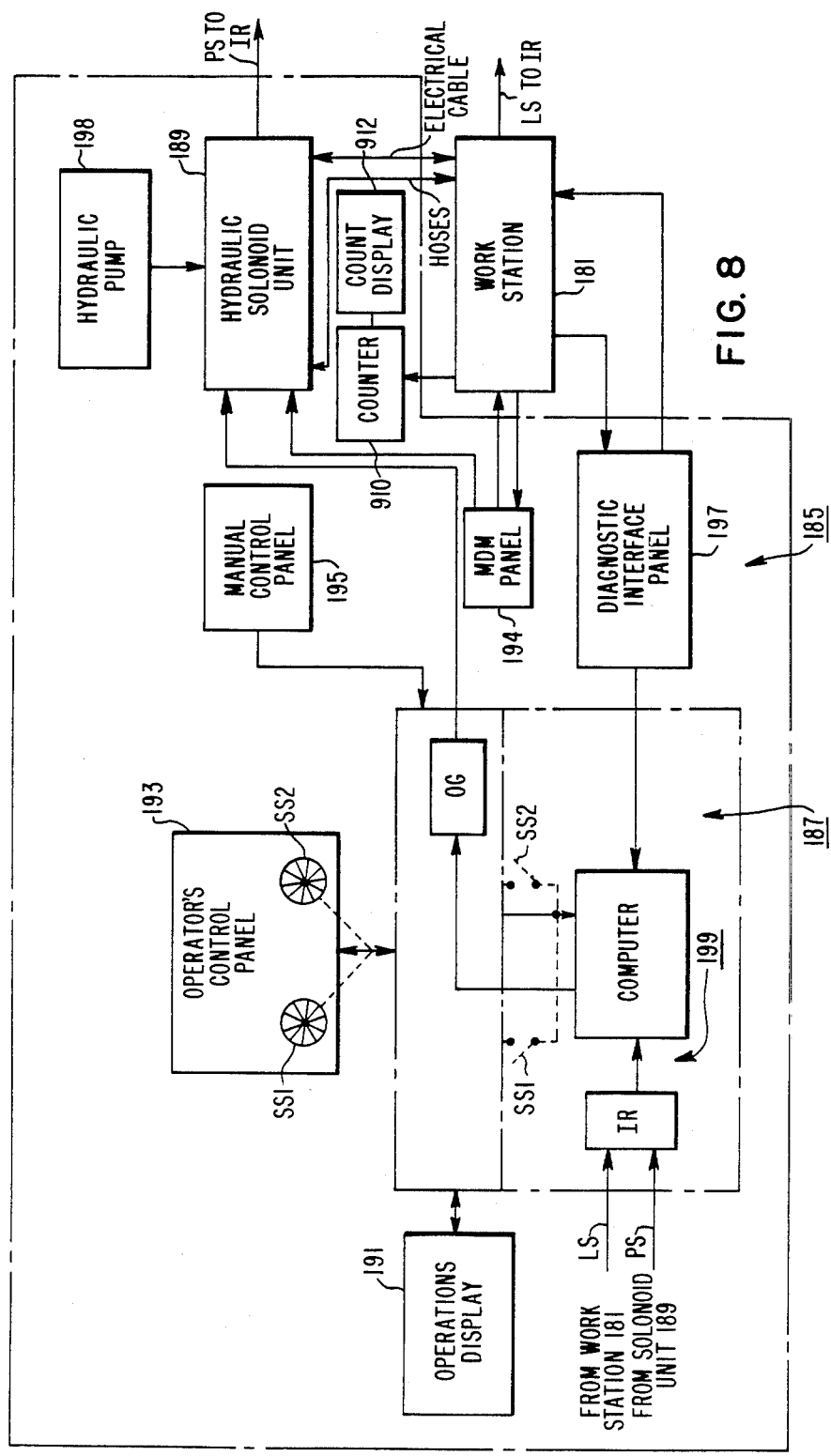
FIG. 8 is a block diagram showing the major components of the apparatus in accordance with this invention and their relationship.
Figure 12:
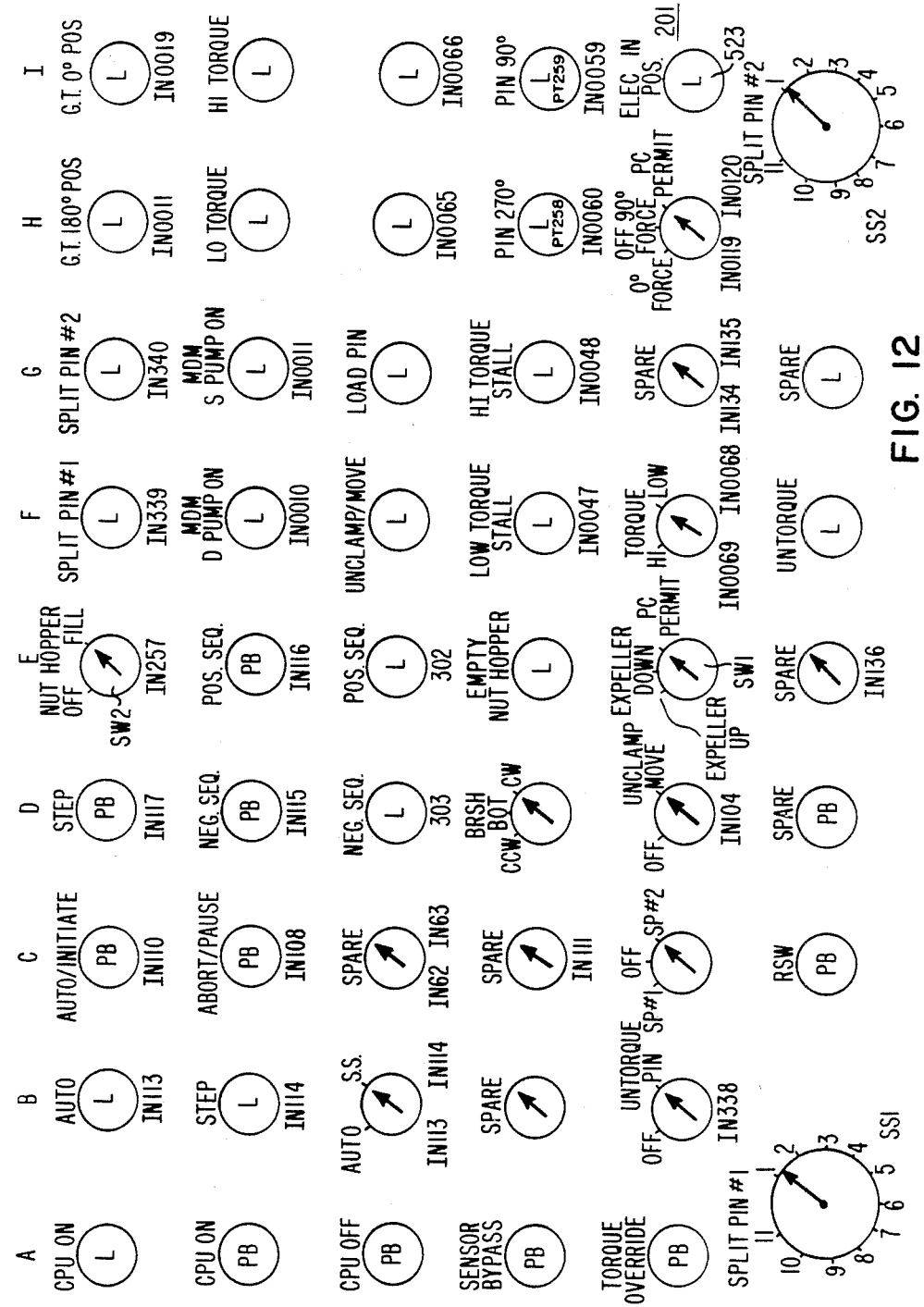
FIG. 12 is a diagrammatic view showing the components of the operation's display and the operator's control on the front panel of the command control center.

The apparatus for replacing an old split-pin assembly 140 by the new split-pin assembly 152 includes a work station 181 (FIGS. 8, 9, 10, 11, 12) under a pool 183 of water, which is usually borated, and a command center 185 above the pool. The command center 185 includes a robotic control center 187, a hydraulic solenoid unit 189, an operations display 191, an operator's control panel 193, an MDM panel and console 194 (The MDM is controlled separately), a manual control panel 195, and a diagnostic interface panel 197. The hydraulic unit is supplied b a hydraulic pump 198. The robotic control center 187 includes predominantly a computer 199, input modules IR to transmit input signals to the computer 199, and output-groups modules OG for transmitting command signals from the computer to the hydraulic solenoid unit 189. The input modules IR are supplied with feedback intelligence from the sensors in the work station 181 and in the hydraulic solenoid unit. The sensors in the work station 181 are limit switches, predominantly magnetically operable reed switches, magnetic proximity switches, and magnetic position switches. The sensors in the hydraulic solenoid unit 189 are pressure switches. In FIG. 8, the limit switch sensors are identified as LS and the pressure switch sensors are identified as PS. The operations display 191 consists of an array of lights L (FIG. 12) indicating the status of the various parts of the tools in the work station 181. The operator's control panel 193 includes the switches for producing the desired operation of the tools. The operation's display and the operator's control panel are on the front panel of the robotic control center 187. This panel 201 is shown in FIG. 12. It includes lights L for indicating the state of the tools as identified, and manual two or three pole selector switches for setting various modes of operation as labelled. For example, switch SW1 (center next-to-last line) may be set for pin-expeller up through the collet, pin expeller down, and for control by the computer 199 (PC PERMIT); switch SW2 (top center) may be set when the nut hopper need be filled. There are also push buttons PB for setting various modes of control. There are 11 position selector switches SS1 and SS2 (lower corners) for selecting tools for operation in the proper sequence or for rotating the LGT. The operations corresponding to the settings are shown in Tables I and II below.

TABLE I

SPLIT PIN #1

| Pos. # | |
|---|---|
| 1. | Orient and clamp |
| 2. | Pin separation |
| 3. | Remove old split pin #1 |
| 4. | Rotate CW 180° |
| 5. | Remove nut |
| 6. | Rotate CCW 180° |
| 7. | Clean/brush |
| 8. | Rotate CW 180° |
| 9. | Install nut |
| 10. | Torque #1 |
| 11. | Crimp |

TABLE II

SPLIT PIN #2

| Pos. #1 | |
|---|---|
| 1. | Clamp split pin #2 |
| 2. | Pin separation #1 |
| 3. | Remove old split pin #1 |
| 4. | Rotate CCW 180° |
| 5. | Remove nut |
| 6. | Rotate CW 180° |
| 7. | Clean/brush |
| 8. | Rotate CCW 180° |
| 9. | Install nut |
| 10. | Torque #2 |
| 11. | Crimp |

These tables describe the operations which are performed in the replacement of each old split-pin assembly 140 and the order in which they are performed.

The work station 181 (FIGS. 9, 9A, 9B, 10) includes a plate or strong back 202 supported under pool 183 from a working platform 203 by a ladder-shaped elongated framework 205 formed of vertical and horizontal pipes 207 and 209.

The plate 202 supports the clamp-and-index tool 211 (FIG. 13), the MDM 213, the brush tool 215, the pick-and-put tool 217, the pin-insertion/torque tool 219, the nut hopper 218, and the crimping tool 221. Typically, these tools are mounted on cluster plates which are mounted on plate 202 by dovetail structures (not shown). The clamp-and-index tool 211 is provided with a hydraulic motor 220 (FIG. 9) for rotating the LGT 113. The MDM 213 is moveable by a motor 223 and a chain 225 on rails 227 between the plate 202 and the platform 203 so that its electrode 229 may be changed. The tools 211 through 221 are connected to the solenoid control unit 189 through hoses generally identified as 231. The MDM 213 is supplied with power from the platform 203 by a cable 233.

Figure 10:
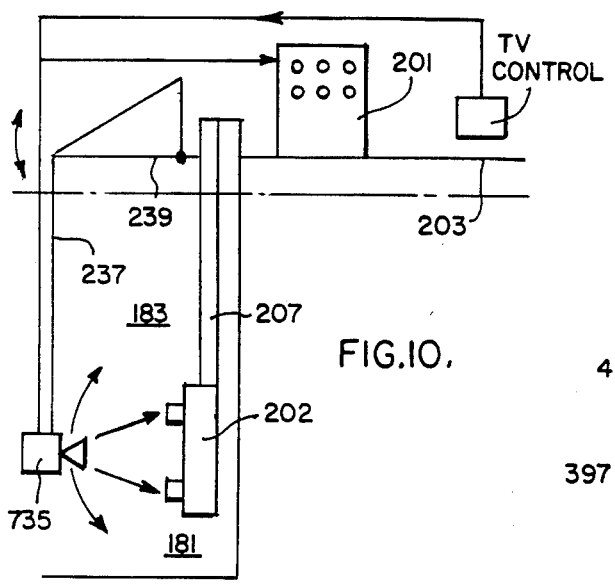
FIG. 10 is another diagrammatic view of the work station showing the manner in which the TV camera is related to, and cooperative with, the components in the work station.
Figure 30:
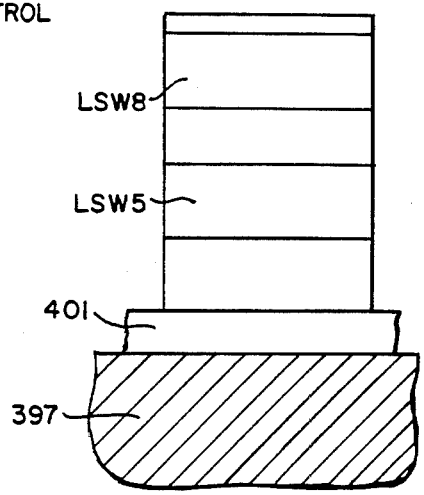
FIG. 30 (sheet 10) is a fragmental view in side elevation showing the responsive components of the limit switches.

The work station 181 and its tools may be viewed by a camera 235 of a closed-circuit TV (FIG. 10). The camera 235 is suspended by a cable 237 from a boom 239 which may be pivoted in a horizontal plane to swing the camera 235 in a horizontal arc substended by the plate 202 and the tools mounted on it. The cable 237 may also be raised or lowered to move the camera 235 vertically and the camera may be pivoted in a vertical arc subtended by plate 202. The CRT of the closed circuit TV is within the casing of the robotic control center 187.

Figure 14:
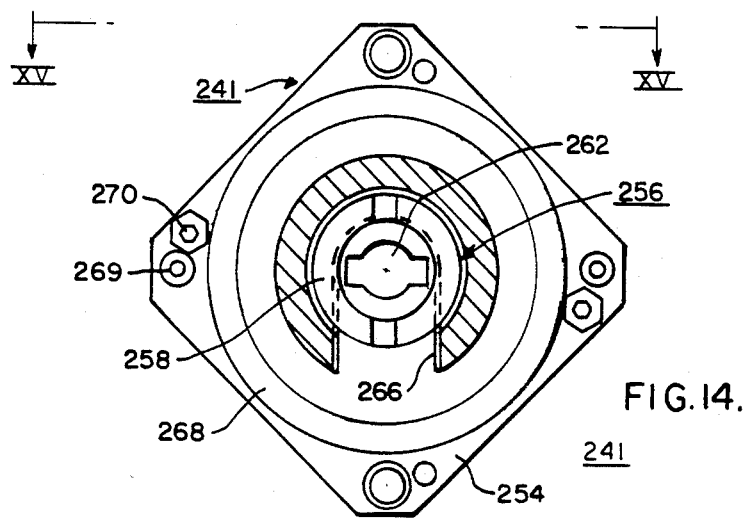
FIG. 14 is a view in section taken in the direction XIV—XIV of FIG. 15 showing essentially a plan view of the bail which is attached to the lower guide tube (LGT) to transport it from the reactor to the work station and for manipulating the LGT at the work station.

The LGT 113 is transported to, and precisely positioned in, the clamp-and-index tool 211 for processing. The bolts 121 joining the flanges 117 and 119 and the upper guide tubes 115 are removed (FIG. 1A). A bail 241 (FIG. 14) is secured to the flange 117. The bail 241 (FIGS. 14, 15) includes a plate 254 of generally rectangular shape with the corners truncated. An annular lifting knob 256 extends coaxially from the plate 254. The knob 256 is welded to plate 254. The head 258 of the knob has key slots 262. A 60° frustro conical surface 264 extends inwardly from the inner surface of the top of the head, terminating in a slot 266 adapted to receive the male member (not shown) of a bayonette joint which serves to secure the LGT 13 during its transfer from the upper internals (not shown) of the reactor to the clamp-and-index tool 211. The plate 254 has an annular finished surface 268. The bail 241 is secured to the upper flange 113 of the LGT by bolts 270. The knob 258 on the bail is engaged by a fixture (not shown) on a crane (not shown) and the LGT is moved by the fixture to the clamp-and-index tool 211.

Figure 13:
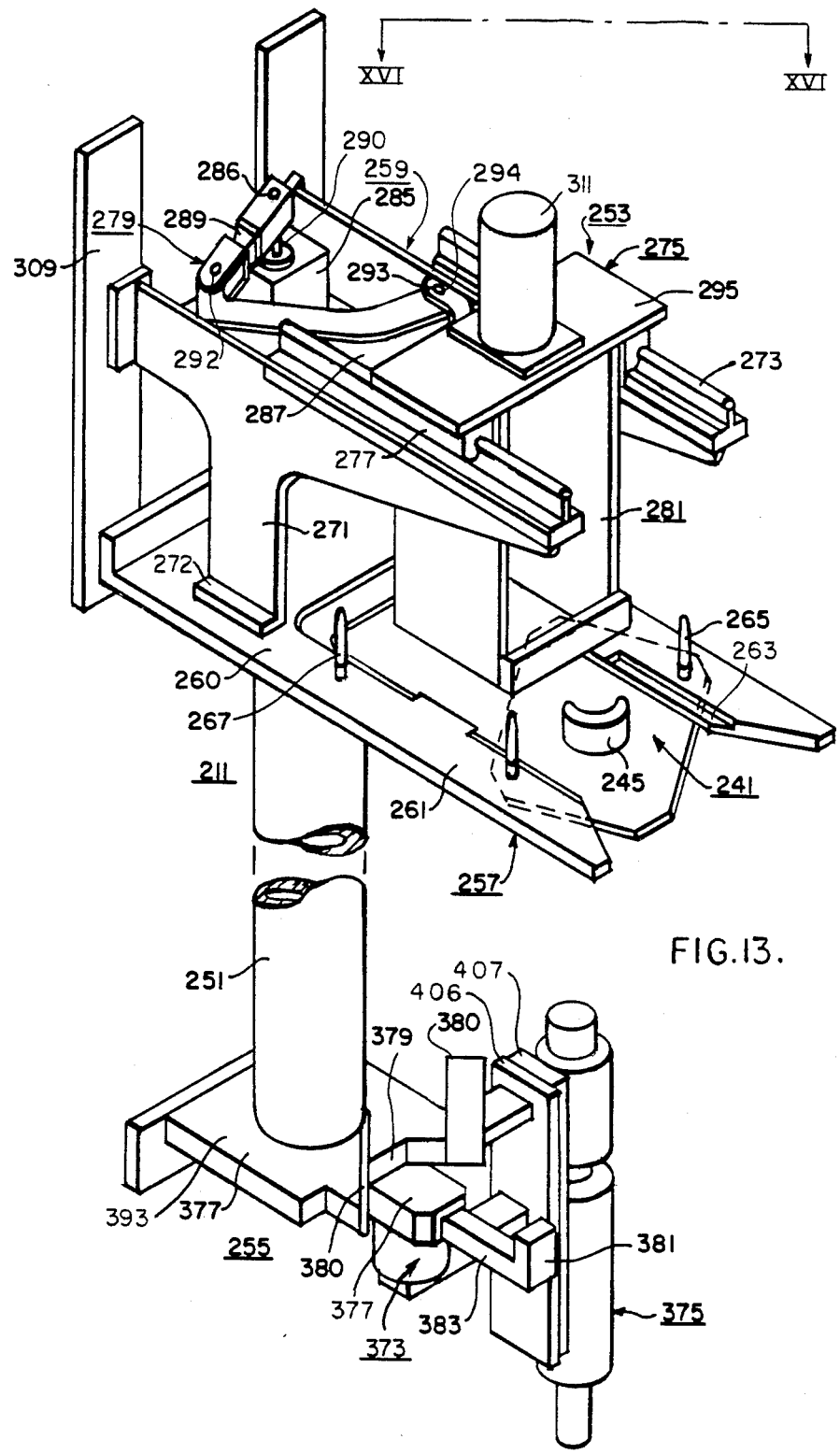
FIG. 13 is a simplified view in isometric showing the clamp-and-index tool with some of the components removed in the interest of clarity.

The clamp-and-index tool 211 includes an elongated pipe 251 supporting an upper deck 253 and a lower deck 255 (FIGS. 13, 16, 17). The upper deck 253 has a lower level 257 and an upper level 259. The lower level 257 includes a slotted angle plate 260 (FIG. 13) dimensioned to accommodate the insertion and movement, vertically and horizontally of an LGT 113 to be processed with the bail 241 bolted to its upper flange 117. The fingers 261 of the plate 260 which bound the slot are tapered at their outer ends to facilitate entry of the LGT 113. Inwardly from the taper, each finger 261 has a recess 263 to accommodate a locator (not shown) on the LGT. There are outer and inner pairs of locating pins 265 and 267 on the fingers. The LGT 113 is first positioned on the outer locating pins 265 with the pins engaging the coaxial diagonal holes in the flange 117 and holes 269 (FIG. 14) in the plate 254 of the bail 241. Then the LGT is moved inwardly and positioned on the inner fingers 267 for processing.

Figure 15:
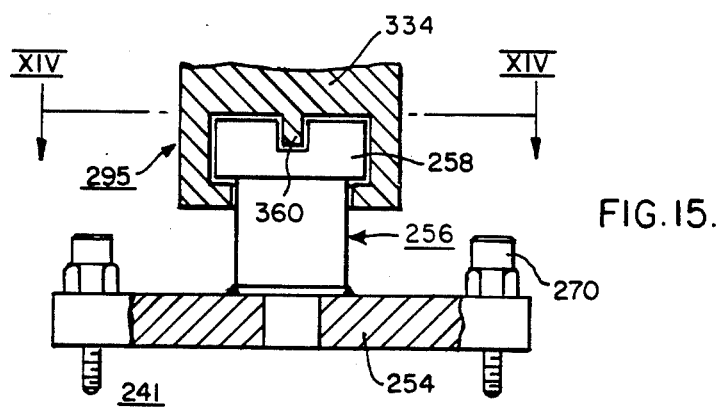
FIG. 15 is a view in side elevation and partly in section of the bail taken in the direction XV—XV of FIG. 14.
Figure 94A:
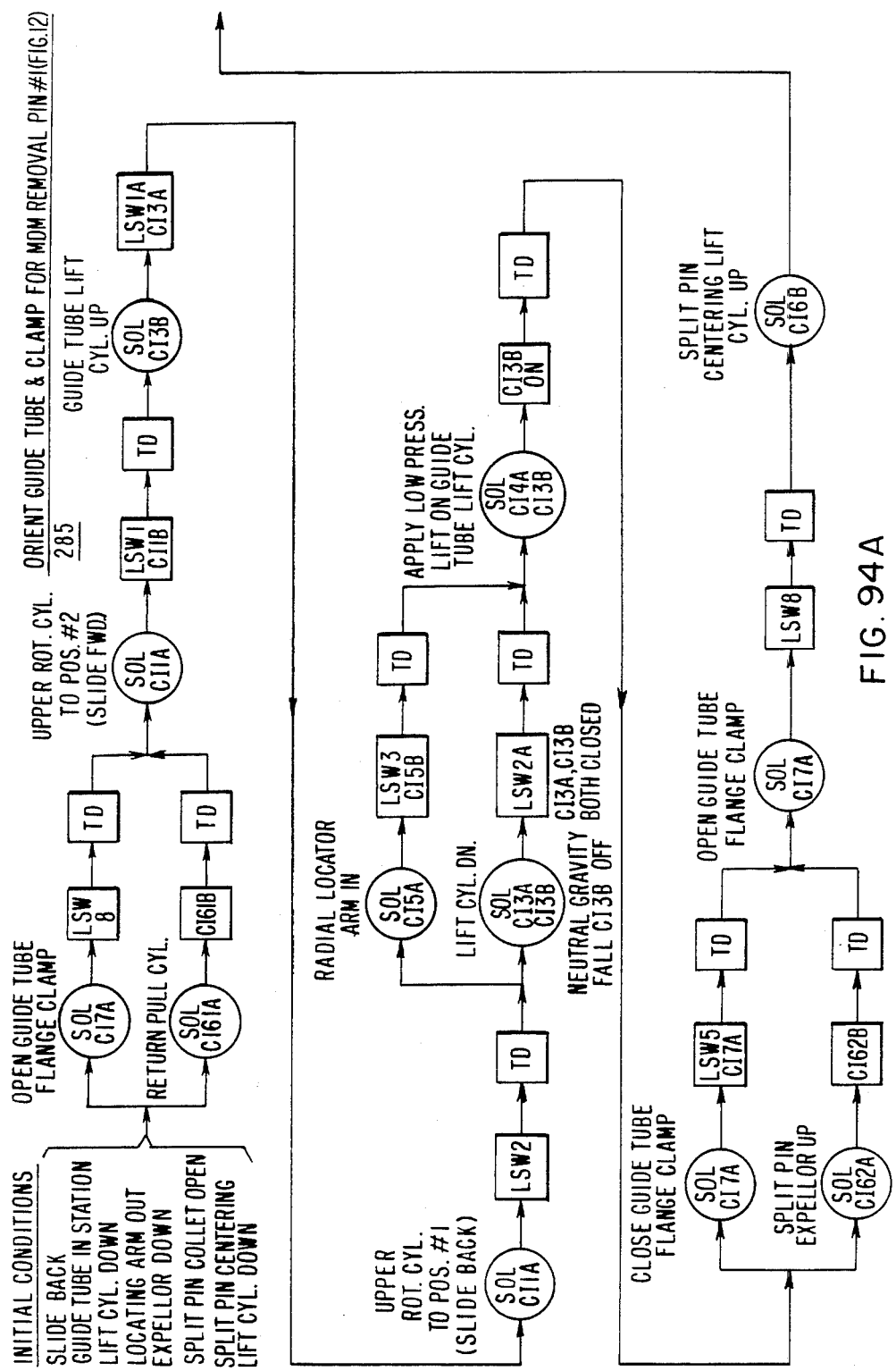
FIGS. 94A and 94B together are a block flow diagram showing predominantly the operation of the clamp-and-index tool in orienting and clamping the LGT for processing.
Figure 94B:
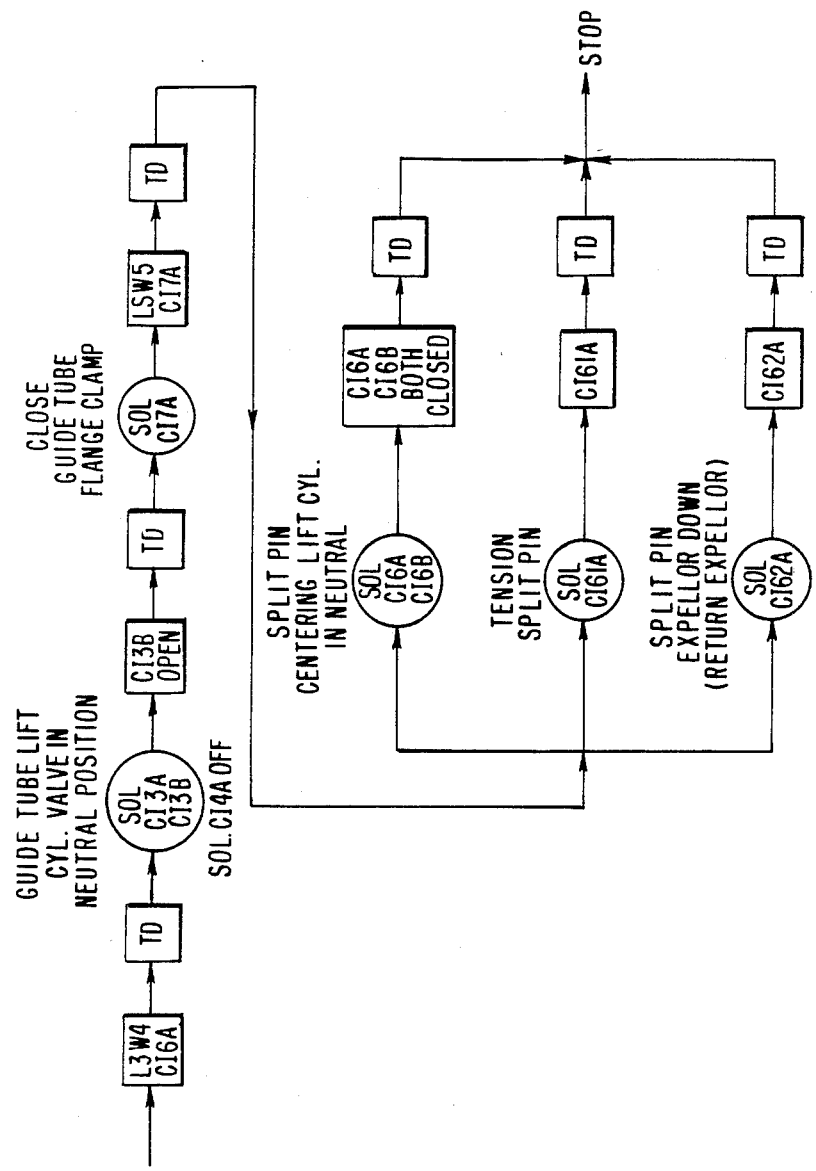
Figure 95:
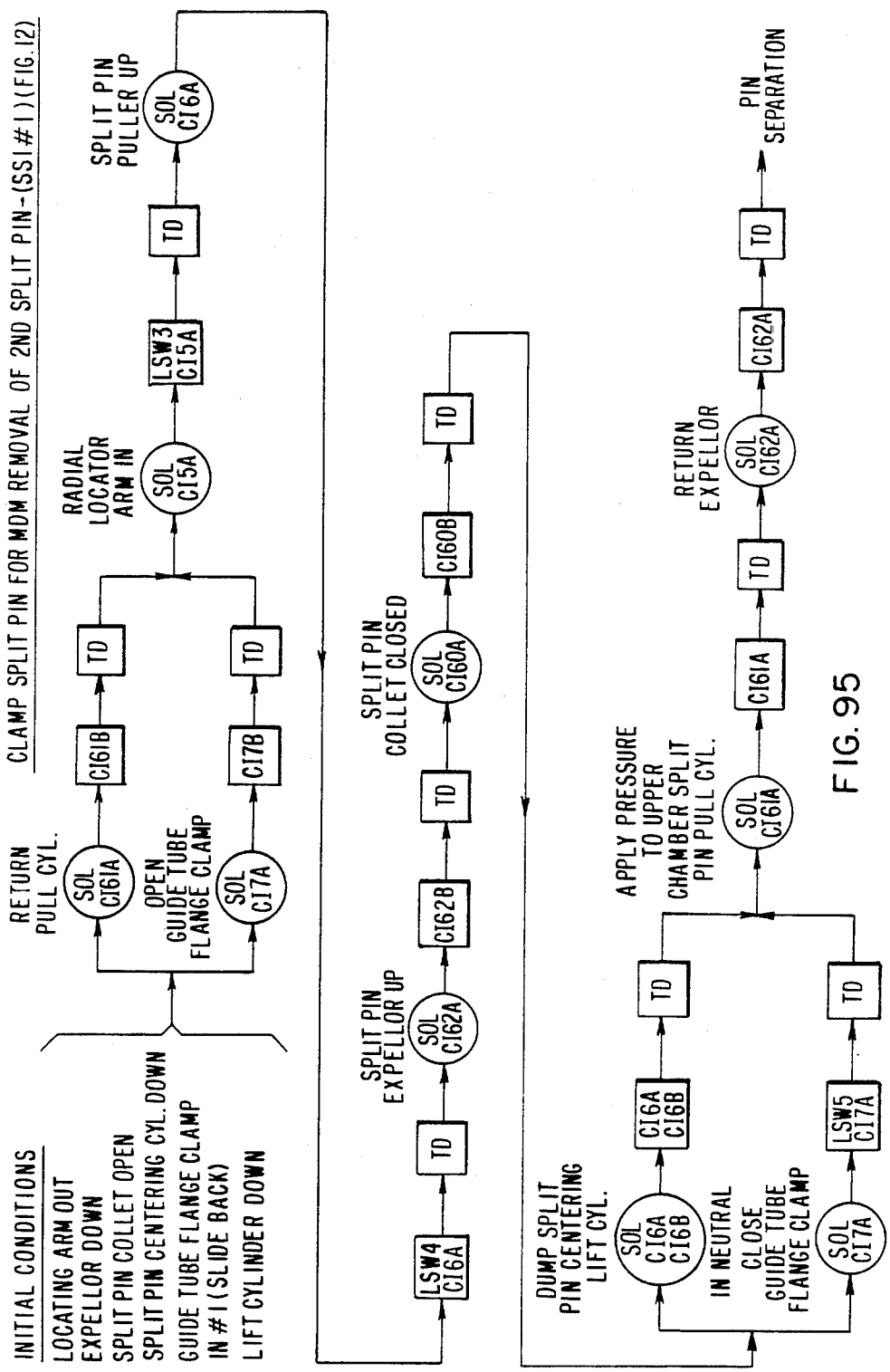
FIG. 95 is a block flow diagram showing the sequence involved in the severing and removal of the fragment of the old split pin.
Figure 96:
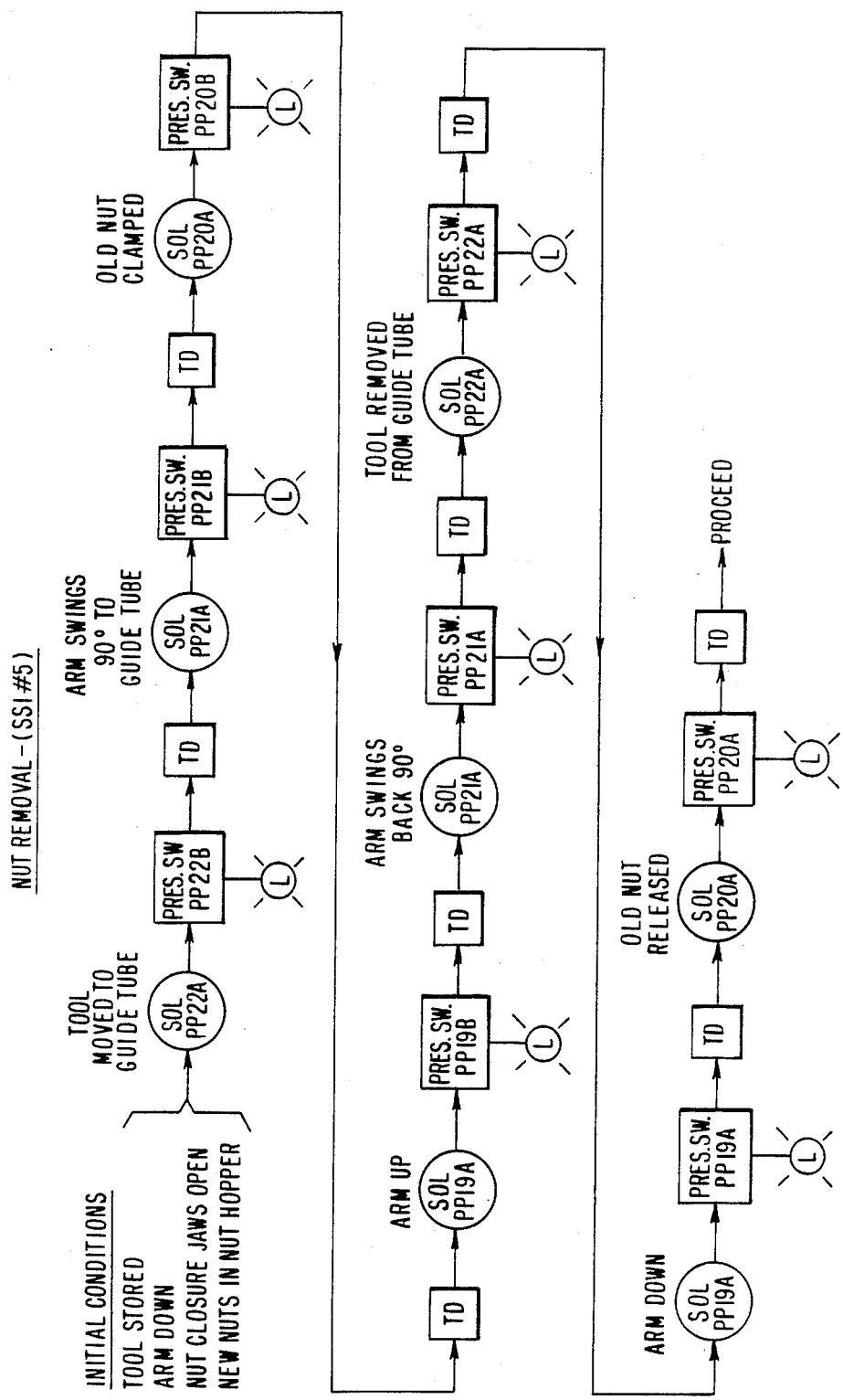
FIG. 96 is a block flow diagram showing the sequence involved in the removal of the fragment of the old nut.
Figure 97A:
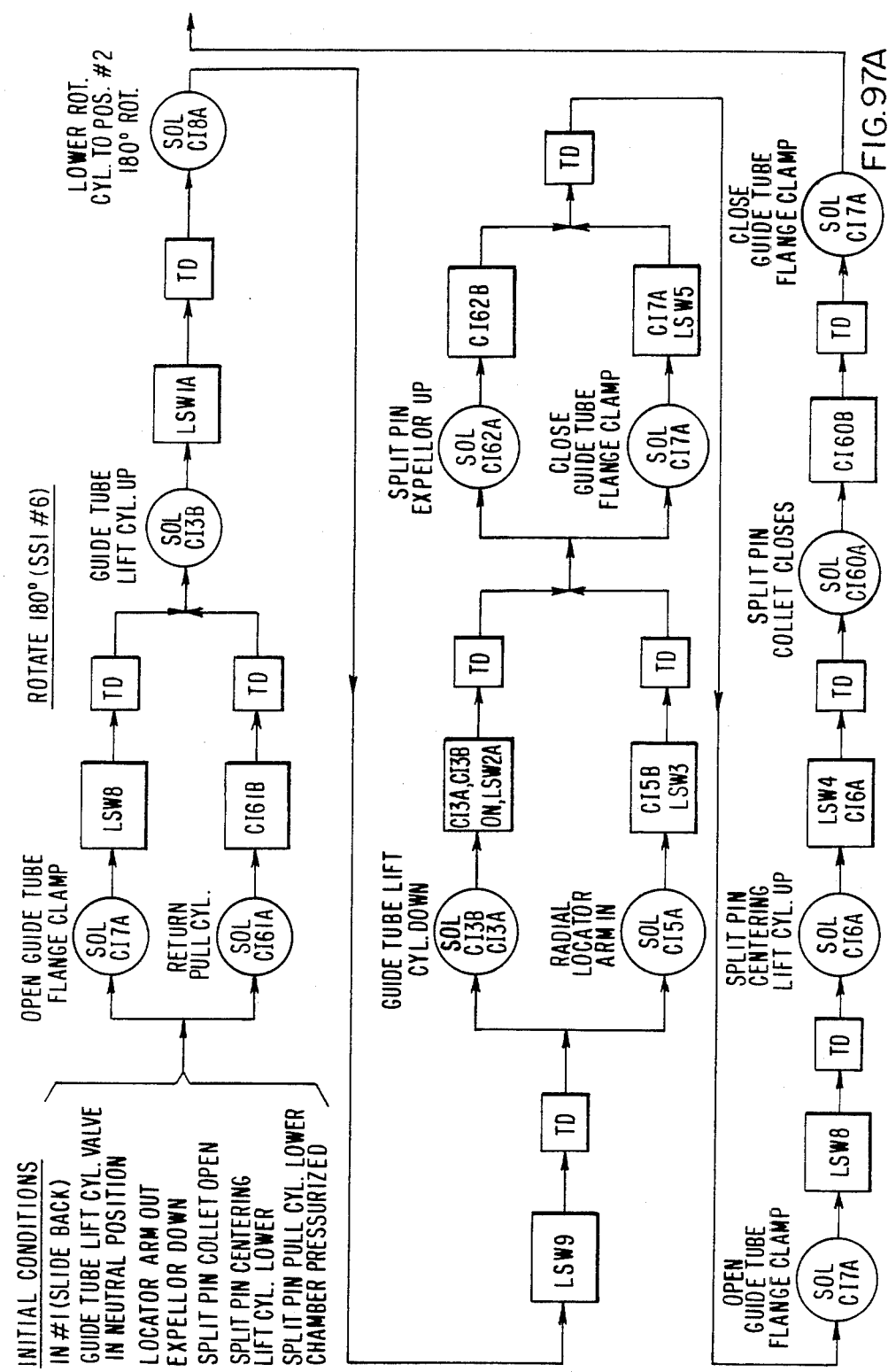
FIGS. 97A and 97B together constitute a block flow diagram showing the steps involved in the rotation over an angle of 180° of the LGT.
Figure 97B:
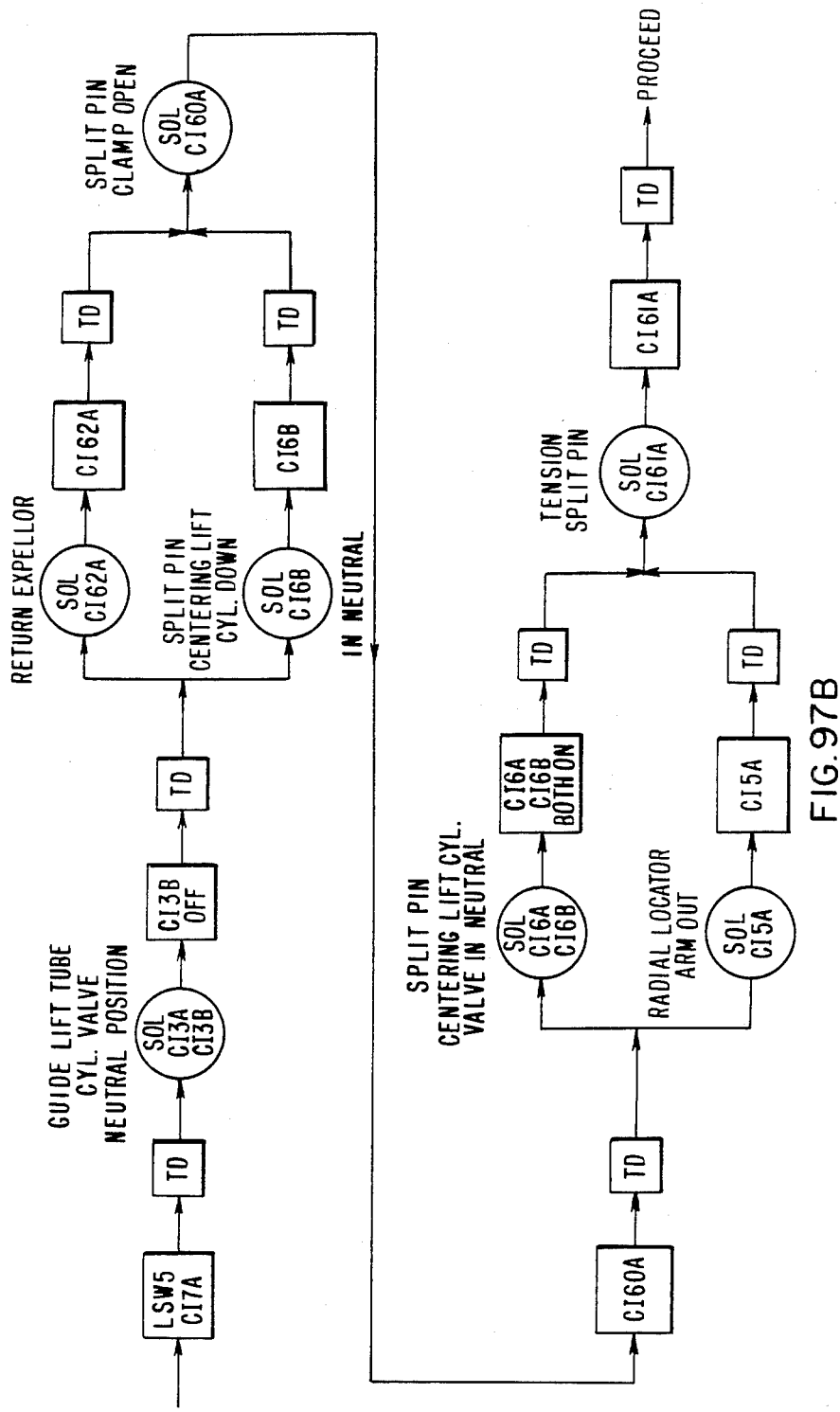
Figure 98:
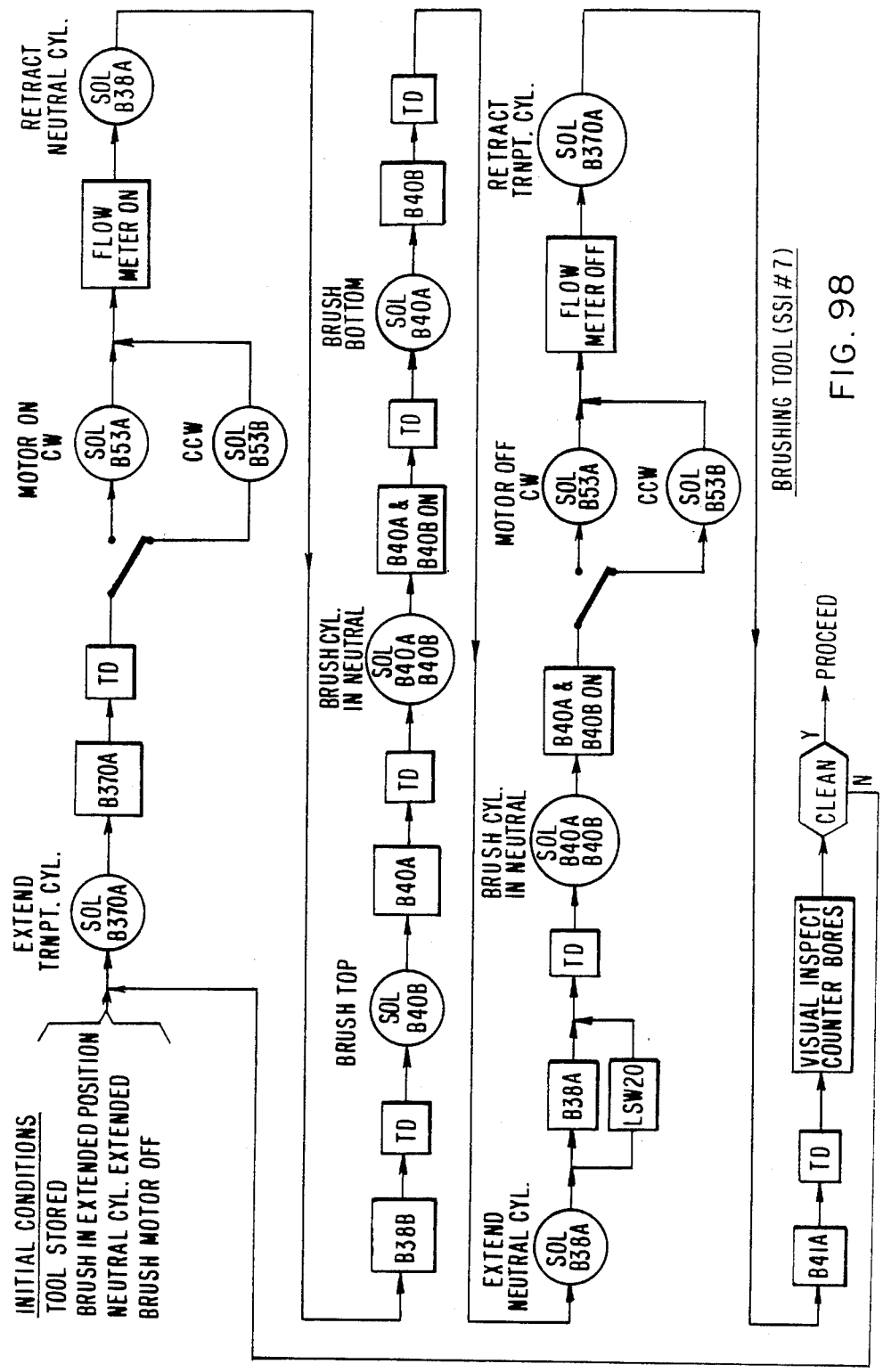
FIG. 98 is a block flow diagram showing the steps involved in brushing the counterbores in the flange of the LGT where the split pin and nut are seated.

The upper level 259 of the deck 253 of the clamp-and-index tool 211 is mounted on generally inverted boot-shaped brackets 271 each having a flange 272 secured to the slotted plate just inwardly of the end of the slot. The upper level includes tracks 273. A slider 275 is moveable on pillow blocks 277 along the tracks 273 by a linkage 279. The slider carries a box-like structure 281 within which are mounted the mechanism 283 shown in FIGS. 18, 19, 20, 20A but not in FIG. 13 for raising and rotating the LGT 113. The linkage 279 is driven by a rotary hydraulic cylinder (ROTAC) 285 mounted on a plate 287 joined to the boot-shaped brackets 271. The linkage 279 includes a bifurcated crank (Flider crank) or clevis 289, connected to the rotating pin 290 of the cylinder 285. At its bifurcated end, the crank 289 is pivotally connected, through a clevis pin 292, to a link 291 or lever which at its other end is pivotally connected through a clevis pin 300, to a U-bracket 293 secured to the vertical wall 298 (FIG. 18) of the box-like structure 281 centrally of the plate 295 of the slider 275 from which the box-like structure 281 is suspended. The pin 290 of the rotary cylinder 285 rotates between an angular position in which the link 291 is extended, and in which a stop 296 on the top of cylinder 298 is engaged, and a position in which the link 291 is retracted. In the extended position of link 291, the box-like structure 281 is positioned towards the outer end of the slotted plate 260. In this position, an LGT on pins 265 may be connected to a yoke 298 (FIG. 18) at the lower end of the mechanism 283. The yoke 299 may be coupled to the knob 256 of the bail 241 (FIG. 15). In the retracted position of the link 291, the box-like structure 281 is positioned inwardly of the slotted plate where an LGT on pins 267 is positioned precisely for processing and may be raised and rotated and lowered as required. FIG. 13 shows the linkage in an intermediate position. The slider is said to be in position #1 in the most inward position and in position #2 in the most outward position (FIGS. 94A, 94B).

Figure 25:
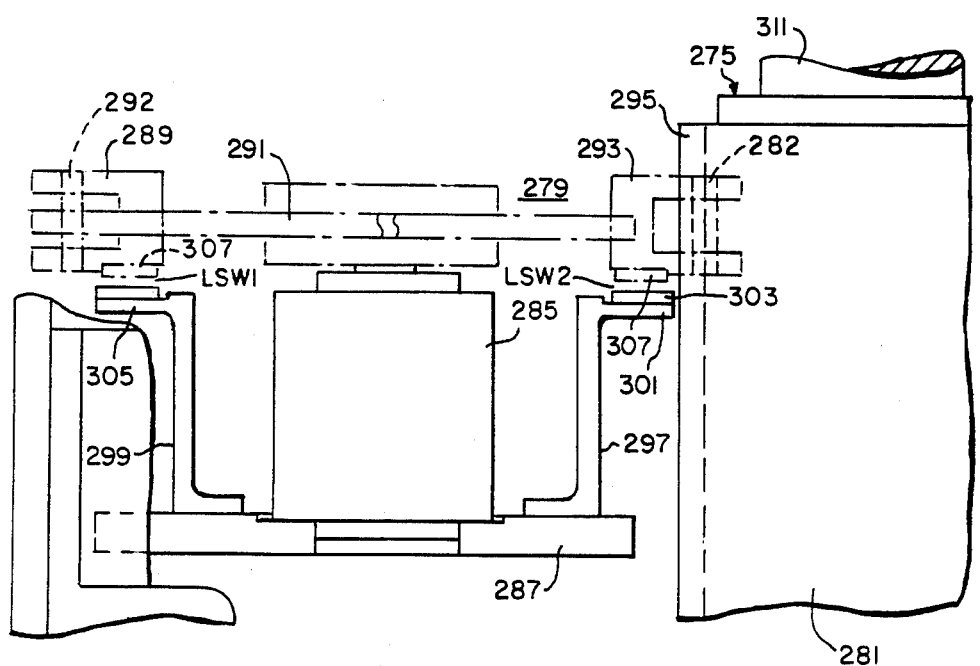
FIG. 25 is a fragmental view in side elevation taken in the direction XXV—XXV of FIG. 24.

A pair of Z-brackets 297 and 302 (FIG. 25) are mounted on the plate 287 on each side laterally of the rotary cylinder 285. The Z-brackets 297 and 302 are centered on the central plane parallel to the tracks 273 through the pin 290. The Z-brackets are shown in FIGS. 25 but not in FIGS. 13, 16, 17. Each Z-bracket 297 and 302 has a recess on its upper horizontal arm 301 in which a magnetizeable member303 and 305 is disposed. A magnetic member 307 is carried by the bifurcated head of the crank 289. The members 305 and 303 form proximity switches LSW1 and LSW2 with the magnet 307. In the advanced position of the linkage 279 and of the slider 275 the switch LSW2 is actuated. This is the position shown in broken lines in FIG. 25. In the retracted position of the linkage 279 and the slider 275 the switch LSW1 is actuated. Switches LSW1 and LSW2 operate as sensors transmitting intelligence to the robotic control center 187 (FIG. 8) as to the position of the slider 275.

Vertical plates 309 (FIGS. 13, 17) are connected to the inner ends of the boot bracket 281. These plates serve to mount the clamp-and-index tool on the plate 202 (FIG. 9) which supports the robotic tools used in the replacement of the split-pin assemblies.

Figure 18:
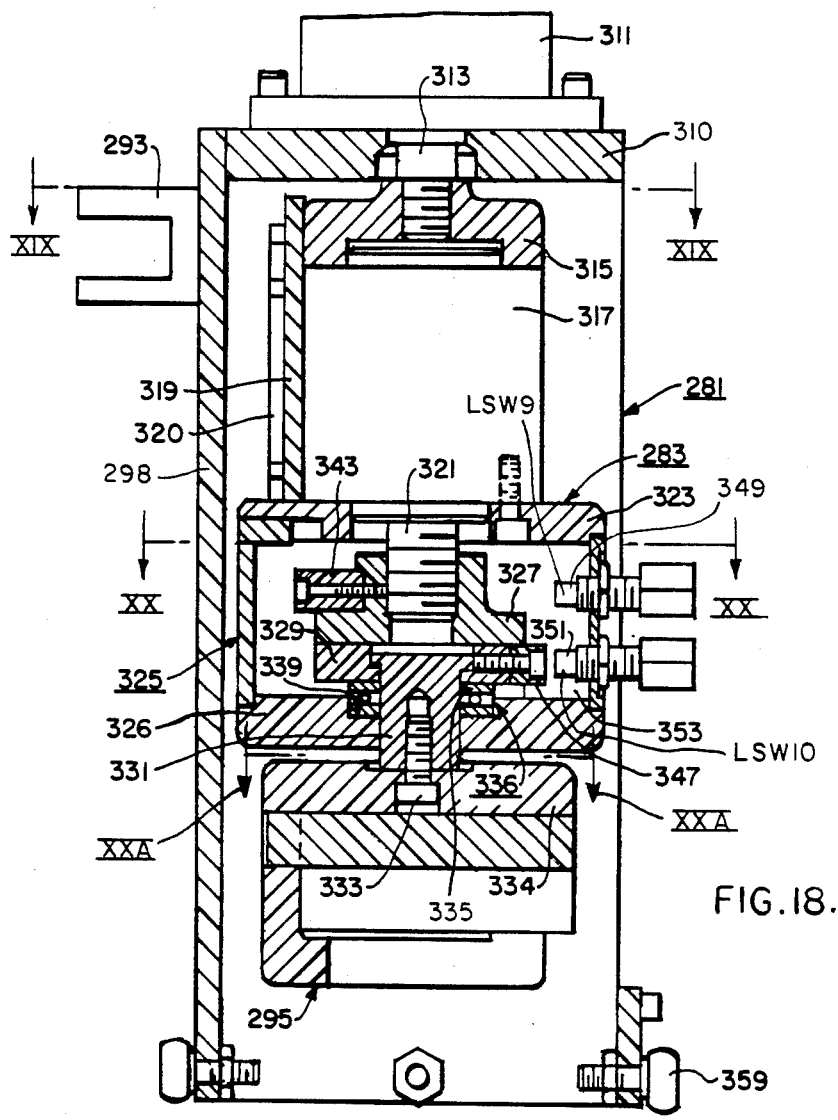
FIG. 18 is a view in longitudinal section, with parts not sectioned in the interest of clarity of the box-like member of the clamp-and-index tool which suspends the LGT rotatably and moveable vertically.
Figure 20A:
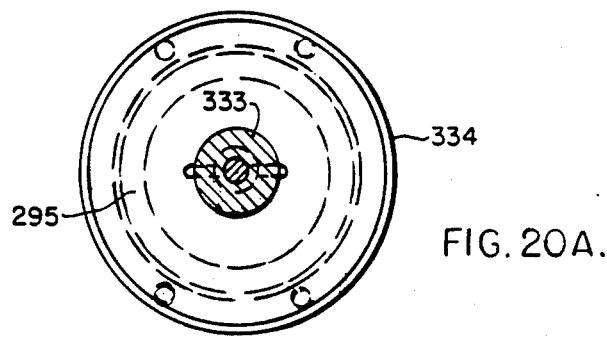
FIG. 20A is a view in transverse section taken along line XXA—XXA of FIG. 18.
Figure 19:
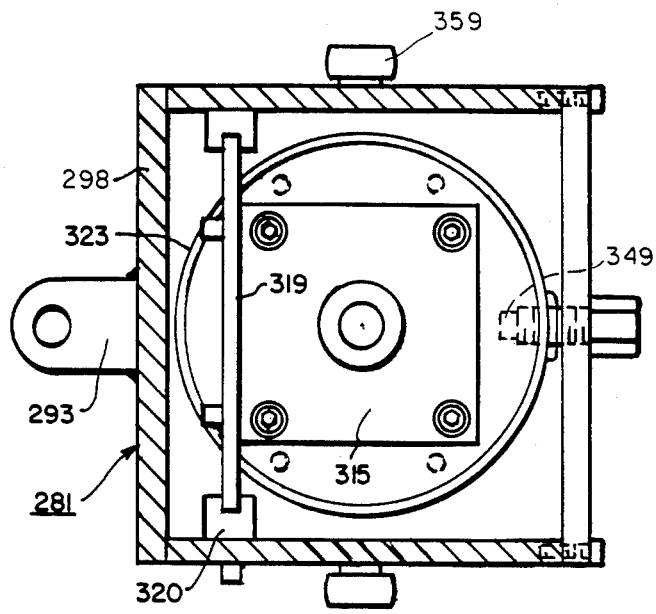
FIG. 19 is a view in transverse section taken along line XIX—XIX of FIG. 18.
Figure 20:
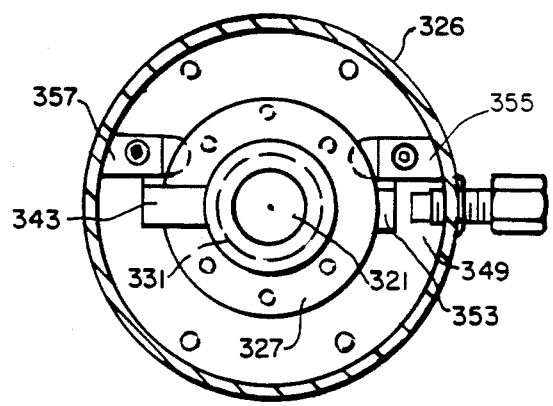
FIG. 20 is a view in transverse section taken along line XX—XX of FIG. 18.

The mechanism 283 for raising or lowering and rotating the LGT 113 (FIGS. 18–22) includes a lift hydraulic cylinder 311 mounted on the top 295 of the slider 275. The plate 295 is also the top plate of the box-like structure 281 (FIG. 13). The piston 313 of cylinder 311 is connected to a connecting hub 315 from which a rotary hydraulic cylinder 317 is suspended. The cylinder 317 is slideable upwardly or downwardly by the lift cylinder 311. The cylinder 317 carried a slide 319 which rides in slots in strips 320 at both ends of the slide 319 (FIG. 19). The slide 319 is composed of non-magnetic material such as brass. The shaft 321 of the rotary cylinder 317 is splined. It passes through a top mounting flange 323 which forms the top of a housing 325 with bottom flange 326. The shaft 321 is connected to a splined hub 327 of generally longitudinal T-section which is bolted to a flange or plate 329. The plate 329 has a recess in which it carries an extension shaft 331. A cap screw 333 is secured to the extension shaft 331. This screw 333 connects the yoke 299 on which the LGT 113 is mounted to the extension shaft 331 through the cap 334. The rotatable race 335 of thrust ball bearing 336 is secured to the plate 329. The fixed race 339 is in the bottom flange 326 of housing 325. The bearing 336, and not the cap screw 333, carries the weight of the yoke 295 and the members connected to it. A metallic (stainless steel) block 343 (FIG. 18) is bolted to the stem 345 of hub 329. A like metallic block 347 is bolted to plate 329, angularly oppositely (180° from) the block 343. Conductors 349 and 351 are suspended by bolts at the levels of block 343 and 347, respectively, and both are displaced angularly by 180° from block 343. The blocks 343 and 347 are rotatable with the shaft 321. The pairs of block and conductor 343–349 and 347–351 operate as proximity limit switches, LSW9 in the 180° position of the LGT and LSW10 in the 0° position of the LGT. When each block 343 or 347 approaches its conductor 349 or 351, it induces eddy currents in its conductor signalling to the robotic control center 187 the change in angular position. The switches LSW9 and LSW10 operate as sensors. A stop block 353 and cooperative stops 355 and 357 are provided for limiting the angle of rotary movement of the LGT to 180° (FIGS. 18, 20). Rollers 359 (FIGS. 17, 18) are journalled on pins at the lower end of the box-like structure 281 (FIG. 18). These rollers ride on the finished annulus 268 (FIG. 14) of the bail 241 when an LGT is suspended from the yoke 299 and stabilize the LGT at the same time reducing the resistance to its rotation. The cap 334 carries a key 360 which engages the keyways 262 in the knob 256 of the bail 241 (FIG. 15).

Figure 28:
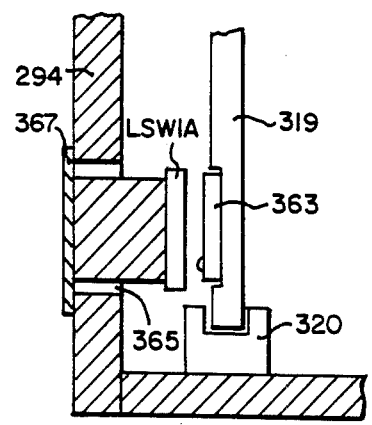
FIG. 28 is a fragmental view in transverse section taken along line XXVIII—XXVIII of FIG. 27.
Figure 26:
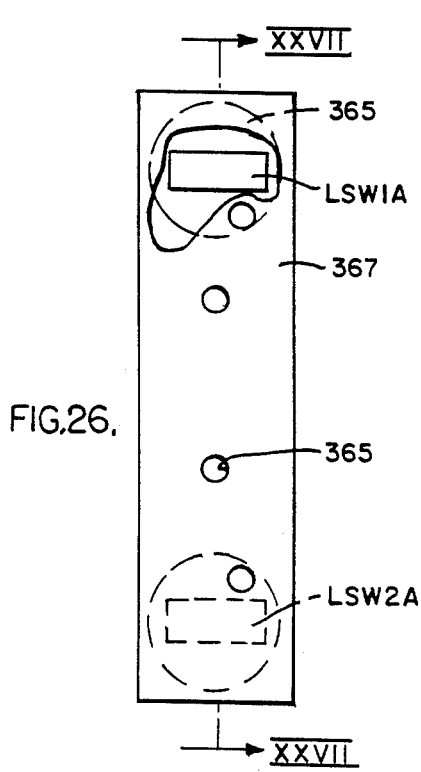
FIG. 26 is a fragmental view in side elevation showing the operation of limit switches involved in the operation of the clamp-and-index tool for raising the LGT during transverse positioning or during rotation.
Figure 27:
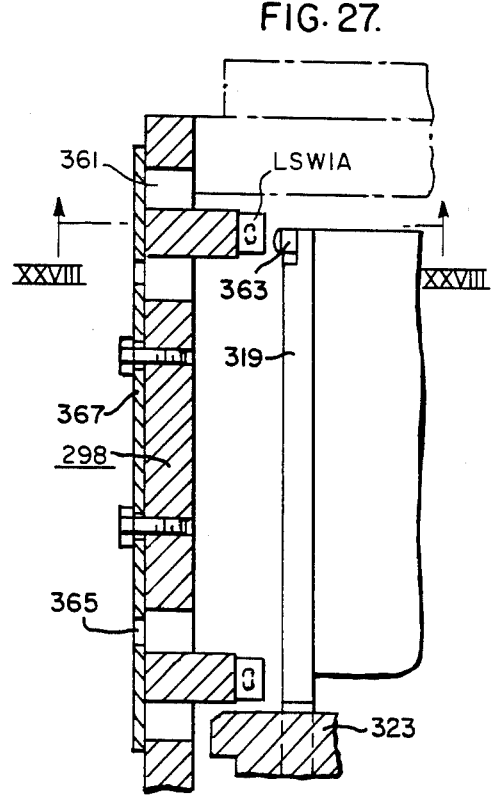
FIG. 27 is a fragmental view in longitudinal section taken along line XXVII—XXVII of FIG. 26.

The sensors for the vertical movement of the LGT, under the action of lift cylinder 311 (FIG. 18), are shown in FIGS. 26, 27, 28 (Sheet 22). Magnetically actuable reed switches LSW1A and LSW2A are suspended from the side wall 298 of the box-like structure 281 at the upper and lower limiting positions of the support which carries the rotary cylinder 317. The distance between these upper and lower positions is the distance over which the LGT may be raised or lowered. Typically this distance is 4.88 inches. The switches pass through holes 361 in the wall 298 and are actuable by a magnet 363 which is carried by slider 319. In FIG. 27, the magnet 363 is shown in the uppermost position in which switch LSW1A is actuated. Holes 365 (FIG. 27) are provided in the strip 367 (not shown in FIG. 18), which is secured to wall 294, for the lead wires (not shown) for the switches. These lead wires are connected to the robotic control center 187.

In the standby position of the clamp-and-index tool 211, the linkage 279 is retracted and the lift cylinder 311 suspends the yoke 298 in the raised position above pins 267 as shown near the center in FIG. 17 (except that the LGT 113 is shown connected to the yoke). After an LGT is positioned on outer pins 265, the lift cylinder 311 lowers the yoke 295 so that it is at the proper level to engage the knob 256 in bail 241. That the yoke is in proper position is determined by activation of a limit switch LSW2A. The linkage 279 is then actuated to move the slide 275 and the depending yoke 298 to the extended position (to the right as seen in FIG. 17) where the yoke 298 engages the knob 256 and the key 360 engages keyway 262. Yoke 298 moves between pins 267 and 265 because it is of smaller width than the distance between the pins. Next, the yoke 298 with LGT 113 attached to it is raised, linkage 279 is retracted and, when the slide 275 is in the fully retracted position, the yoke and LGT is lowered so that the pins 267 pass through the holes in flange 123 and the holes 269 in the bail 241 and the rollers 359 engaging finished annulus 268. When it is necessary to rotate the LGT, the yoke 298 and LGT are raised and the rotary cylinder 317 (FIG. 18) is actuated. During rotation the rollers 359 ride on the finished annulus 268 so that friction against rotation is minimized.

The lower deck 255 (FIGS. 21 and 22) includes a clamp assembly 373, for securing the LGT 113, and a pin-puller and expeller 375. The clamp assembly 373 includes a bottom plate 376 and a top plate 377. The top plate 377 is dowelled by dowel pins 374 (FIG. 22) to the plate 393 which forms part of the assembly that supports pipe 251. The bottom plate 376 is bolted to the top plate. The outer end of plate 393 defines a VEE to receive the flange 125 of an LGT extending vertically at the outer end of the top plate 377. Columns 380, backed up by plates 382 extend vertically on each side of the VEE. Cooperative with the VEE is a jaw 381 on an arm 383 which passes between top and bottom plates 376 and 377 and terminates in a slotted end 384 (FIG. 22). The arm 383 is moveable between plates 376 and 377 and is slidable along rails 386 and 388 (FIG. 21) bolted and dowelled to the bottom plate 376. A cam 385 passes through the slot in the end 384. The slot is shaped to permit the passage of the cam. The cam 385 is connected at its upper end to the piston rod 387 of a hydraulic cylinder 389 within pipe 251. Cam follower rollers 391, on horizontal pins in the arm 383, engage the cam 385. The cam is so shaped that when the piston rod 387 is moved downwardly to the position shown in FIG. 22, the jaw 381 of the clamp moves towards the VEE, clamping at LGT flange 125 between the VEE and the jaw, and when the piston rod is moved upwardly from the position shown in FIG. 22, the jaw moves away from the VEE releasing the LGT. The position of the cam followers 391 in the clamping setting is shown in full lines in FIG. 22 and in the unclamped position in broken lines.

Figure 29:
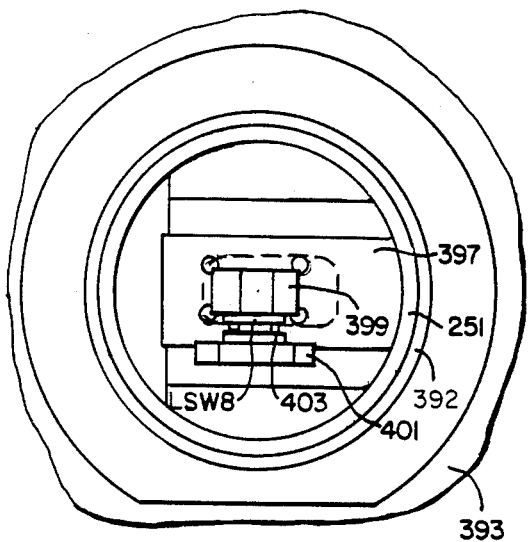
FIG. 29 is a fragmental plan view showing the limit switches for the LGT clamp of the clamp-and-index tool.

An annulus 392, truncated at one end, is secured to the pipe 251 at the lower end of the pipe (FIGS. 22, 29). The annulus 392 is bolted to plate 393 which is in turn dowelled to top plate 377. The plate 393 has a hole, centered on its longitudinal axis, affording clearance for the elbow of the cam 385. The cylinder 389 is mounted on a pedestal 396 on legs 395 on a plate 397 within pipe 251. This plate 397 is bolted to plate 393. The plate 397 has a rectangular hole within which the long straight section 399 of the cam 385 is a sliding fit. The cam 385 is guided and supported by plate 397.

Figure 32:
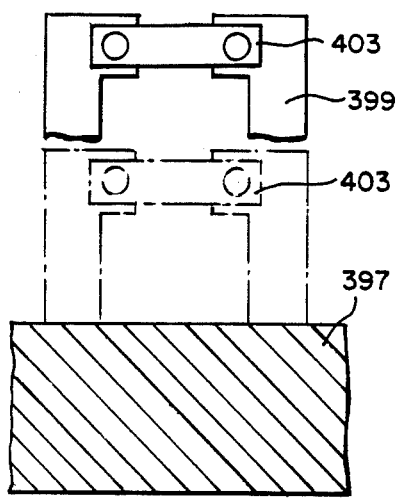
FIG. 32 (sheet 10) is a view in section taken along line XXXII—XXXII of FIG. 31.
Figure 31:
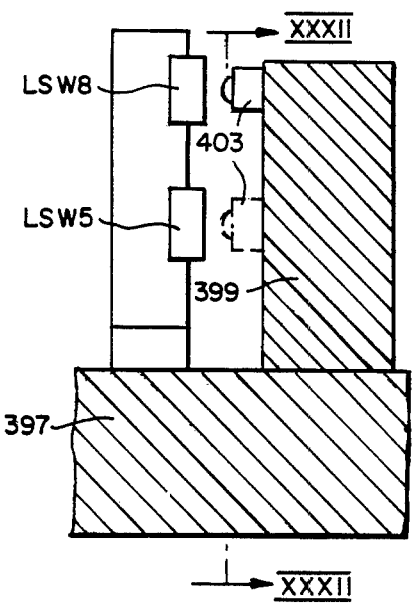
FIG. 31 (sheet 10) is a fragmental view in transverse section showing the switching magnet and its relationship to the responsive components of the limit switches.
Figure 21:
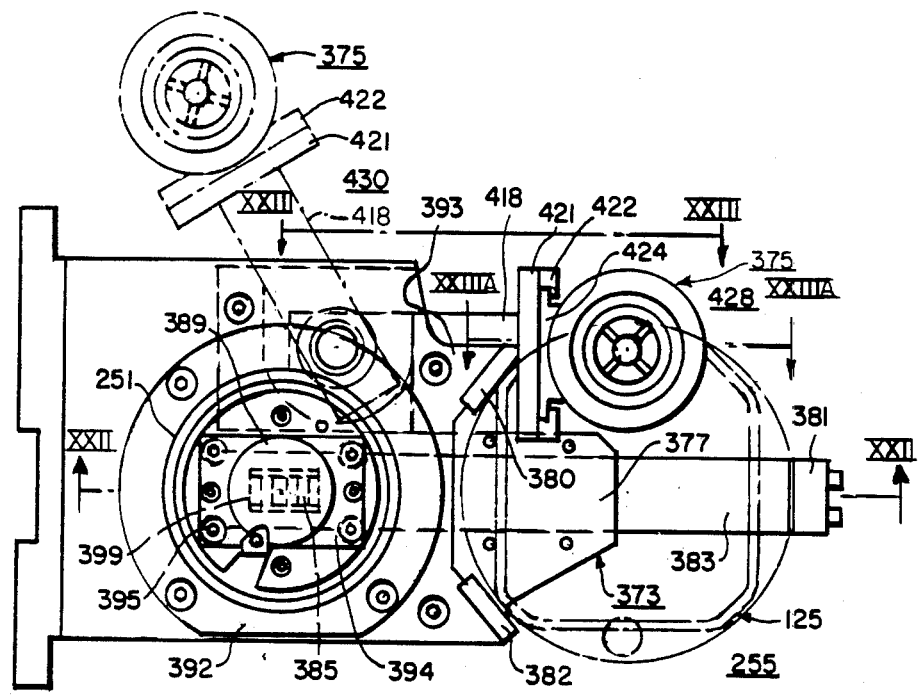
FIG. 21 is a plan view of the lower deck of the clamp-and-index tool.
Figure 22:
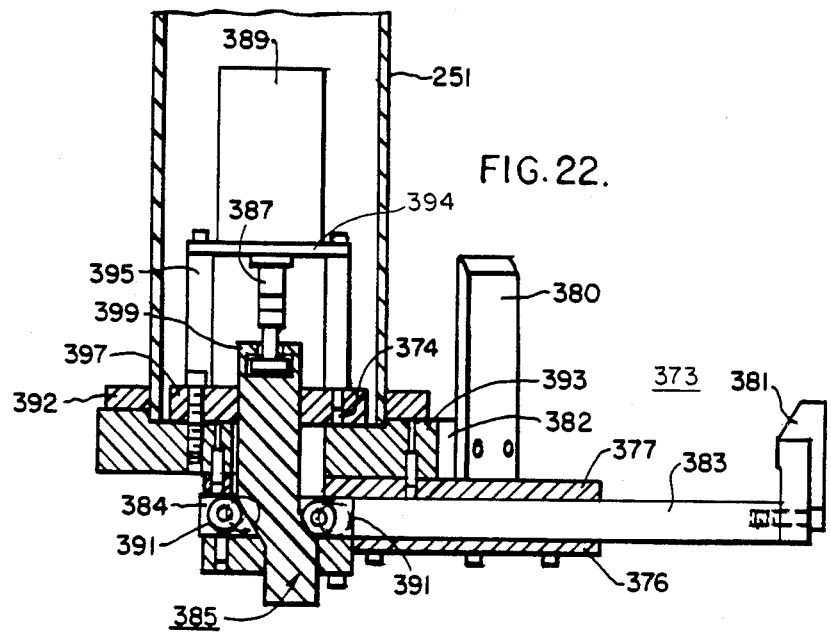
FIG. 22 is a view in transverse section with parts unsectioned in the interest of clarity taken along line XXII—XXII of FIG. 21.

The sensors for sening the status of the LGT clamp 373 are omitted in the interest of clarity from FIGS. 13, 21, 22 but are shown in FIGS. 29 (sheet 22), 30, 31, 32 (sheet 10). Magnetically actuable reed switches LSW5 and LSW8 (FIG. 31) are mounted on a bracket 401 bolted to plate 397. A magnet 403 is carried at the upper end of the straight section 399 of cam 385. In the lowermost position of the cam 385, in which position the LGT is clamped, the magnet 403 (broken lines FIGS. 31, 32) actuates switch LSW5. In the uppermost position of the cam, in which the clamping jaw 381 is retracted, the magnet 403 (full lines) actuates switch LSW8.

Figure 23:
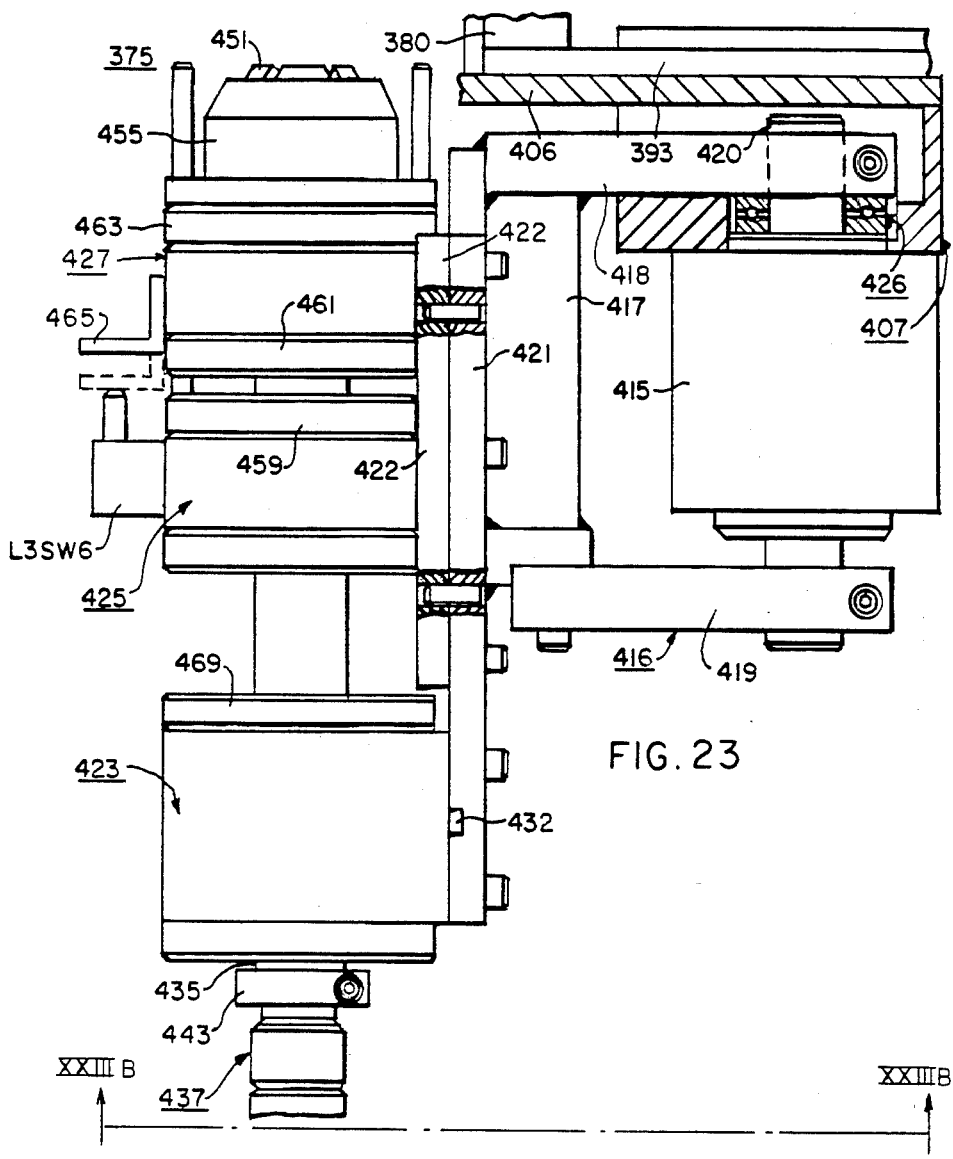
FIG. 23 is a fragmental view in side elevation taken along line XXIII—XXIII of FIG. 21 showing the pin puller and expeller and the mechanism for swinging the pin puller and expeller.
Figure 23B:
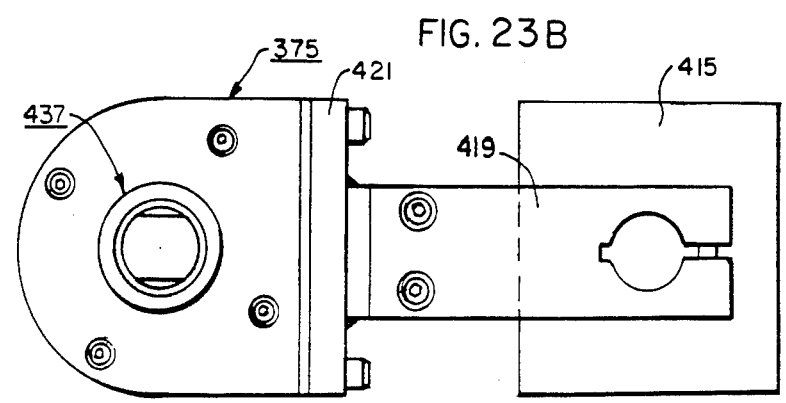
FIG. 23B is a view in end elevation taken in the direction XXIIIB—XXIIIB of FIG. 23.
Figure 23C:
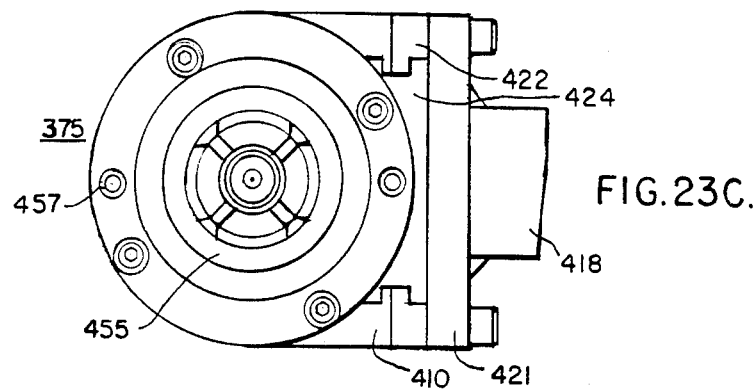
FIG. 23C is a view in end elevation taken in the direction XXIIIC—XXIIIC of FIG. 23A and showing the manner in which the pin-puller and expeller is connected to the arm on which it swings.

The pin-puller and expeller 375 is suspended with its long dimension vertical, pivotal about from an angle bracket 407 (FIGS. 13, 23) suspended from a plate 406 bolted to plate 393. A rotary hydraulic cylinder 415 is suspended from bracket 407. The cylinder 415 swings a generally U-shaped or yoke-shaped bracket 416. The bracket 416 has a vertical member 417 to which the upper horizontal member 418 is welded. Member 418 is sometimes referred to in this application as a "locator arm" (FIG. 84, Sheet 50; Page 55, line 34.). The lower horizontal member 419 is bolted to the vertical member. The shaft 420 of the cylinder is clamped to the horizontal members 418 and 419 (FIGS. 23, 23A, 23B, 23C). The vertical member 417 carries a plate 421. Guide bars 422 are bolted to the plate 421. The pin-puller and expeller 375 is supported from this plate 421. A part of the pin-puller and expeller is moveable along the plate 421. For this purpose, vertically aligned slide 424 (FIG. 21) slidable in guide bars 422 is connected to the pin-puller and expeller. The bracket 416 and the pin-puller and expeller 375 are supported by, and are rotatable in, thrust bearings 426 mounted in bracket 407. The moveable race of the bearing 426 is connected to horizontal member 418 and the fixed race to bracket 407. As the shaft 420 rotates, it carries the bracket 416 and the pin-puller and expeller 375 with it between an "in" position, 428 (FIG. 21), in which the pin-puller and expeller is under the pin to be extracted and may be operated to extract the pin, and an "out" position 430, shown in broken lines, in which the pin-puller and expeller can discharge an extracted pin into the trash chute 413 (FIG. 23F). The horizontal sides 418 and 419 of the bracket 407 are sometimes designated as the "radical locator arm" (e.g., see FIG. 94A).

Figure 23A:
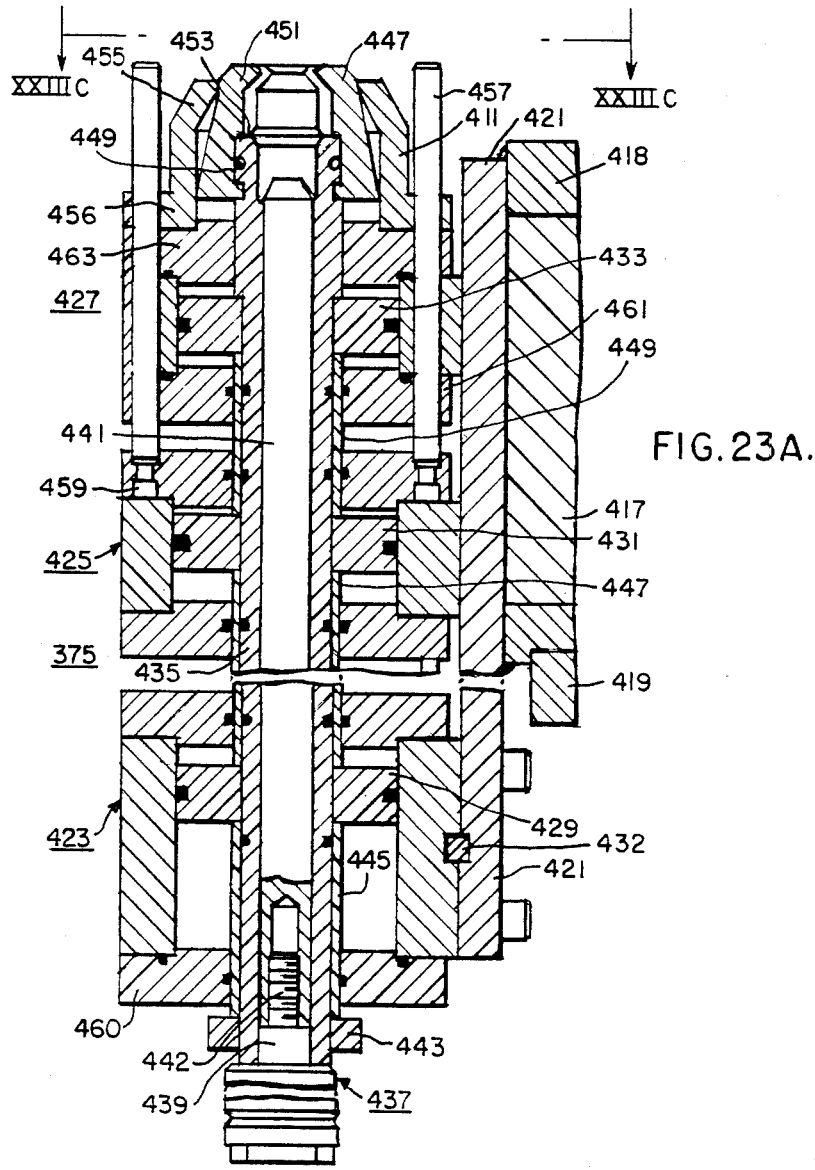
FIG. 23A is a view in longitudinal section taken along lines XXIIIA—XXIIIA of FIG. 21.

The pin-puller and expeller 375 includes a plurality of hydraulic cylinders 423, 425 and 427 (FIG. 23A). The cylinder 423 is keyed to plate 421 by key 432 so that it is not moveable vertically. The pistons 429, 431 and 433 (FIG. 23A), respectively, of the cylinders are connected to a shaft or actuator 435. Another hydraulic cylinder 437 is connected to the lower end of the actuator 435. The piston rod 439 of cylinder 437 is connected to the expeller 441, which is slideable within the actuator and secured by a spring pin 442. A collar 443 is threaded onto, and secured to, the actuator 435 just inwardly of the cylinder 437. The collar 443 is abutted axially by a spacer 445 between the collar and the piston 429 of cylinder 423. There are also spacers 447 and 449 between the piston 429 and the piston 431 and between the piston 431 and piston 433. Near its upper end, the actuator 435 carries a collet whose jaws 451 are urged outwardly by a spring ring 453 disposed in a slot near the tip of the actuator. A flanged annular cam 455 is mounted by its flange 456 on the end cap 457 of cylinder 427. The outer surfaces of the jaws 451 of the collet engage the cam internally. These surfaces are vertically tapered so that when the cam 455 is moved downwardly the collet is closed and when the cam is moved upwardly the collet is opened. Pins 457 are supported on the top in the cap 459 in of cylinder 425. The pins 457 pass through and are slideable, cylinder 427 and its end caps 461 and 457 and in the flange 456 of cam 455.

A bracket 465 (FIG. 23) is mounted on cylinder 427. A limit switch L3SW6 is mounted on cylinder 425 just below bracket 465 (see also FIG. 33, sheet 23). When cylinder 427 is moved downwardly with respect to its lowermost position, switch L3SW6 is actuated. In the relative up position of cylinder 427, the cylinder 427 and 425 are separated so that switch L3SW6 is unactuated.

Figure 23D:
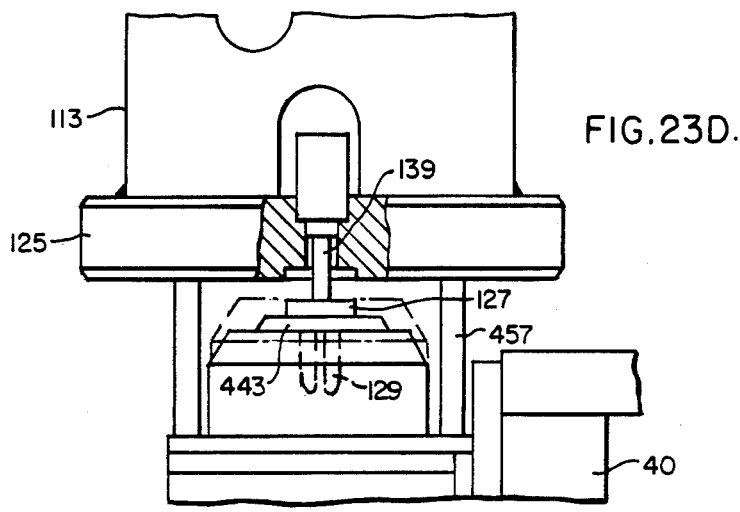
FIG. 23D is a fragmental view in side elevation showing the manner in which the pin is grasped by the pin puller.
Figure 23E:
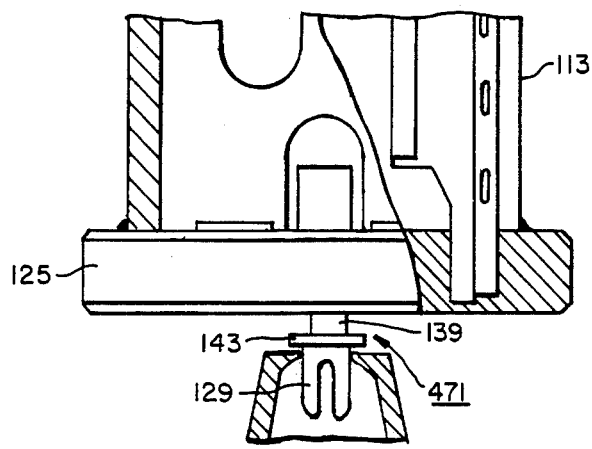
FIG. 23E is a fragmental view predominantly in side elevation showing the manner in which the pin is extracted from the LGT.
Figure 23F:
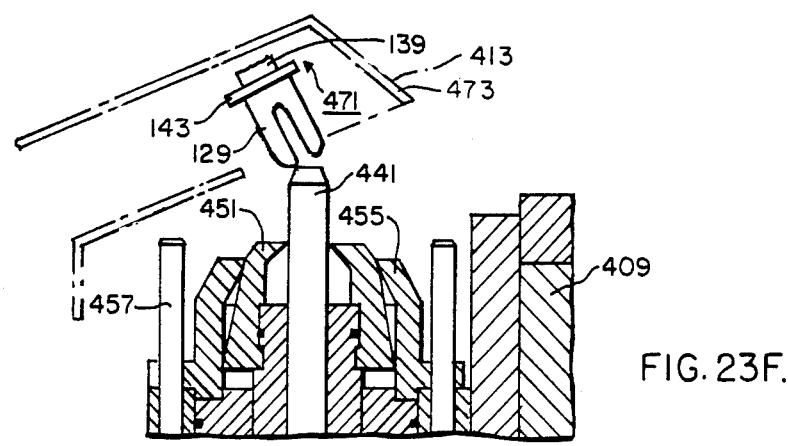
FIG. 23F is a fragmental view predominantly in longitudinal section showing the manner in which the expeller expells the pin into the trash chute.
Figure 24:
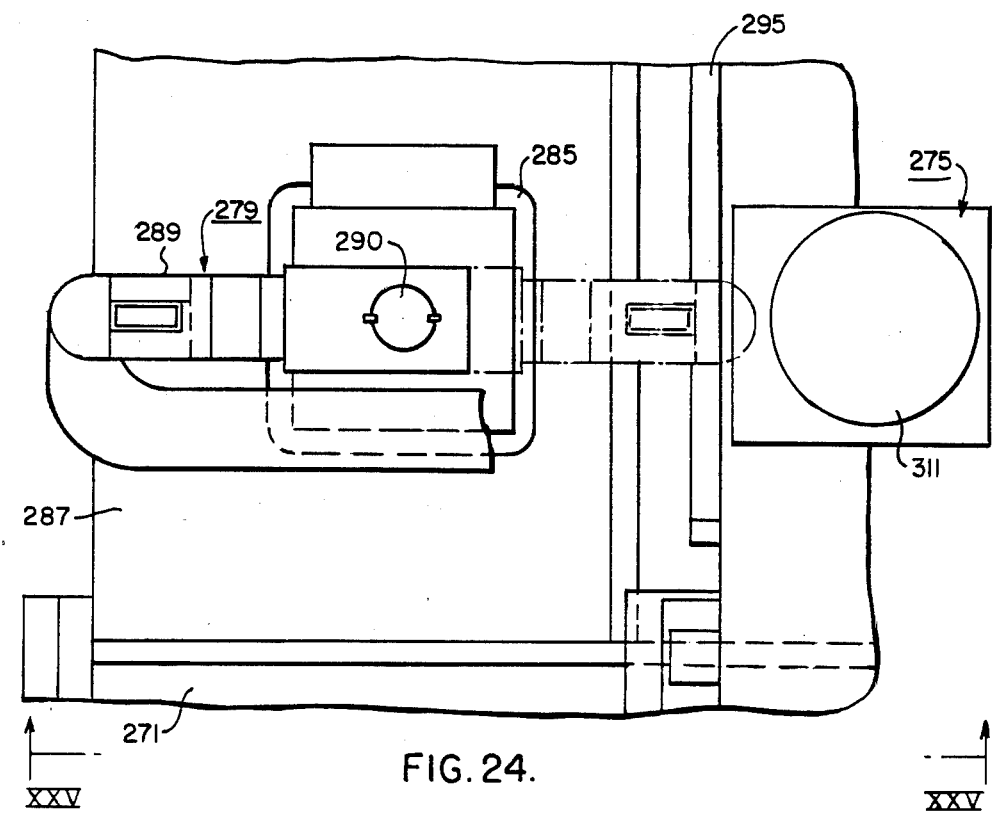
FIG. 24 is a fragmental plan view showing the operation of the linkage of the upper deck of the clamp-and-index tool particularly directed to the actuation of the limit switches involved in this operation.

In the practice of this invention the pin-puller and expeller 375 is swung on yoke-shaped bracket 416 and support 417 to the "in" position 428 under the old pin 127a (FIG. 23D) to be replaced. Fluid is supplied under piston 429 of cylinder 423 is raise this piston to its uppermost position. Cylinder 423 remains fixed because it is keyed to plate 421 but actuator 435 and the parts connected to it, including cylinders 437, 425, 427, jaws 457, cam 455, and pins 451 are raised to a position in which the jaws 451 encircle shank 139 of pin 127 just below the flange 143 (FIGS. 5, 23E). At this point bracket 465 is in the full-line position (FIG. 23) where switch L3SW6 is unactuated.

Figure 33:
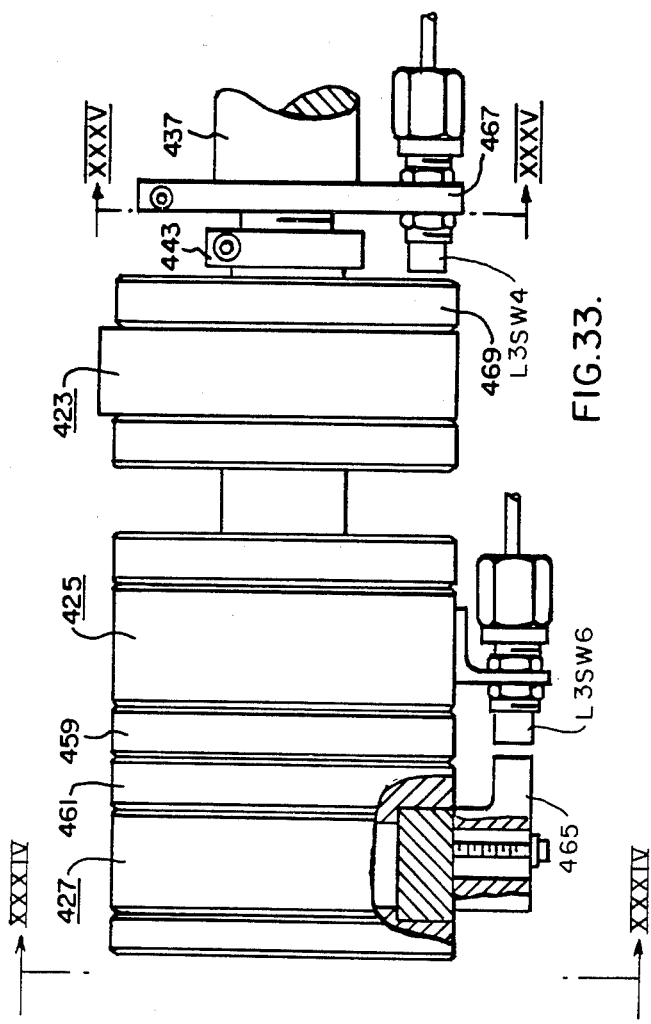
FIG. 33 (sheet 23) is a fragmental view in side elevation showing the limit switches for the pin puller of the clamp-and-index tool.
Figure 34:
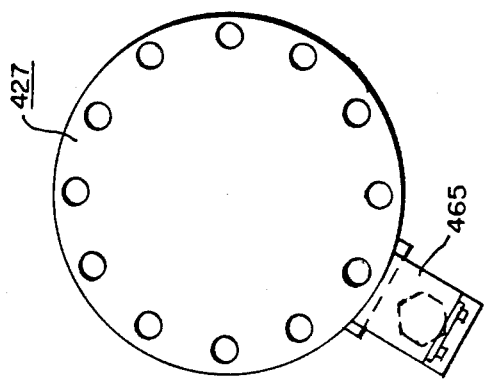
FIG. 34 is a fragmental view in end elevation taken in the direction XXXIV—XXXIV of FIG. 33.
Figure 35:
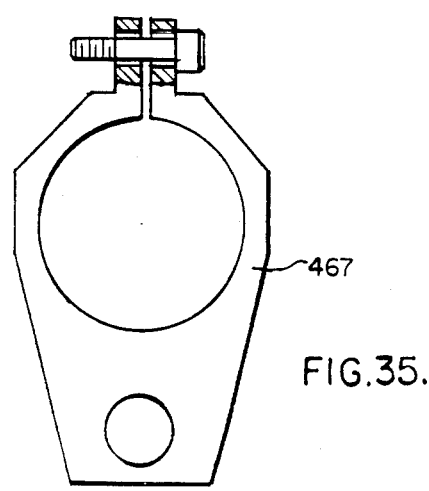
FIG. 35 is a fragmental view in transverse section taken along line XXXV—XXXV of FIG. 33.

A switch L3SW4 is mounted on a clamp 467 (FIGS. 23, 33, 35, Sheet 24) secured to the top of cylinder 437 (switch shown in FIG. 33 but not in FIG. 23). When the piston 429 of cylinder 423 is in the retracted (down) position, switch L3SW4 is retracted from the end cap 469 of cylinder 423. When the piston 429 is raised, switch L3SW4 is near the end cap (0.10 inch typically) and the switch is actuated indicating that the jaws 451 are near the pin 127a to be replaced.

Next pressure is applied below piston 433 of cylinder 427. Piston 433 is held in the up position by cylinder 423 and cannot move upwardly. By cylinder 427 moves downwardly moving cam 455 downwardly and causing the jaws 451 of the collet to grip the pin 127a under pressure. Bracket 465 is still above the broken line position and switch L3SW6 is unactuated. Next pressure is applied above piston 431 of cylinder 425. Piston 431 cannot move downwardly but cylinder 425 moves upwardly causing pins 458 to engage and exert upward pressure on flange 125 of LGT 113 (FIGS. 5, 23D, broken line position). A downward pull is exerted on pin 127.

Now the MDM 213 (FIGS. 9, 42) is brought near the old nut 145 which secures pin 127a and is enabled. The shank 139 is severed (FIG. 23E). Cylinder 427 urged downwardly and cylinder 425 urged upwardly approach each other actuating switch L3SW6 and signalling to the robotic control center 187 that the fragment 471 (FIG. 23E) of pin 127a has been severed. The burning action of the MDM is stopped and the burning of the LGT 113 is precluded. Since the LGT is highly costly (typically $80,000), this is an imperative.

The fluid in cylinder 423 is dumped when the nut 145 and pin 127a are burned through. Now pressure is applied above piston 429 and the pin-puller and expeller 375 is removed from the LGT with the fragment 471 of the pin 127a held by the jaws 451. The pin-puller and expeller is swung to the "out" position (430, FIG. 21). The piston 437 is actuated to raise the expeller 441. The expeller injects the burned-away fragment 471 of the pin 127a into the trash chute 413 (FIG. 23F).

Figure 36:
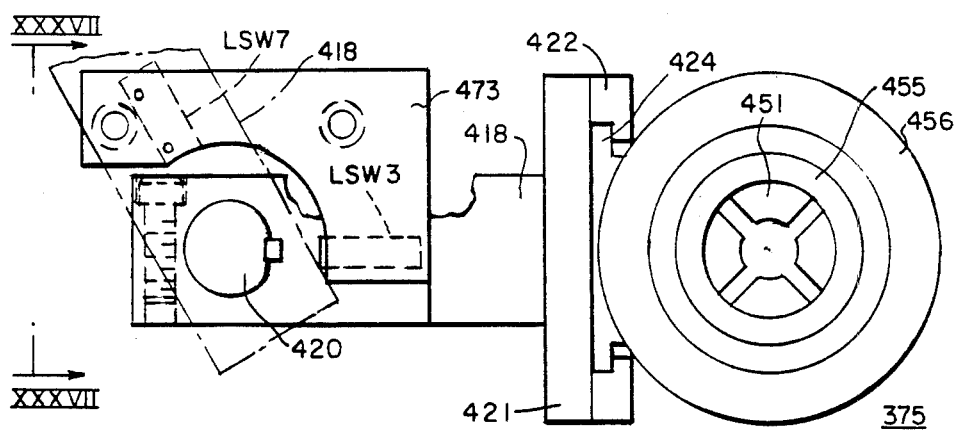
FIG. 36 is a fragmental plan view showing the limit switches involving the movement of the arm which carries the pin puller.
Figure 37:
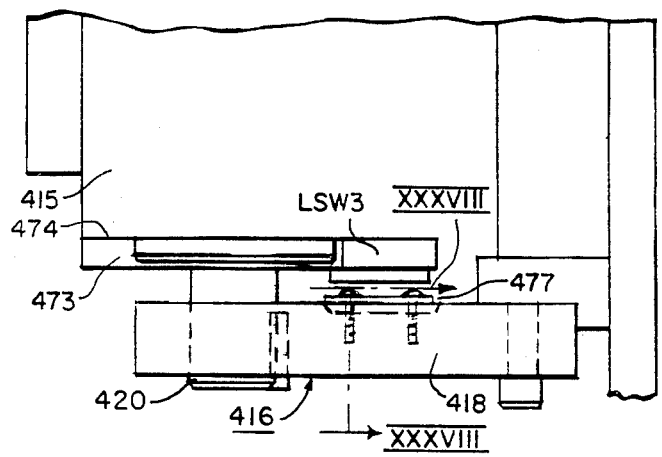
FIG. 37 is a fragmental view in end elevation taken in the direction XXXVII—XXXVII of FIG. 36.
Figure 38:
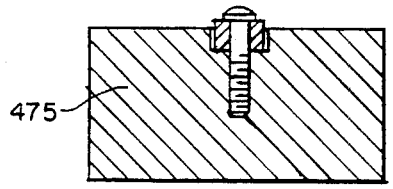
FIG. 38 is a fragmental view in transverse second along line XXXVIII—XXXVIII of FIG. 37.

The sensors that signal when the pin-puller and expeller are fully in the "in" position, to enable the start of the pulling operation, and in the "out" position, to enable the discharge of the pin fragment 471 into the trash chute 413, are shown in FIGS. 36-38 (Sheet 24). A plate 473 of generally L shape is bolted to the top 474 of hydraulic cylinder 415. Beneath plate 473, switch LSW3 is mounted near one end and switch LSW7 near the other end. Switch LSW3 has the shape of an elongated rectangle whose long sides are perpendicular to the sides of the one end of plate 473. Switch LSW7 is also in the shape of an elongated rectangle but its long sides are at an angle to the other end of plate 473 so that they are parallel to the horizontal member 418 of yoke 416 in the "out" position. On the upper surface of horizontal member 418 there is a magnet 477. In the full "in" position 428 (FIG. 21) of arm 418, the magnet 477 is spaced a short distance (typically 0.09 inch) from switch LSW3 actuating this switch. In the full out position of arm 418, the magnet 477 is spaced a short distance from switch LSW7 actuating this switch. Switches LSW3 and LSW7 are connected to the robotic control center 187 (FIG. 12) signalling that the arm 418 is in the "in" or "out" position.

The operating personnel can determine whether or not there is a pin 127a in an LGT 113 either by direct vision or by closed TV. There are also occasions when it is known that the pin is not present. If no pin is seen or it is known that no pin is present, the expeller 441 is raised after piston 429 raises the pin-puller and expeller to the position just under the part of the LGT where the pin had been. The expeller is tapered at the tip and enters the hole 480 (FIG. 5) in the flange 125 in which the pin 127a was lodged to center the LGT. During a replacement operation an LGT is rotated several times through 180° so that it is positioned properly for the action of each tool in its turn. On each occasion the LGT is centered by the expeller.

The pin 127a to be placed is removed by an electric arc produced by the MDM 213. Typically, the electric-arc producing apparatus may be bought from Tooling Specialists, Inc. of Latrobe, PA with vital parts procured from Electronic Mfg. Co. of 5270 Geddes Rd., Ann Arbor, Mich., for assembly by Specialists. The removal is effected by the electric arc between the nut 145 (FIG. 5) and the graphite electrode 229 (FIGS. 9, 9A, 44) and continues until the shank 471 of the pin 127 is penetrated. The internal thread of the nut 145 begins a short distance (typically 0.040 inch) above its bottom. The nut is penetrated in this region by the electric arc so that the pin fragment 471 free of the nut is released to be disposed in the trash chut 413. During the cutting operation the arc potential is between the electrode 229 which is electrically "hot" and the pin 127a which is grounded through the pin-puller and expeller 375. (See FIG. 23A where the cam 455 is shown grounded.)

The MDM 213 includes a supporting block 481 (FIG. 42 Sheet 25) which is mounted on a carriage 483. The carriage 483 is moveable horizontally on tracks 485 by a hydraulic cylinder 487 mounted on a plate 489. The plate 489 is moveable vertically on the tracks 227 (FIGS. 9, 9A) by electric motor 223 through chain 225, to the operator's platform so that the electrode 229 may be replaced.

Figure 42:
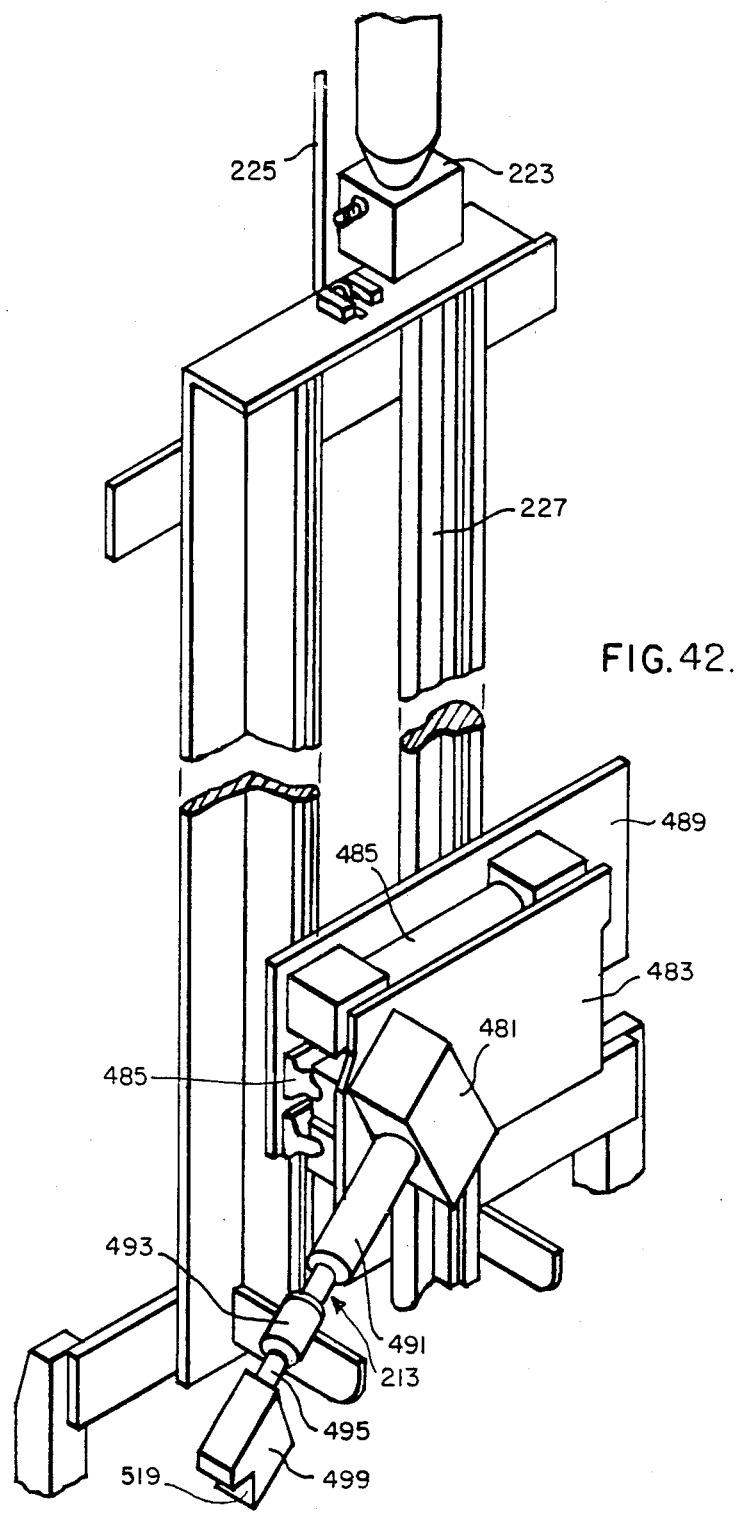
FIG. 42 is a simplified view in isometric of the MDM, with parts removed for clarity, showing the relationship of the principle components of the MDM.
Figure 45:
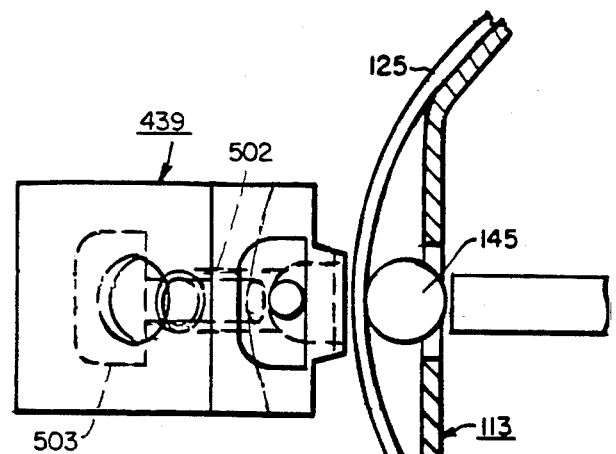
FIG. 45 (Sheet 29) is a plan view taken in the direction XLV of FIG. 44 but omitting the electrode.

For supporting the electrode 229 the MDM includes a magnetic spindle 491 (FIGS. 42, Sheet 26, 43, Sheet 27 43A, Sheet 28 44, Sheet 29). A hydraulically operatable chuck 493 extends from the spindle. The chuck 493 secures an electrode holder 495, typically of aluminum, to which the electrode 229 (FIG. 45) is connected. The electrode holder 495 has a flange 497. The spindle 491 is actuated hydraulically through hoses 498 to cause the electrode to vibrate axially (typically over an amplitude of about 0.015 inch).

The electrode 229 and its holder are driven by a sealed electric servo motor (not shown) controlled through console and panel 194 (FIG. 8). Limit switches (microswitches) 2LS, L4SW16 and 1LS (FIG. 43) are mounted on the support or head 481 along the electrode holder 495. Switch 2LS is normally closed and is opened by actuator 494 carried by electrode holder 495. Initially, the electrode 229 is driven at a higher speed. Once the electrode reaches the position where the arc is fired, the speed is reduced by opening of switch 2LS and the advance of the electrode is controlled by the servo motor in dependence on the current drawn by the disintegrating arc. Limit switch 1LS is also normally closed. It is opened by actuator 496 carried by electrode support 495 when this support reaches the limit of its upward travel. Limit switch L4SW16 is normally open. It is closed by actuator 498 just when the arc has penetrated into the nut 145 after severing the pin 127a but before it impinges on, and damages, the flange 125 of the LGT 13.

Figure 43A:
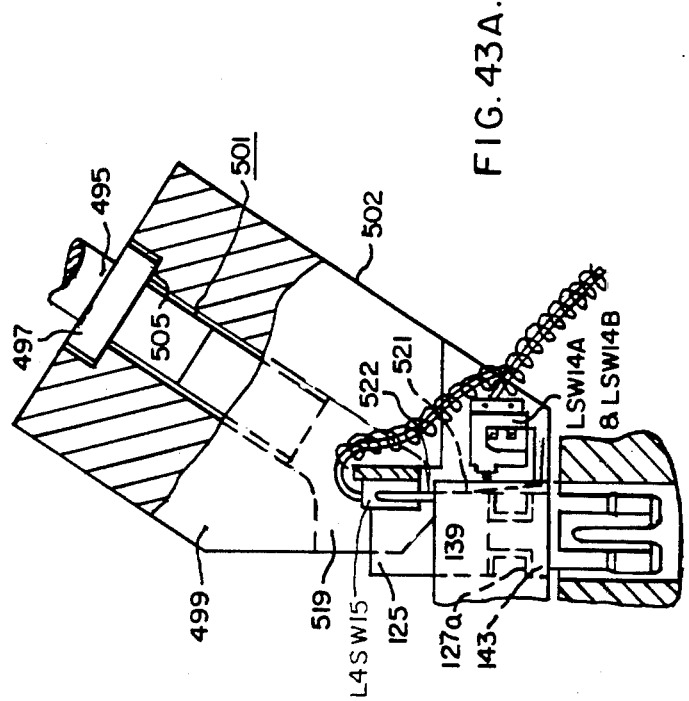
FIG. 43A (Sheet 28) is a fragmental view partly in longitudinal section showing the manner in which the split-pin assembly to be replaced is positioned with respect to the MDM.
Figure 44:
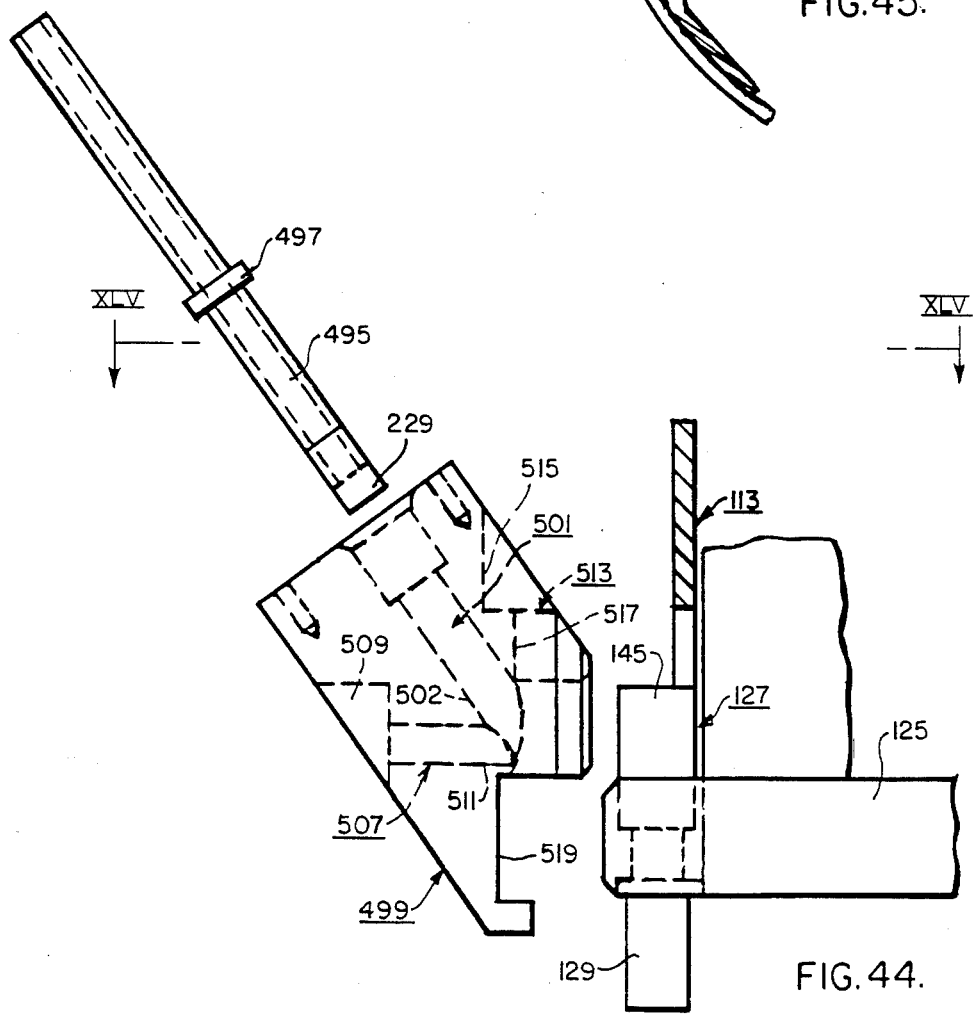
FIG. 44 (Sheet 29) is a fragmental exploded view in side elevation of the electrode supporting structure of the MDM.
Figure 47:
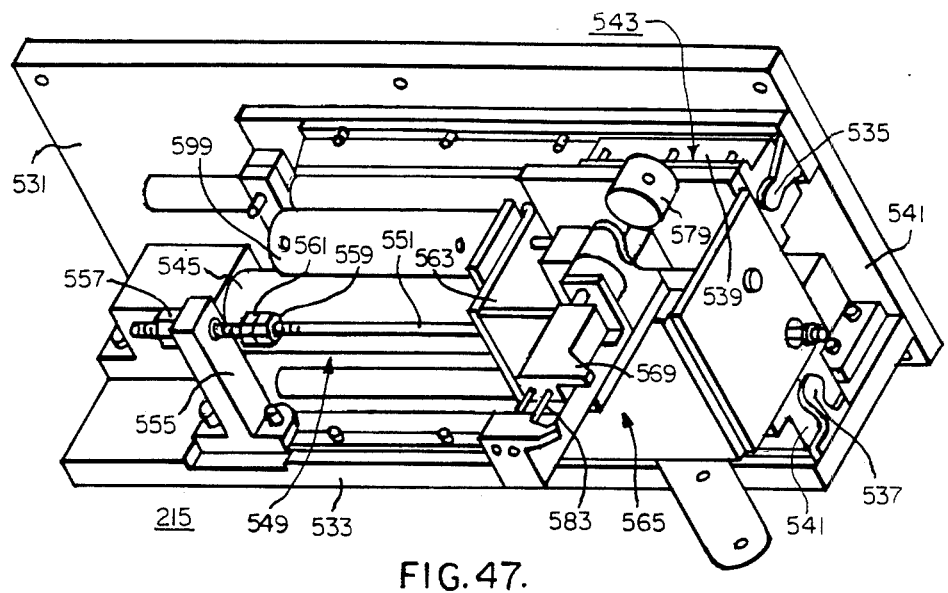
FIG. 47 (Sheet 30) is a simplified view in isometric of the pick-and-put tool with parts omitted for clarity.

For positioning the electrode 229 to sever the nut 145, a guide block 499 of a non-metallic material, such as glass, is provided (FIGS. 42, 43A, 44). This block has an opening 501 (FIG. 44) through which the electrode 229 on its holder 495 penetrates. The block 499 is secured to the electrode assembly and is moveable with this assembly. The block is positioned so that the electrode 229 and holder are aligned with the opening 501. Within the block the opening 501 has a constricted diameter portion such as to preclude excessive lateral movement of the electrode 229 but which permits free axial movement of the electrode. The entrance 503 to this opening is expanded to accommodate the flange 497. The shoulder 505 formed at the junction of the expanded entrance and the constricted part of the opening acts as a stop for the electrode and holder when the flange 497 abuts this shoulder. The block 499 also has an opening 507 (FIG. 44) which may be described as generally horizontal. This opening 507 also has an expanded portion 509; its constricted portion 511 terminates and opens into the region where the metal-disintegrating arc is produced. The block 499 also has an opening 513 generally at right angles to the opening 507. This opening 513 has an expanded entrance 515 and a constricted portion 517 which also terminates in the region where the arc is produced. A vacuum collector (not shown) is connected to openings 507 and 513.

As the arc burns it progressively melts small quantities of metal which are quenched and flushed from the region of the arc by a stream of water which is being pumped out of the end of electrode 229. The electric arc causes the water to dissociate and form gases which would bubble to the surface and produce a radioactivity contamination problem. The gas and debris generated are sucked out through the opening 507 and 513 by the vacuum collector. There may be additional openings such as 507 and 513.

The guide block 499 has a cavity 519 dimensioned to receive the LGT flange 125 and the split pin 127a, mounted on the flange, in the precise position for separating the pin fragment 471 from the remainder of the pin and nut 145 (FIG. 43). Limit switches L4SW14A (FIG. 43A) and L4SW14B are positioned in the lower part of the block with their actuating springs 521 extending into the cavity (L4SW14B is on the opposite side from L4SW14A and is not visible). These switches are actuated by the flange 125 carrying the pin 127 to be replaced signalling that the block 499 is in proper horizontal position; i.e., that block 499 is properly seated against the flange 125 laterally. Both switches L4SW14A and 14B perform the same function; this redundancy is present in the interest of reliability. Switch L4SW15 is mounted on the wall of cacity 519 with this actuating mechanism 522 positioned to be actuated by the flange 125 when the block is properly seated on the flange, i.e., on the upper surface of the flange proximate to the upper counterbore. The actuation of switches L4SW14A, L4SW14B and L4SW15 causes lamps on the MDM panel 194 to be energized, signalling that the LGT and pin 127a are properly positioned for severance.

Shoulder 505 (FIG. 44) is so positioned that it is engaged by flange 497 just when the pin 127a has been penetrated but the arc has not reached the flange. Typically, the flange 497 engages the stop 505 with the arc about 0.08 inch from the top of the flange 125. Limit switch L4SW16 (FIG. 43) is actuated just before the flange 497 is stopped by shoulder 505. The limit switch L4SW16 serves as an additional precaution against damage to the LGT.

Figure 50:
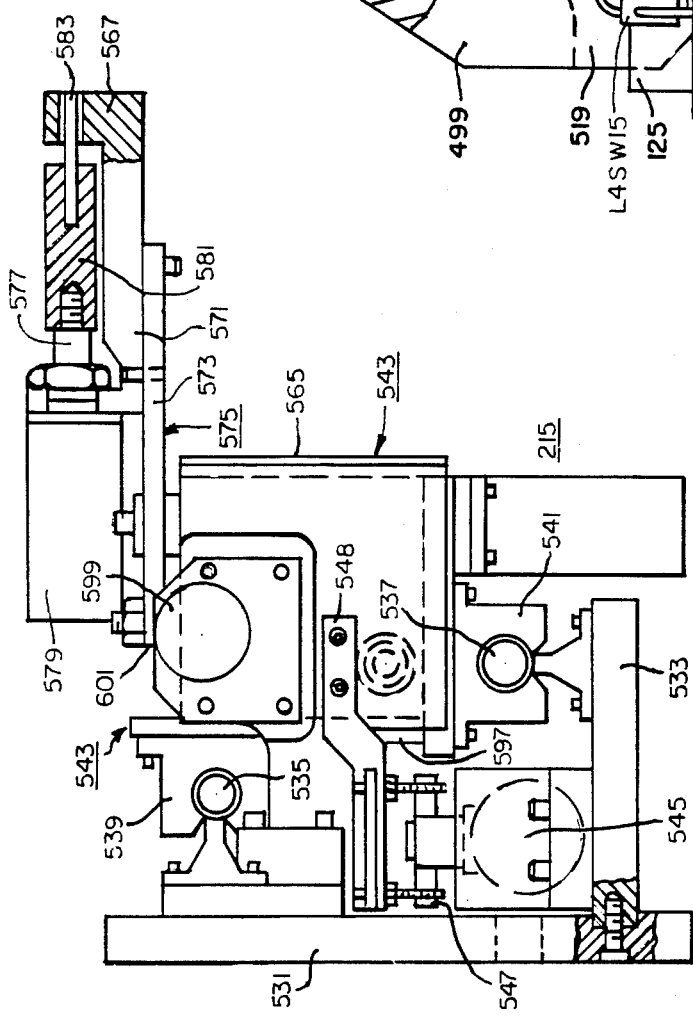
FIG. 50 (Sheet 28) is a view in end elevation and partly in section taken in the direction L of FIG. 48.

As viewed from above, the pool 183 the pick-and-put tool 215 (FIGS. 47–50, Sheets 28, 30, 31, 32) includes a vertical base plate 531 and a horizontal plate 533. These plates form an angular support, the horizontal plate resembling a shelf. Guide rails 535 and 537 (FIG. 5D) are mounted near the upper end of plate 531 and near the outer end of plate 533. A pillow block 539 and 541 is slideable along each rail. The pillow blocks 539 and 541 support a carriage 543 on which the mechanism of the pick-and-put tool are mounted. The carriage 543 is moveable along the rails 535 and 537 (horizontally) by a transport cylinder 545 through a yoke 547 and a drive bracket 548 (FIG. 50). The transport cylinder 545 is supported on horizontal plate 533. The inward and outward movements of the carriage 543 are limited by a stop assembly 549. This assembly 549 includes a horizontal bar 551 threaded at the outer end and having a collar 553 (FIG. 49) at the inner end. The "inner end" means the end towards the carriage 543; the "outer end" means the end away from the carriage. The bar 551 is threaded onto a bracket 555 secured to horizontal plate 533 and locked by nut 557. The position of the bar 551 on the bracket 555 is adjustable. Inwardly of the bracket 555, the bar 551 carries a nut 559 which is adjustably threaded along bar 551 and locked by nut 561. The outward movement of the carriage 543 is limited by the abutment of the collar 543 in the inner surface of a wall 563 of a box-like structure 565 on the carriage. The inward movement of the carriage 543 is limited by the abutment of the outer surface of wall 563 on nut 561. Typically, the carriage moves over a range of about 11 inches.

Figure 48:
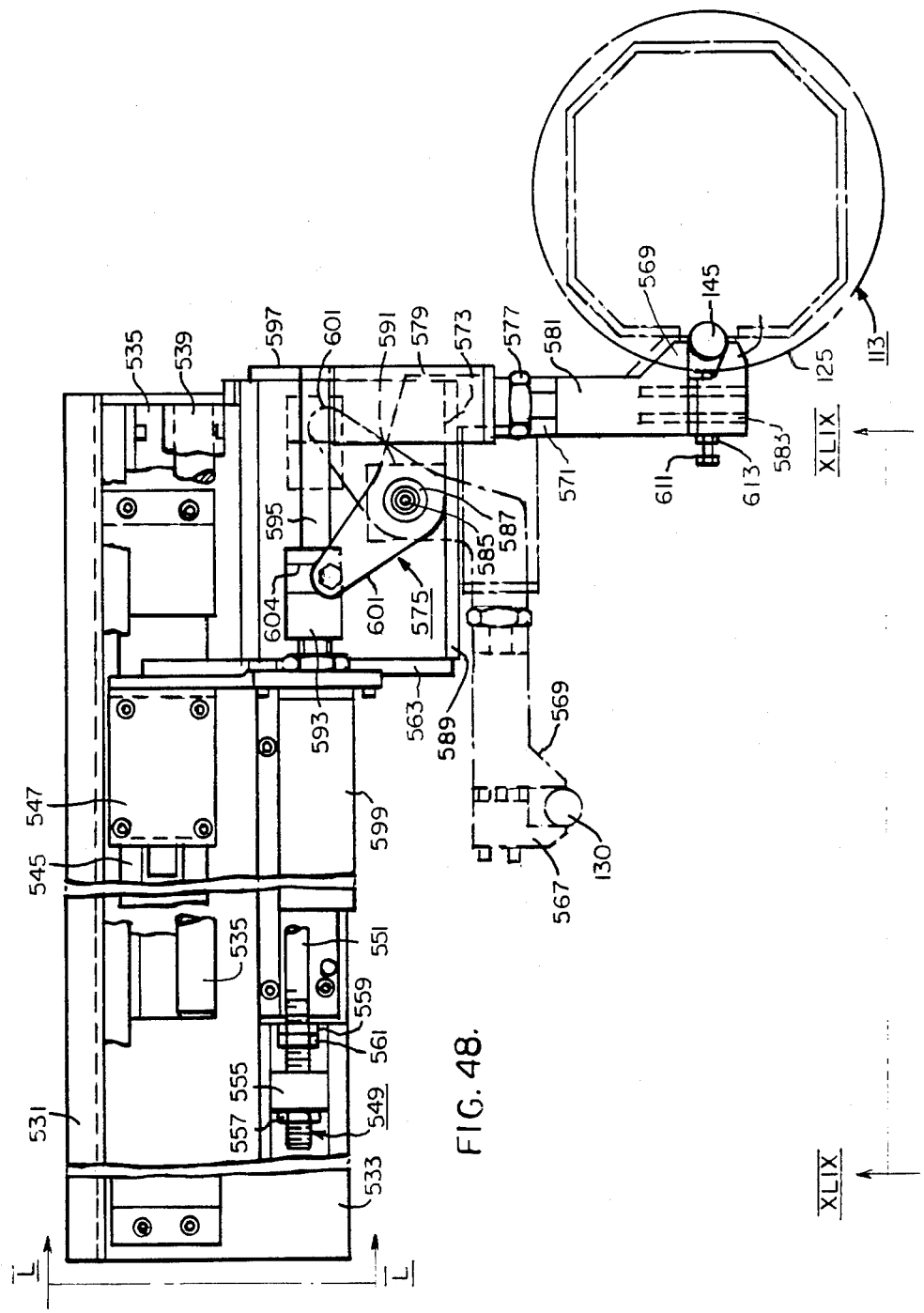
FIG. 48 (Sheet 32) is a view, in side elevation and partly in section of the pick-and-put tool.
Figure 49:
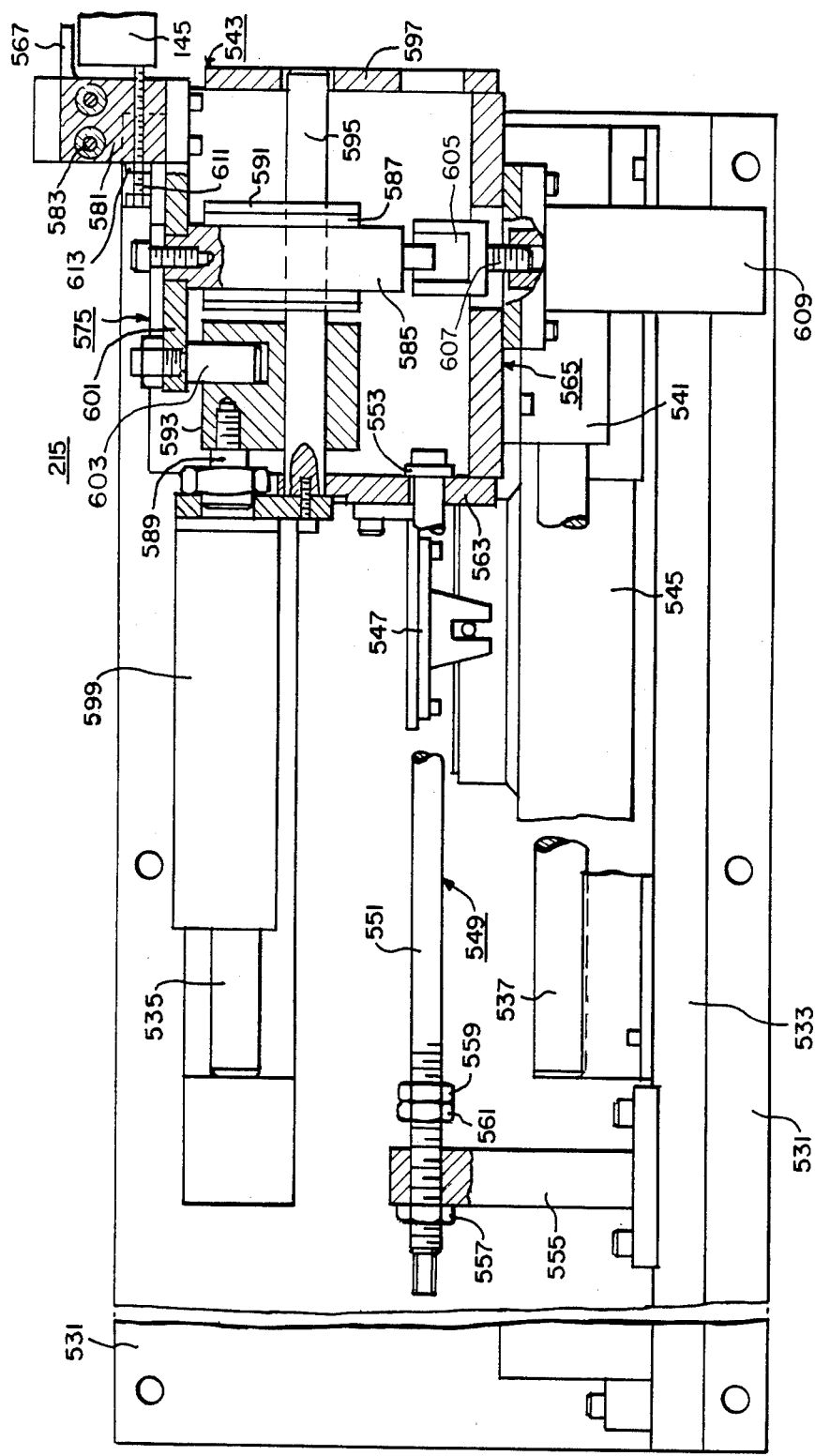
FIG. 49 (Sheet 31) is a plan view of the pick-and-put tool taken in the direction XLIX—XLIX of FIG. 48.

The pick-and-put tool includes a fixed jaw 567 and a moveable jaw 569 (FIGS. 48, 50). These jaws are closed to engage a fragment of an old nut 145 to be removed or a new nut 163 to be installed. The fixed jaw 567 extends from an arm 571 which is mounted on the outer arm 573 of a pivotal bell lever 575 (FIGS. 48, 49). The moveable jaw 569 extends from a slide 581 which is slideable by the piston rod 577 of cylinder 579. The slide 581 carries pins 583 which are slideable in bushings in the arm of the fixed jaw 567, towards and away from the fixed jaw (FIG. 49). The bell lever 575 is bolted at its elbow to a pivot shaft 585 (FIGS. 48, 49) rotatable on a bearing 587 supported from a wall 589 of box structure 565 by a block 591. The bell lever 575 is pivoted by movement of guide 593 (FIG. 48) along guide bar 595 which is supported on wall 563 and the opposite wall 597 of the box-like structure 565. Guide 593 is slideable along guide bar 595 by the piston rod 598 of cylinder 599. Near its outer end, the outer arm 601 (FIG. 48) of lever 575 carries a slide 603 which slideably engages a slot 604 (FIG. 49) in guide 593 to pivot the lever horizontally towards and away from an LGT flange 125 or a hopper 218 as the guide 593 moves along guide bar 595. Pivot shaft 585 is connected through a coupling 605 to the piston rod 607 of lift cylinder 609 which raises the bell lever 575 and the jaw assembly connected to it when it is necessary to clear walls of the flange 125 or of the hopper 218. The horizontal swing of the jaws 569 and 567 to the LGT 113 or to the hopper 218 is limited by a bolt 611 (FIG. 49) which is threaded into the arm 581 of the fixed jaw. The bolt 611 is locked in any position by a nut 613.

Figure 56:
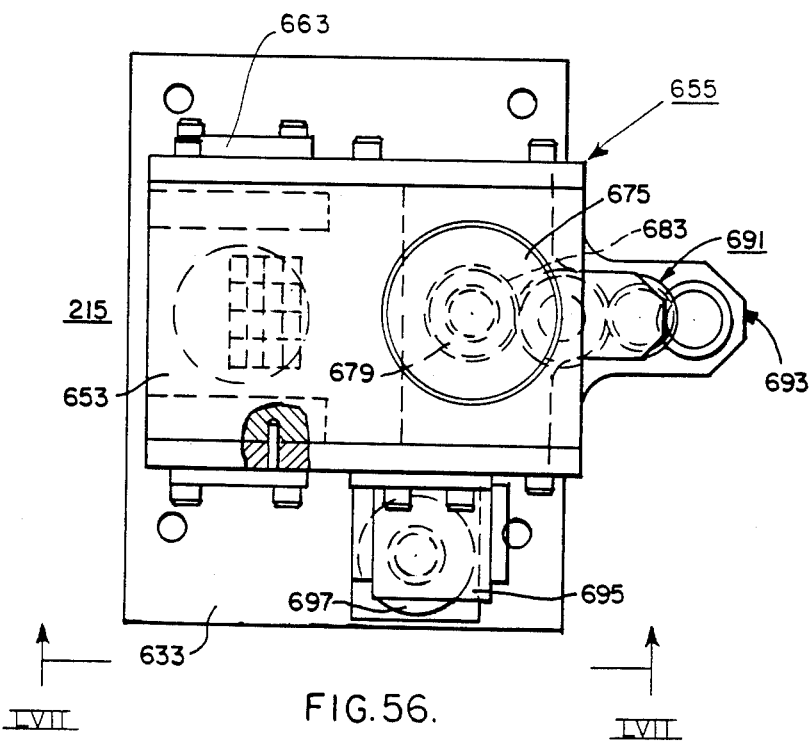
FIG. 56 (Sheet 2) is a plan view of the brush tool.
Figure 9:
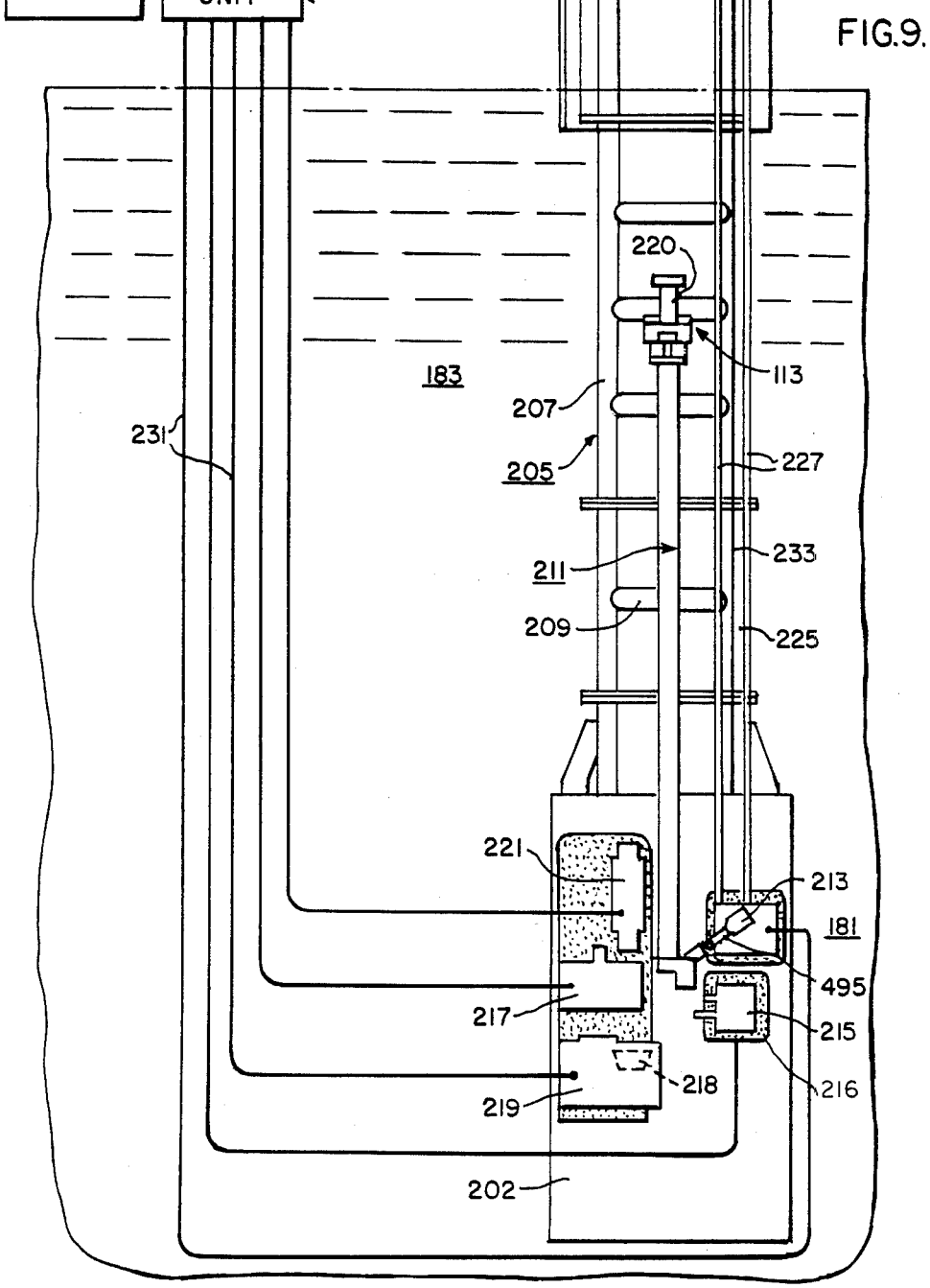
FIG. 9 is a diagrammatic view showing the work station of the apparatus according to this invention and including a block diagram showing the control for the apparatus.
Figure 9A:
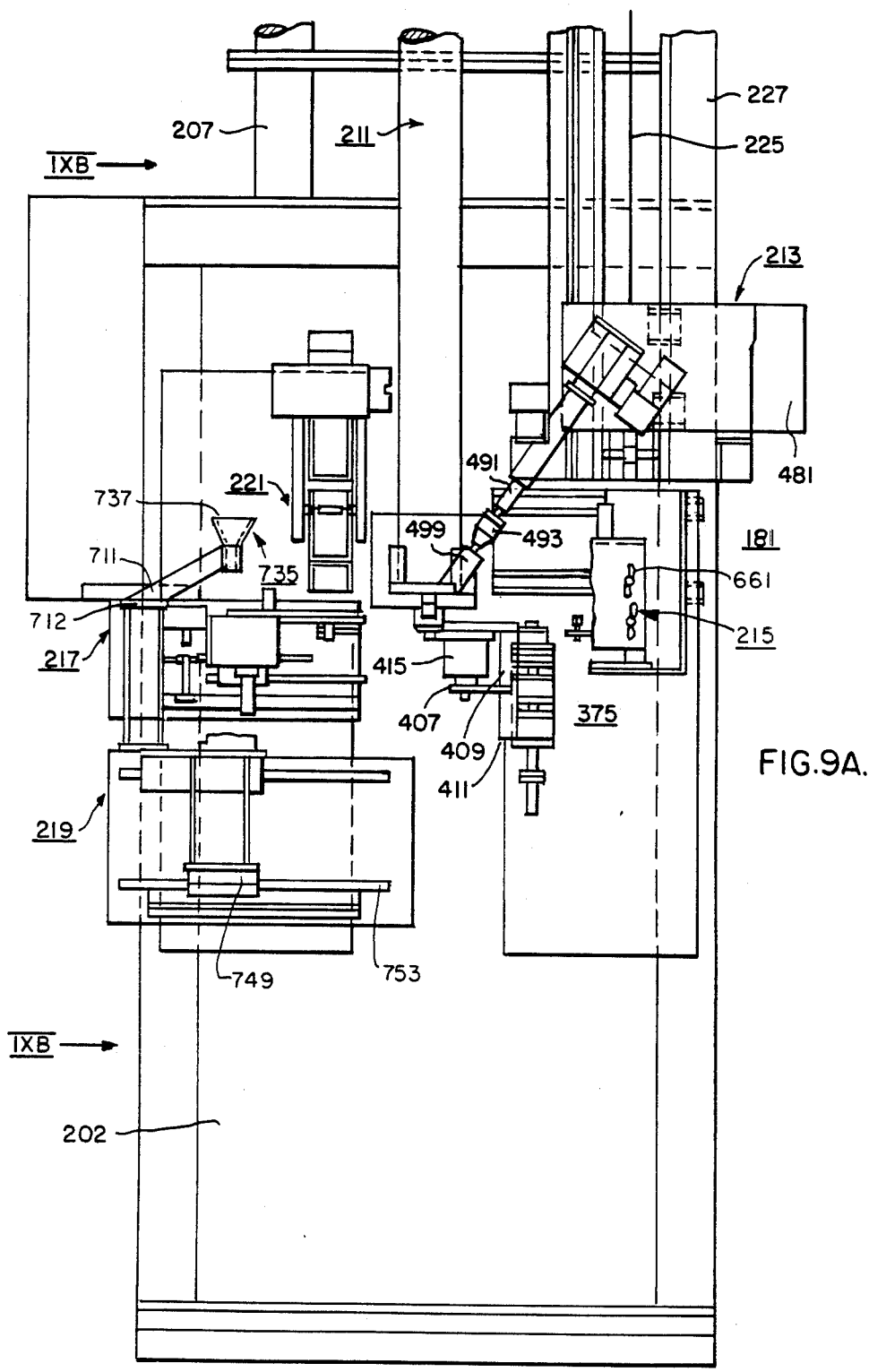
FIG. 9A is a view in front elevation of this work station.
Figure 9B:
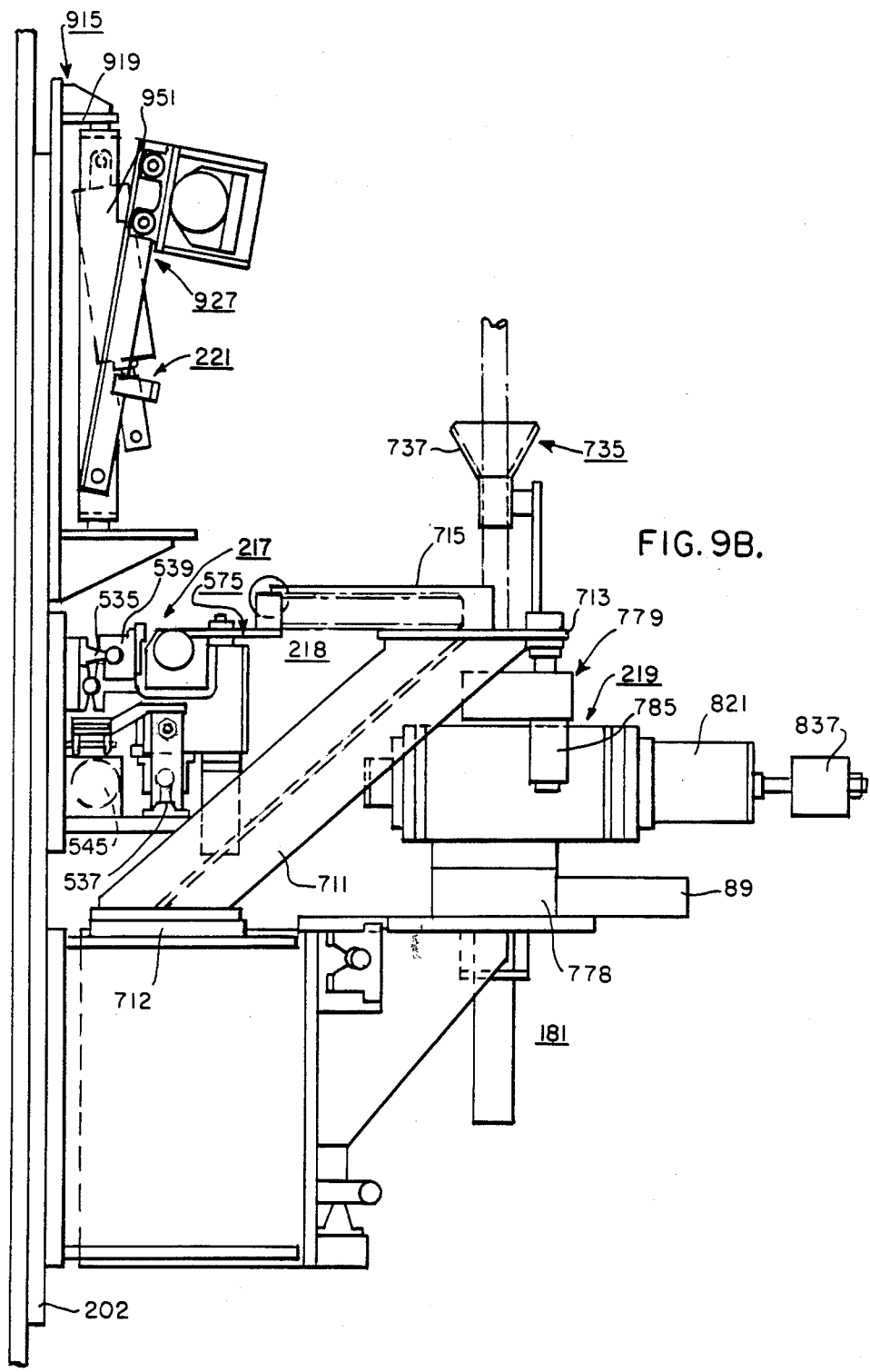
FIG. 9B is a view in side elevation taken in the direction IXB—IXB of FIG. 9A.
Figure 55:
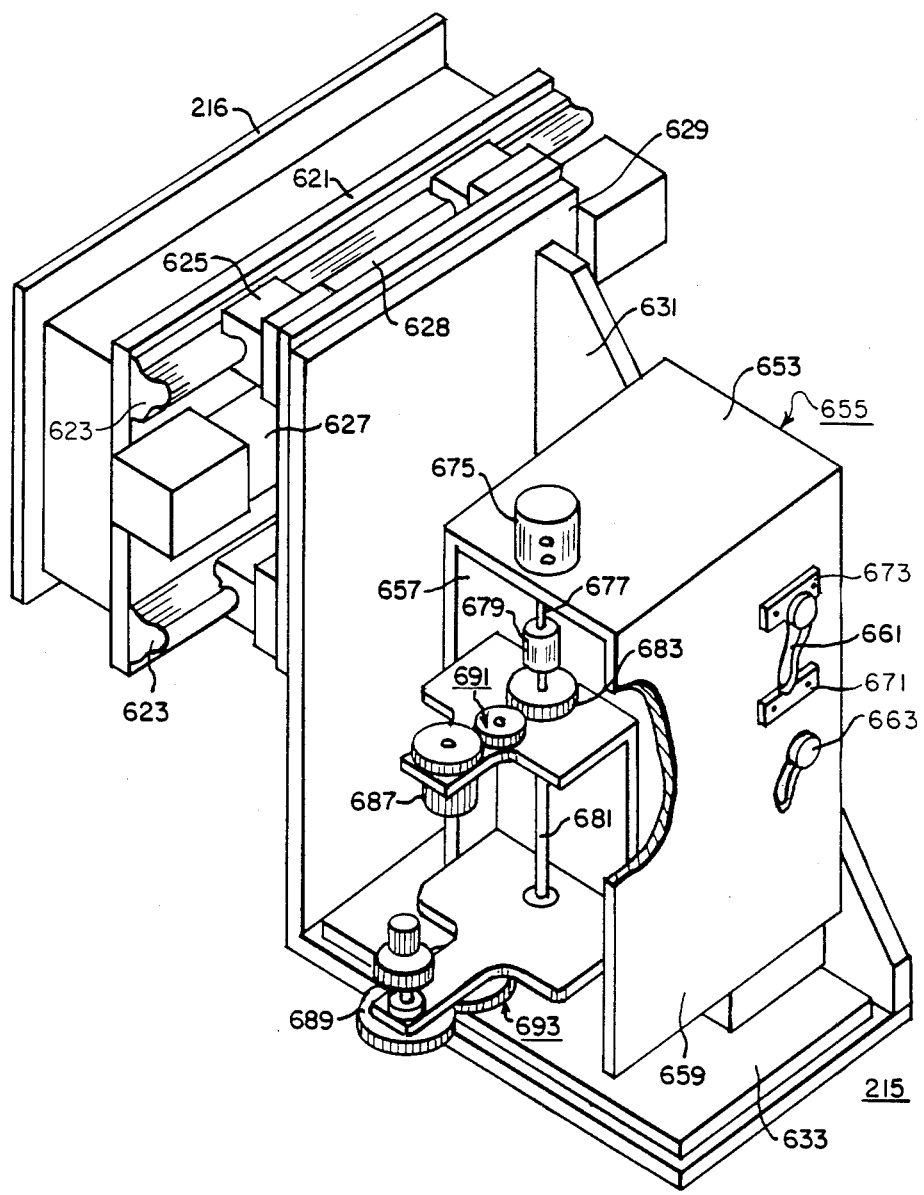
FIG. 55 (Sheet 36) is a simplified view in isometric of the brush tool with parts removed for clarity.
Figure 57:
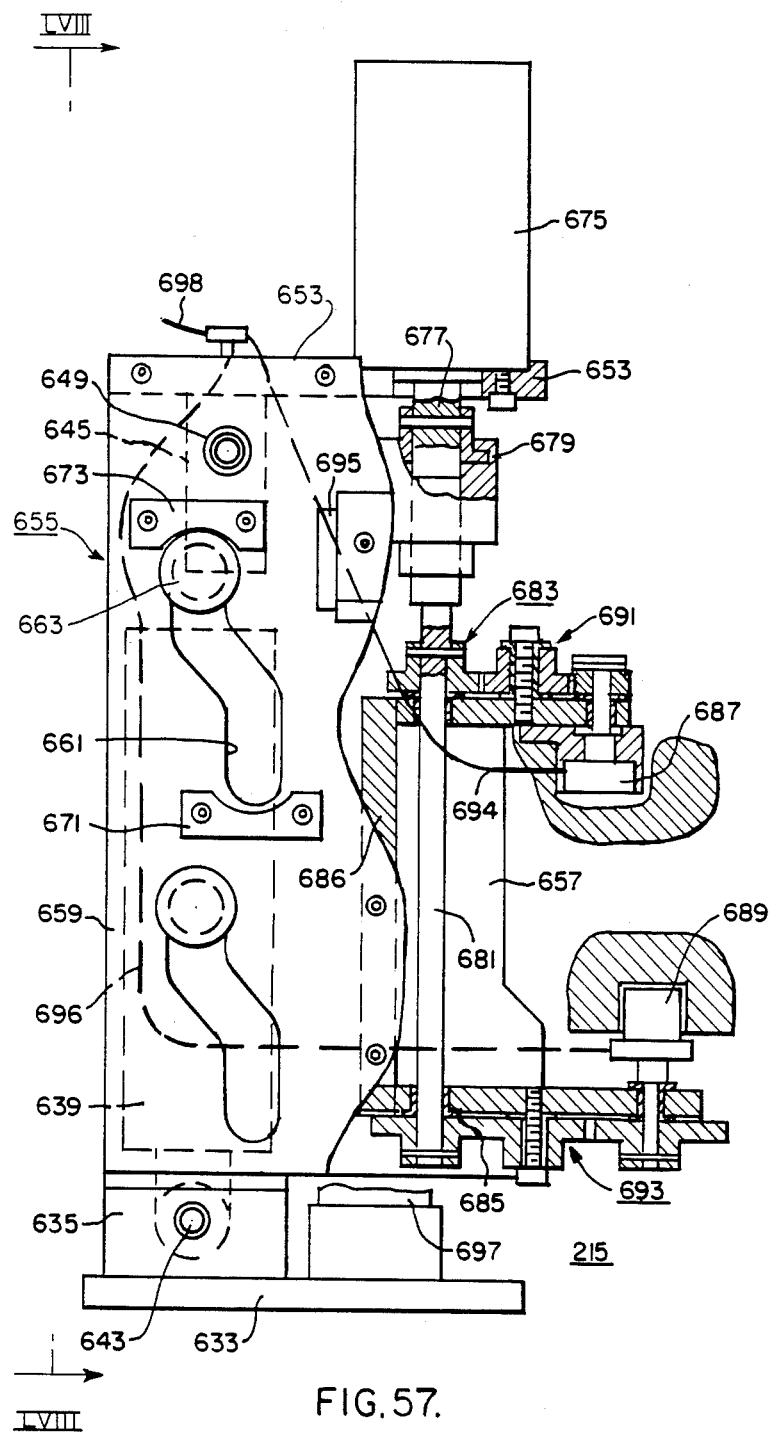
FIG. 57 (Sheet 37) is a view in side elevation of the brush tool taken in the direction LVII—LVII of FIG. 56.
Figure 58:
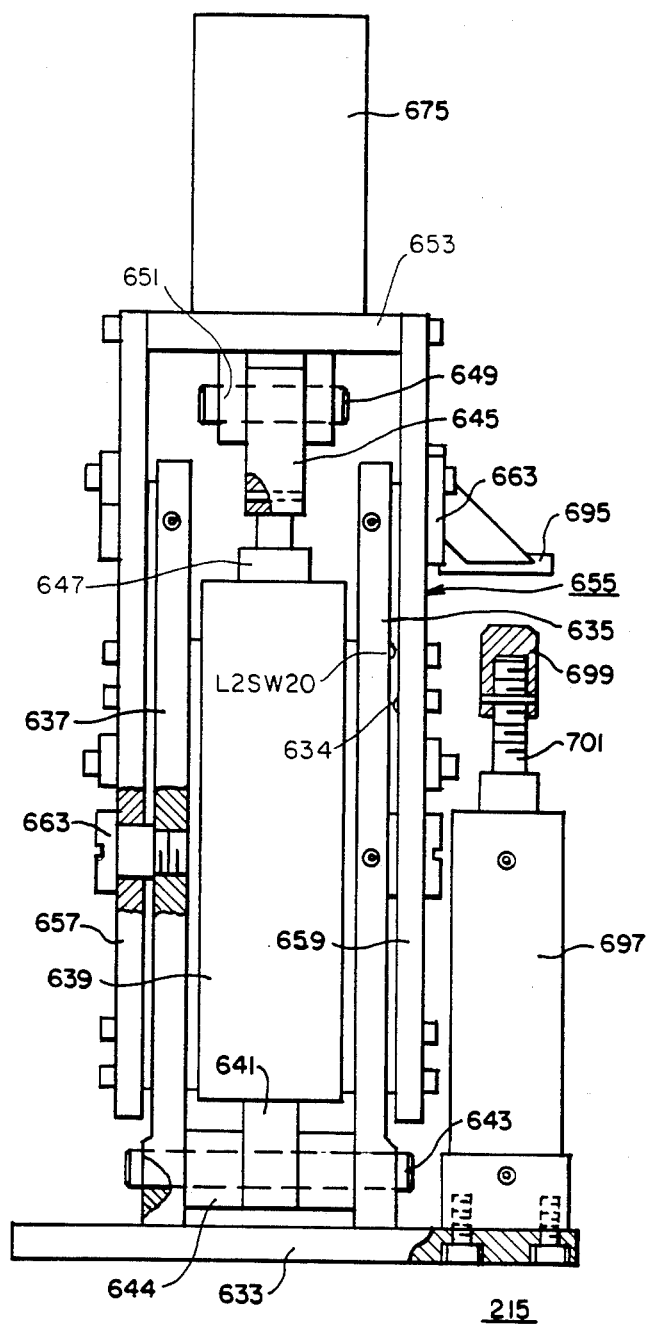
FIG. 58 (Sheet 38) is a view in end elevation of the brush tool taken in the direction LVIII—LVIII of FIG. 57.

The brush tool 215 (FIG. 9, Sheet 7; FIG. 55, Sheet 36; FIG. 56, Sheet 2; FIG. 57, Sheet 37; FIG. 58, Sheet 38) includes a supporting plate 621 (FIG. 55, Sheet 36) carried by cluster plate 216. Tracks 623 extend across the supporting plate 621. Slides or pillow blocks 626 are moveable along the tracks 623 by a transport cylinder 627. A plate 628 is mounted on the slides and it carries an angular support 629 braced by a triangular plate 631. A support base 633 is disposed on the horizontal member of the angular support 629. Vertical plates 635 (FIG. 58, Sheet 38) and 637 are joined by welds to the base 633. At their bases the plates 635 and 637 are thickened. A lift cylinder 639 is pivotally supported, on a lug 641 extending from its base, on a pivot pin 643 extending between the thickened portions of the plates 635 and 637. The lug 641 is separated from the plates 635 and 637 by spacers 644. A rod eye 645 is pinned to the piston rod 647 of the cylinder 639. The rod eye is pivotally connected to a pivot pin 649 extending between lugs 651 welded to the top 653 of a housing 655 of generally U-shaped longitudinal cross section. As the piston rod 647 moves upwardly or downwardly, it raises or lowers housing 655 vertically and at the same time permits the housing to pivot in a plane perpendicular to the pivot pin 649 (FIG. 58).

The side walls 657 and 659 of housing 655 are provided with parallel cam slots 661 (FIG. 57) of generally shallow S-shape as viewed along the vertical. There are four cam slots 661, two in each wall 657 and 659. The cam slots in each wall are parallel to each other and each pair of cam slots in opposite walls 657 and 659 are precisely aligned parallel to each other and at the same level. A guide screw or cam follower 663 is in engagement with each cam slot 661. Each cam follower 663 is threaded into the plate 635 or 637 behind the corresponding wall 657 or 659 of the housing 655 and doweled to the corresponding plate. The head 665 of each cam following 663 slidingly engages the corresponding wall. The cam slots 661 move relative to the follower 663 as the piston rod 647 moves upwardly or downwardly. By cooperation of the followers 663 and the cam slots 661, the housing 661 is moved laterally, parallel to walls 657 and 659 (FIG. 57). In FIG. 57, the housing 655 is shown in its lower most and extreme rightward position with reference to FIG. 57 (leftward with reference to FIG. 55 which is shown reversed with respect to FIG. 57). This housing is moved to this position when the piston rod 647 is in its most downward position. When the piston rod 647 is moved upwardly, the housing 655 moves upwardly and to the left with reference to FIG. 57. Stops 671 and 673 are provided to limit the upward and downward movement of housing 655.

A hydraulic motor 675 is mounted on the top 653 of the housing. The shaft 677 of this motor 675 is connected through a coupling 679 to a drive shaft 681. Drive gears 683 and 685 are dowelled to the drive shaft 681 above and below the horizontal members of a bracket 686 of generally C longitudinal cross section but with the lower member longer than the upper member. Each drive gear 683 and 685 drives a brush 687, 689 through a gear train 691, 693. The brush 687 has a diameter approximately equal to or slightly greater than the diameter of the upper counterbore 147. The brush 689 has two sections: an upper section having a diameter equal to or slightly greater than the diameter of the channel 480 (FIG. 5) between the upper and lower counterbores and a lower section having a diameter equal to or slightly greater than the diameter of the lower counterbore 149. The brushes 687 and 689 are dimensioned so that they can effectively clean the counterbores. The brushes 687 and 689 are offset. The offset is necessary because in raising the housing 655, the upper brush must be moved laterally inwardly to clear the top of a slot in the wall of the LGT 113 which permits the nut to be inserted. It is necessary that the lower brush 689 be offset inwardly so that in the most upward position of the housing, it will be centered in the lowermost counterbore 149.

An angle stop bracket 695 (FIGS. 57, 58) is mounted on wall 659 of housing 655. A cylinder 697 is mounted on base-plate 633 with the nose 699 connected to its piston rod 701 directly below the horizontal member of bracket 695. With the piston of cylinder 697 in the uppermost position, the cam slots are positioned so that the cam followers 663 are in neutral position in the cam slots 661; i.e., centered on the diagonal parts of the slots. That the cam followers are in neutral position is signalled by proximity limit switch L2SW20 (FIG. 28) which is enabled by actuator 634 on housing 655. In this position of the cam slots 661, brush 687 is above the flange 125 of the LGT113 and brush 689 is below the flange. Water lines 694 and 696 connected to a feed line 698 are provided for injecting water to clear the debris from the regions being cleaned.

During standby, the nose 699 is raised by cylinder 697 so that bracket 695 and housing 655 are in the neutral position. To initiate a brushing operation, the first step is to energize the hydraulic motor. Next, cylinder 639 is actuated to raise housing 655. Housing 655 is moved leftward, as viewed in FIG. 57, and then raised to brush counterbore 149 and the channel connecting counterbore 149 and counterbore 147 (FIG. 5). Cylinder 697 is next actuated to lower nose 699. After the lower counterbore 149 is brushed, cylinder 639 is actuated to lower housing 655 and move it to the right. Brush 687 is now in position to brush upper counterbore 149 (FIG. 5). After the brushing is complete, housing 655 is raised to the uppermost position by cylinder 639. Now cylinder 697 raises nose 699. Cylinder 639 is now exhausted until bracket 695 engages nose 699.

Figure 51:
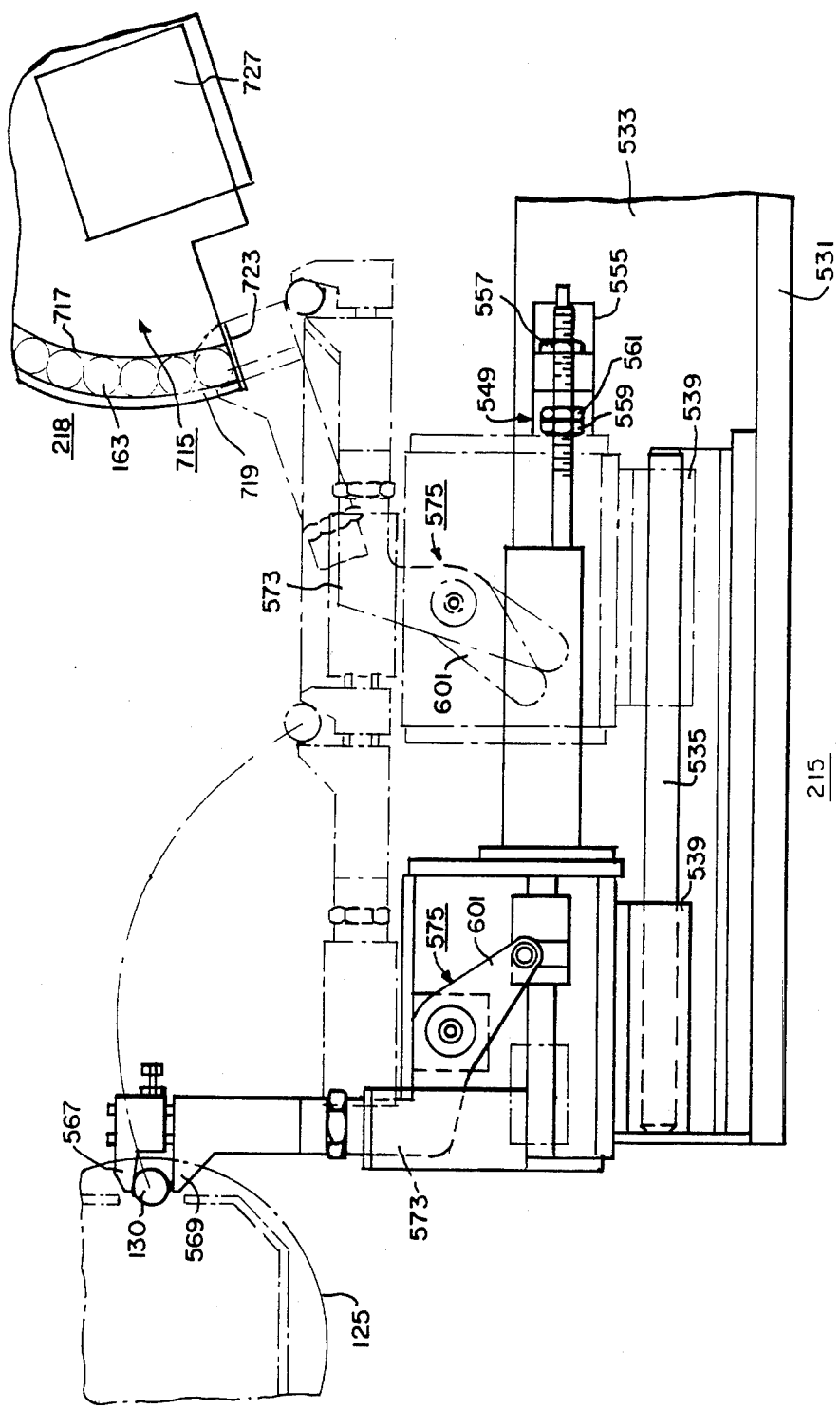
FIG. 51 (Sheet 33) is a plan view showing the relationship to each other of the pick-and-put tool, the LGT and the nut hopper.
Figure 52:
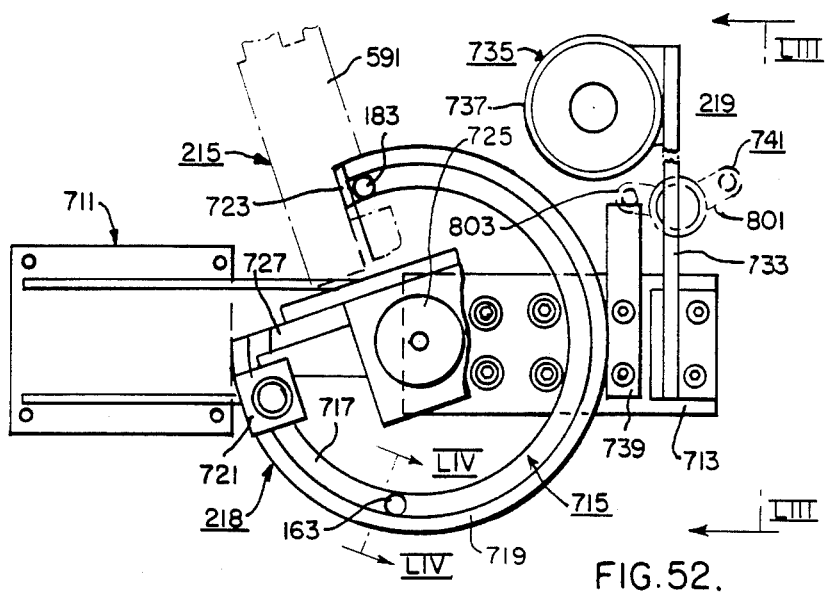
FIG. 52 is a plan view showing predominantly the nut hopper but also its relationship to the pin-insertion/torque tool.
Figure 53:
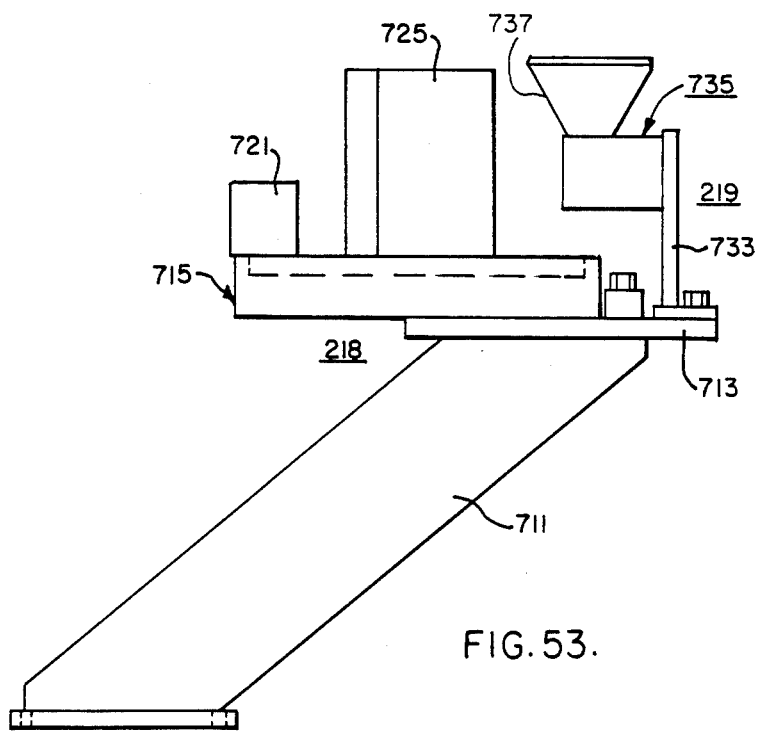
FIG. 53 is a view in side elevation taken in the direction LIII—LIII of FIG. 52.
Figure 54:
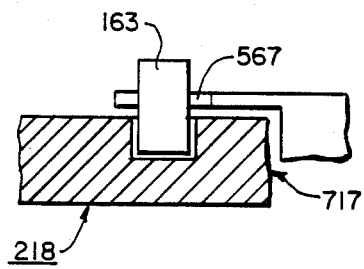
FIG. 54 (Sheet 35) is a fragmental view in section taken along line LIV—LIV of FIG. 52.

The nut hopper 218 includes a channel-shaped supporting bracket 711 (FIG. 52, Sheet 34) which extends from the bracket 712, that supports the pin-insertion/torque tool 219, (FIGS. 9A, Sheet 8; 9B FIG. 9) to an elevation where each nut 145 (FIG. 5, Sheet 4) is in position to be removed from the hopper 218 by the pick-and-put tool 215. This elevation is also such that the nut, when removed by the pick-and-put tool is properly positioned for insertion in the counterbore 147 (FIG. 5) of the flange 125 of the LGT. The bracket 711 may serve to deposit fragments of the discarded old nuts and old pins into the trash chute 413 (FIG. 23F, Sheet 20). The bracket 711 carries a plate 713 (FIGS. 52, 53) at the top from which a horizontal circular plate 715 is supported. This plate extends over an angle of about 270° and has a grooved annulus 717, which may be described as a nut magazine. New nuts 163 are arrayed in the annulus. The nuts 163 in the groove 717 extend above the upper rim 719 of the groove so that they may be engaged by jaws 567 and 569 (FIG. 51 Sheet 33) of the pick-and-put tool 215. Near an end the magazine 717 has a loading port 721. The loading port 721 has a funnel (not shown) to facilitate loading of new nuts 163, one by one, in the magazine from above the pool 183 (FIG. 9) through a long tube (not shown). At the opposite end the magazine 717 has a stop 723. At this end each nut which abuts the stop 723 is in position to be removed by the pick-and-put tool 215. A rotary hydraulic cylinder 725 is supported from plate 713. This rotary cylinder 725 carries an arm 727 which when actuated by the cylinder advances nuts arrayed in the magazine 717 towards the stop 723. Typically about 24 nuts can be arrayed along the magazine 717. A switch LSW25 (FIGS. 39, 40, 41, Sheet 25) is embedded in the plate 713 near the stop 723. The underside of the arm 727 has a bracket 729 on which a magnet 731 is supported. When the arm 727 swings to a position near the stop 723, switch LSW25 is actuated transmitting intelligence to the robotic control center 185 that the hopper is empty. The arm 727 also serves to advance the array of new nuts 163 in a counterclockwise direction with reference to FIG. 52 so that each nut in the array, in its turn, abuts the stop 723 and is in position to be removed by the pick-and-put tool 215.

The plate 713 (FIG. 52, Sheet 34) extends beyond the circular plate 715 on the side opposite to the loading port 721. This plate carries a supporting plate 733 for the loading guide 735 of the pin-insertion/torque tool 219 and its funnel 737. The plate 713 also carries a stop 739 for the wrench 741 of the pin-insertion/torque tool 219.

Figure 60:
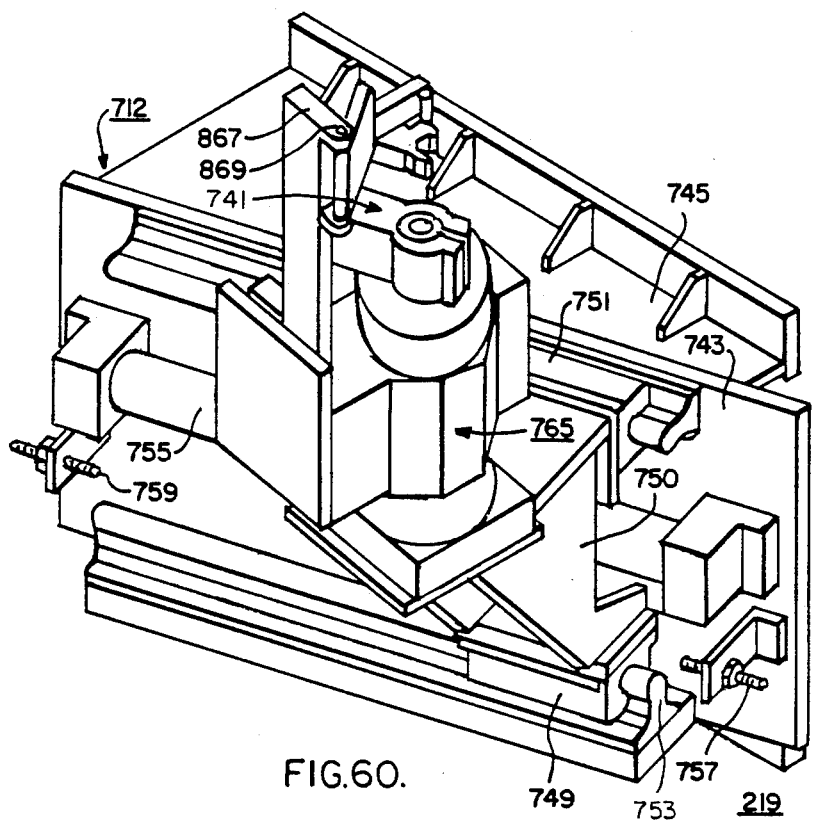
FIG. 60 (Sheet 30) is a simplified view in isometric, with parts omitted, showing generally the pin-insertion/torque tool.
Figure 61:
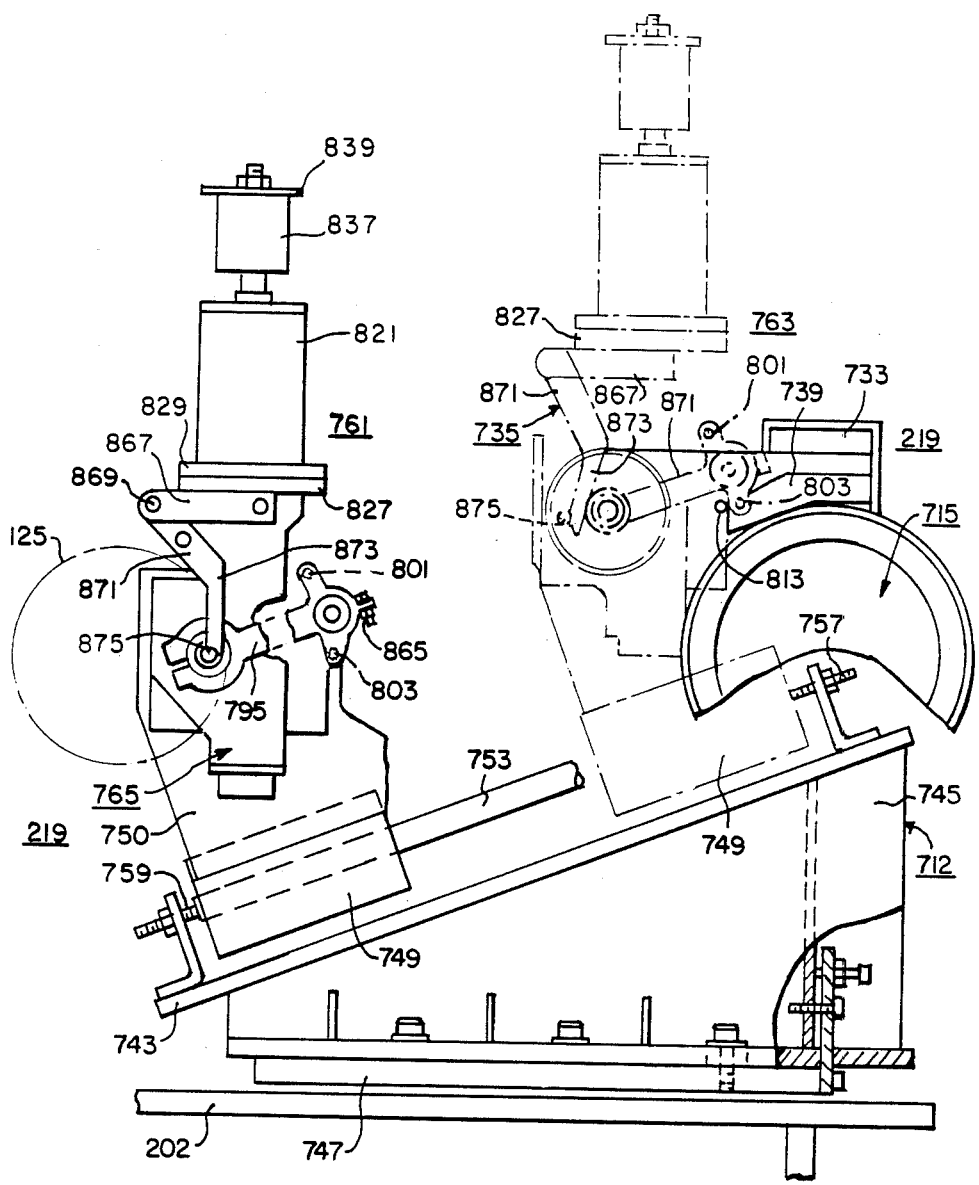
FIG. 61 (Sheet 39) is a plan view showing the pin-insertion/torque tool in the position where the nut is threaded onto the pin and in the position where the pin is inserted.
Figure 64:
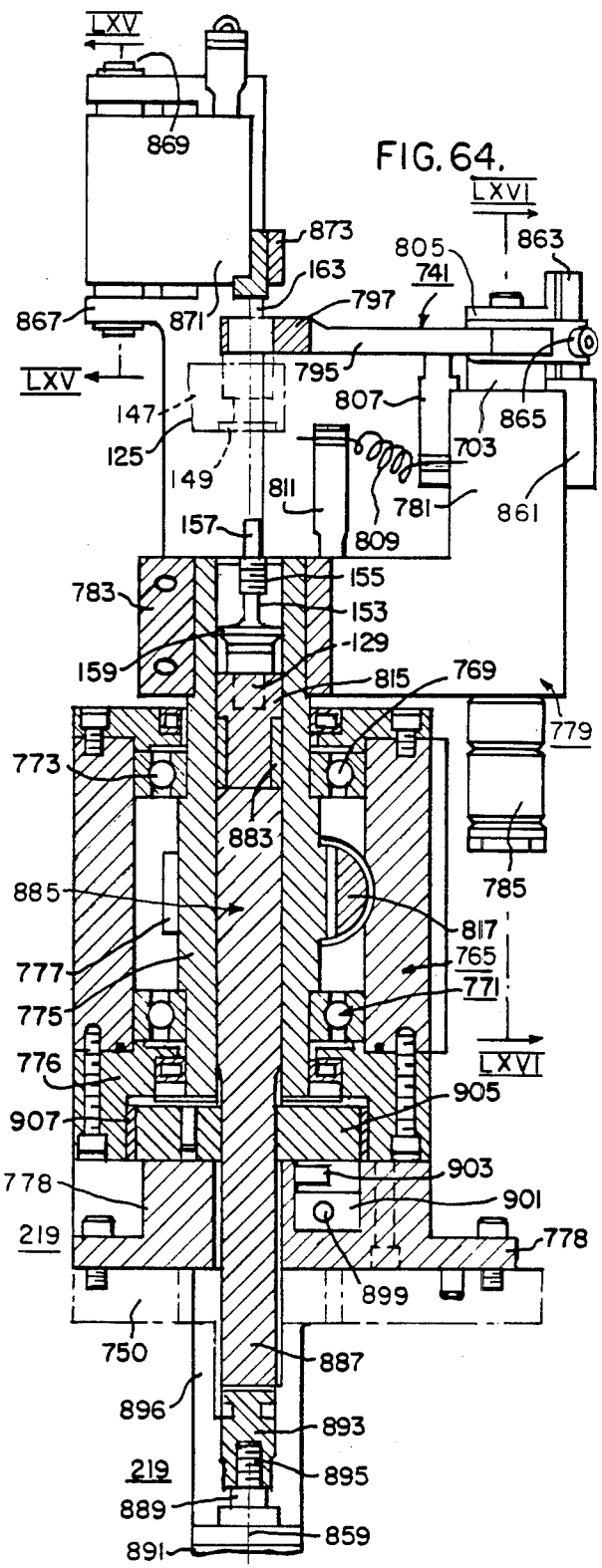
FIG. 64 is a view in longitudinal section taken along line LXIV—LXIV of FIG. 63.

The components of the pin-insertion/torque tool 219, aside from the funnel 737, are mounted moveably on a vertical base plate 743 (FIG. 60, Sheet 30). The base plate 743 is suspended from the edge of a horizontal trapezoidal-shaped plate 745 of the angle bracket 712 (FIGS. 60, 61 (Sheet 39)). The angle bracket 712 is mounted on a cluster plate 747 which is in turn suspended from the plate 202 (FIGS. 9, 61). The components of the pin insertion/torque tool are mounted on a carriage 750 which is moveable on slides or pillow blocks 749 and 751 that are slideable horizontally on tracks 753 by transport cylinder 755 (FIG. 60). There are stops 757 and 759 which engage the slide 749 to limit the advance movement and the retract movement respectively of the components. The retracted position 761 of the components is defined as the position, shown in full lines in FIG. 61, in which the wrench 741 is set to thread the nut 163 onto the thread 155 of the new split pin 127b (FIGS. 6, 64). The advanced position 763, shown in broken lines in FIG. 61, is defined as the position in which the new pin 127b is loaded into the pin-insertion/torque tool 219.

Figure 62:
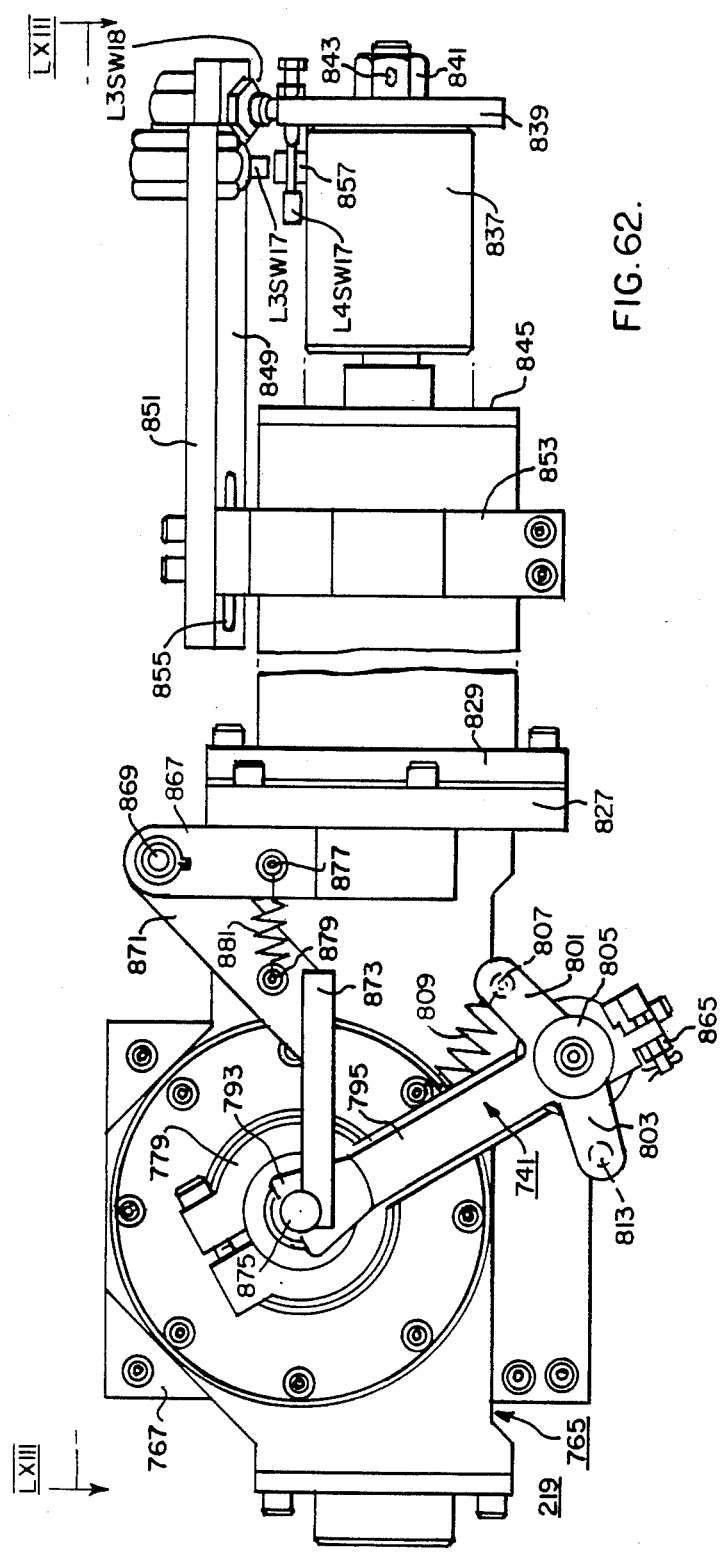
FIG. 62 is a plan view of the pin-insertion/torque tool.
Figure 66:
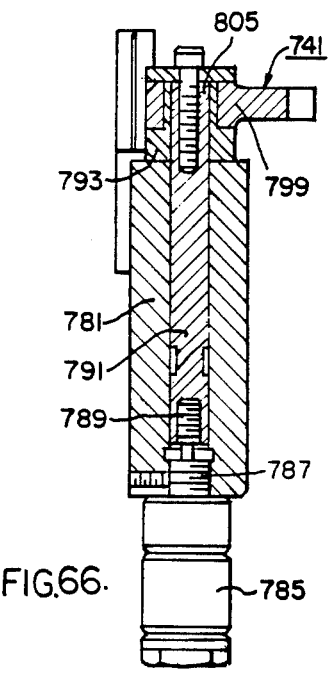
FIG. 66 is a view in longitudinal section taken along line LXVI—LXVI of FIG. 64.

The pin-insertion/torque tool includes a housing 765 (FIG. 64, Sheet 42). Internally, the fixed races 769 of ball bearings 771 are supported on the wall of the housing 765. The rotating races 773 are carried lby a hollow shaft 775. The bearings 771 are held axially by a bearing retainer 776 bolted to housing 765. The bearing retainer 776 is mounted on an adapter 778 bolted to carriage 750. A pinion 777 (FIGS. 64, 69) is mounted rotatable with the shaft 775. This shaft is shouldered at its outer end and a wrench arm 779 is clamped to the shouldered end at its member 783. The wrench arm has a hollow member 781 at right angles to the member 783. A cylinder 785 is mounted at one end of the opening in the hollow member 781 by a sleeve 787 (FIG. 66). The piston rod 789 of the cylinder is threaded into the end of an actuating rod 791 which is slideable in the opening of the member 781. At the opposite end a bushing 793 is secured to the rod 791. The wrench 741 includes an arm 795 having a splined head 797 at one end and a supporting eyelet 799 at the opposite end. At the eyelet end arms 801 and 803 extend laterally from the wrench (FIG. 62, Sheet 40). The wrench is pivotally supported on the stem of bushing 793 between the flange of the bushing and a retainer 805 which is bolted to the end of actuating rod 791. When the cylinder 785 is actuated, the actuating rod 791, the bushing 793, the wrench 741 and the retainer 805 are raised to clear a nut 763 which is being torqued and to reset the wrench for a succeeding torquing operation.

Figure 63:
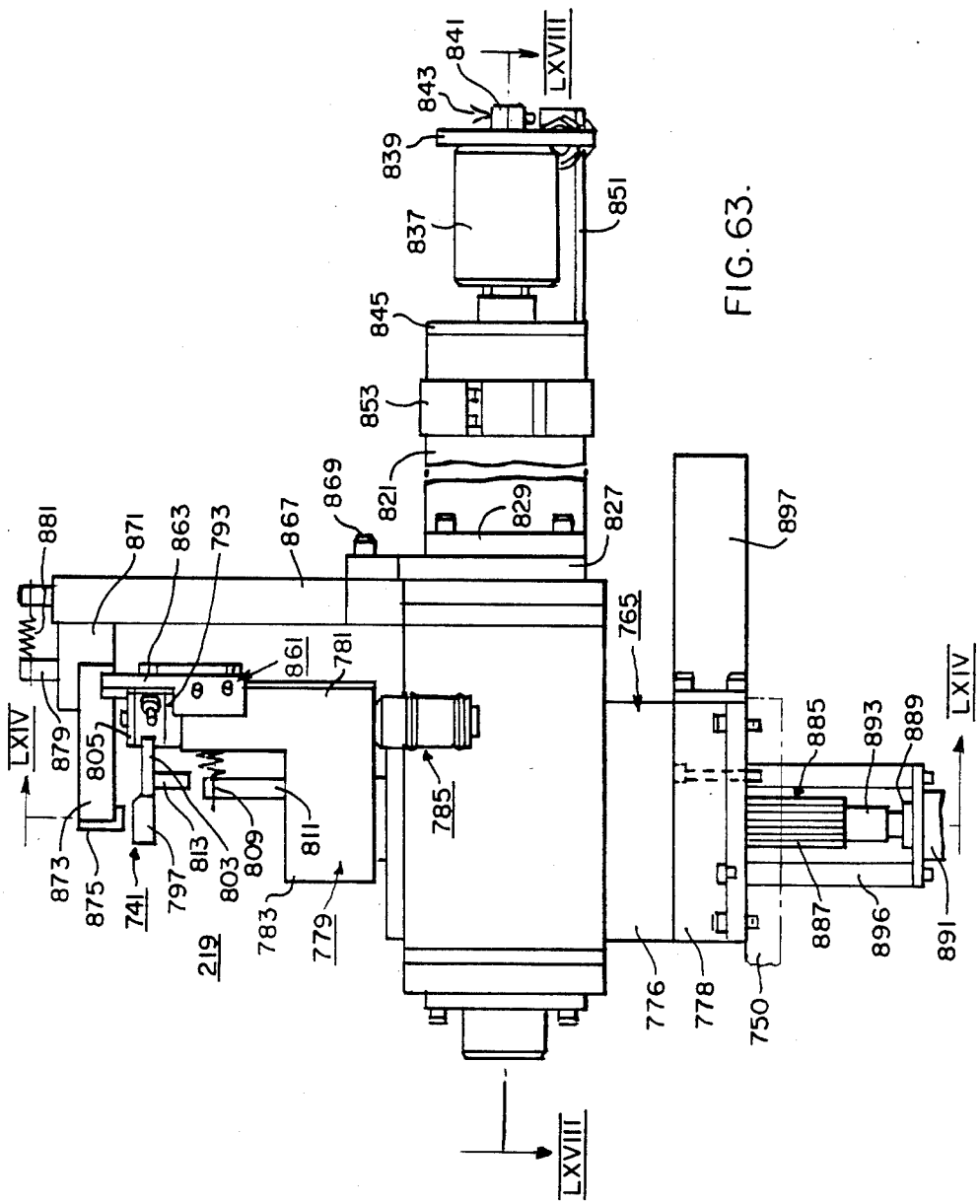
FIG. 63 is a view in side elevation of the pin-insertion torque tool taken in the direction LXIII—LXIII of FIG. 62.

The arm 801 carries a pin 807 (FIG. 62). A spring 809 extends between pin 807 and a pin 811 extending from the clamped member 783 of the wrench arm 779 (FIG. 63). The spring 809 centers the wrench 741 with its head 797 over the position where the new nut 163 is to be inserted in counterbore 147 of the flange 125 of the LGT 113 (FIG. 6); i.e., coaxial with the hollow shaft 775 (FIG. 64). The arm 803 also carries a pin 813. When the pin-insertion/torque tool 219 moves from position 761 (FIG. 61) to position 763, the pin 813 is engaged by the end of stop 739 and the wrench 741 is pivoted away from its center position against the action of the spring 809 so that a new pin 127b may be positioned on blade 815 (FIG. 64). When the pin-insertion/torque tool is removed from position 763 (FIG. 61) the wrench head 793 is returned to the torquing position by spring 809.

Figure 68:
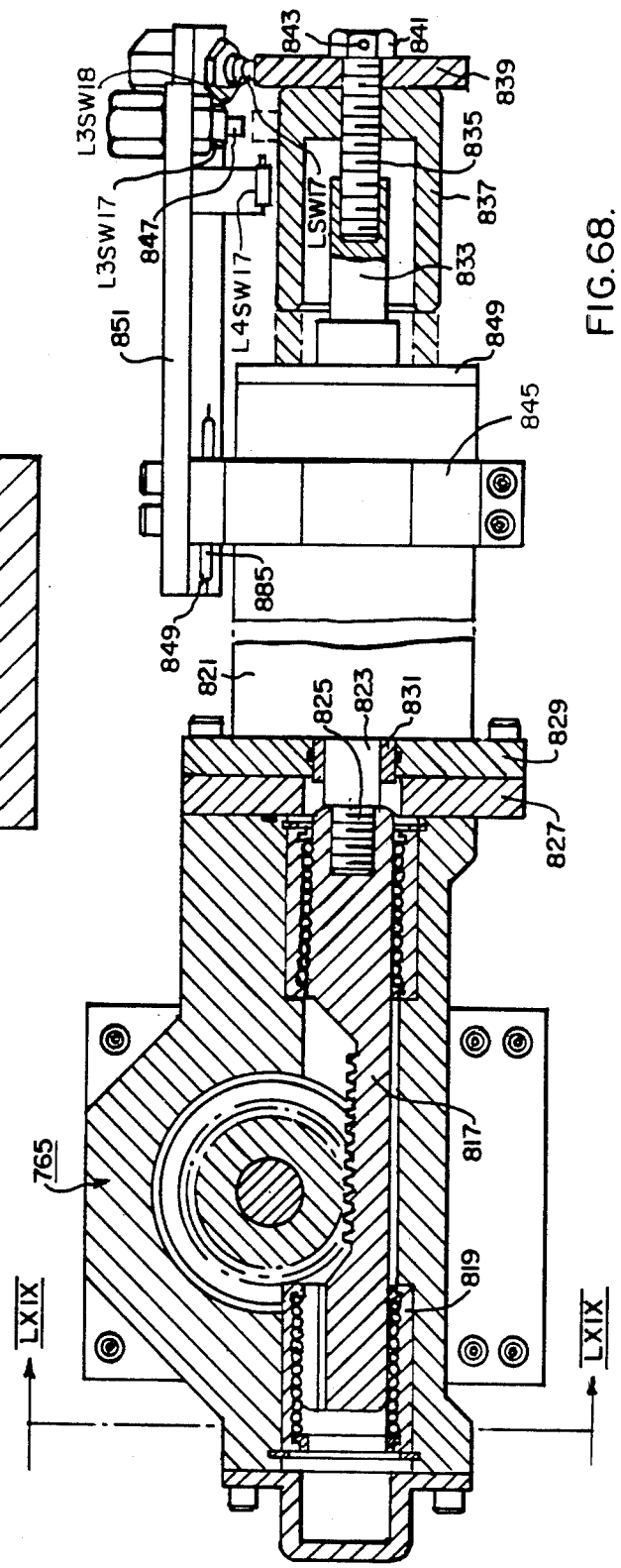
FIG. 68 is a view in transverse section taken along line LXVIII—LXVIII of FIG. 63.

The pinion 777 is rotated back and forth over a predetermined angle, typically 36°, by a rack 817 (FIG. 68). The housing 765, the shaft 885 are positioned vertically; the pinion 817 is reciprocated horizontally. The rack 817 is reciprocated on ball bushings 819 by a cylinder 821 which is mounted generally horizontally whose piston rod 823 is connected to a spring pin 825 which is threaded into one end of the rack. An annular cylinder adapter 827 is bolted to the housing 765. The pedestal 829 of the cylinder 821 is bolted to the adapter 827. The piston rod 823 slides in a bushing 831 in the pedestal. The piston (not shown) of the cylinder 821 is double ended having a piston rod which extends from the end opposite to the rod 823. This opposite rod has an extension 833 (FIG. 68). This extension is connected through a threaded pin 835 with a cylindrical stop 837 of generally C longitudinal cross section and to a target 839. A nut 841 is secured to the pin 835 by a cotter pin 843. By rotating the nut in one direction or the opposite direction, the stop 837 may be moved rearward and forward. On the forward movement of the piston and of the rack 817 the forward end of stop 837 contacts the top 845 of cylinder 821, limiting the forward movement of the rack and the angle over which the pinion 777 is rotated. The piston (not shown) of the cylinder 821 moves at a relatively low speed so that no damage occurs by reason of the contact of the stop 837 and the top 845 of the cylinder. By setting the position of the stop precisely, the angle over which the pinion 777 rotates may be precise. The target 839 actuates switch L3SW18 in the most rearward position of the piston rod extension 833 and switch L3SW17 in the stopped or most forward position of the extension. Switches L3SW18 and L3SW17 are carried on bars 849 and 851 which are bolted to a clamp 853 secured to cylinder 821. Bar 849 has a longitudinal slot 855 so that the bar can be slid rearwardly or forwardly to align magnet 847 with switch L3SW18 in the most rearward position of the extension 833. To achieve better precision than can be achieved by proximity switch L3SW17, a microswitch L4SW17 is provided. This switch is actuated by a stud 857 on stop 837 in the most forward position of the rack 817.

When the pin-insertion/torque tool is in use in torquing or untorquing a nut 163, the splined head is positioned coaxial with the shaft 775 (FIG. 64). The translational movement of the rack 817 in one direction or the opposite direction, rotates the wrench about the axis 859 of the shaft 775. A stop 861 is suspended from the end of member 781 of wrench arm 779. The stop 861 has an extension 863 which overhangs the end of member 781 and is engaged by a set screw 865 on the end of the wrench 741. The stop 861 maintains the wrench head 797 centered on the axis 849 preventing the spring 809 from pulling the wrench head 797 off the axis position.

Figure 65:
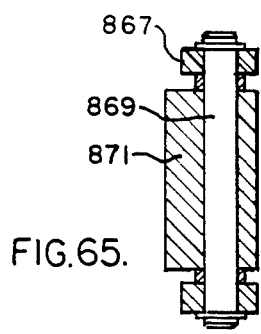
FIG. 65 is a view in longitudinal section taken along line LXV—LXV of FIG. 64.

The cylinder adapter 827 carries a pivot arm 867 (FIG. 63) on its surface opposite the pedestal 829. The pivot arm 867 carries a pivot pin 869 (FIG. 65) at its end overhanging the adapter 827. The pin 869 pivotally supports a linkage 871 which carries a stop arm 873. The stop arm carries a hold-down pin 875 at its end (FIGS. 60, 62). The pivot arm 867 carries a spring pin 877 intermediate its ends and the linkage 871 carries a pin 879 intermediate its ends. A spring 881 is connected to the pins 877 and 879. In the normal use of the pin-insertion/torque tool 219, the spring 881 positions the hold-down pin 875 coaxially with the shaft 775 and the head 797 of the wrench 741. The pin 875 holds down a nut 163 while it is being torqued. When the nut is being untorqued, the pin 875 holds down the nut 163 so that the untorquing releases the pin 127b. When the pin-insertion/torque tool 219 is set in the pin loading position 763 (FIG. 61), the stop arm 873 engages the funnel 737 so that the pin is removed from the position over the blade 815 (FIG. 68) and a new pin 127b may be mounted on the blade.

The blade 815 (FIGS. 64, Sheet 42, 69A, Sheet 13) on which the new split pin 127b is seated in, and pinned to, a bushing 883 at the end of a rod 885 which is splined at the end 887 (FIG. 63). The rod 885 is connected at the splined end to the positon rod 889 of a cylinder 891 through an adapter or coupling 893 and a spring pin 895. The cylinder 891 is supported on a bracket 896 connected to adapter 778 (FIG. 63). The piston 891 is actuable to advance rod 885 and a new pin 127b mounted on it into the lower counterbore 149 of an LGT into engagement with a new nut 163.

Figure 67:
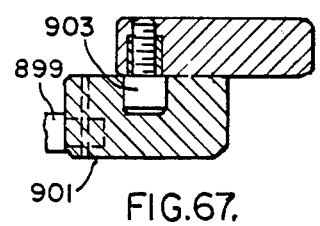
FIG. 67 is a view in longitudinal section taken along line LXVII—LXVII of FIG. 64.

It is necessary that the tines of the two split pins 127b which are inserted in an LGT be oriented at 90° with reference to each other. This orientation is achieved by cylinder 897 (FIG. 63). Cylinder 897 is mounted on adapter 778. Its piston rod 899 (FIG. 64) penetrates slideably through the adapter and engages a cam block 901 moveable within a groove within the adapter (FIGS. 64, 67). The cam block 901 has a groove in which it engages a cam follower or roller 903 (FIG. 67). The roller 903 is connected to a rotary actuator 905 splined to rod 887 and rotatable on bushing 907. Movement of the piston rod 899 from its neutral position in either direction turns the rod 885 and a pin 127b connected to it by 45° in one direction or the other thus orienting one pin 127b at 90° to the second pin.

Figure 69A:
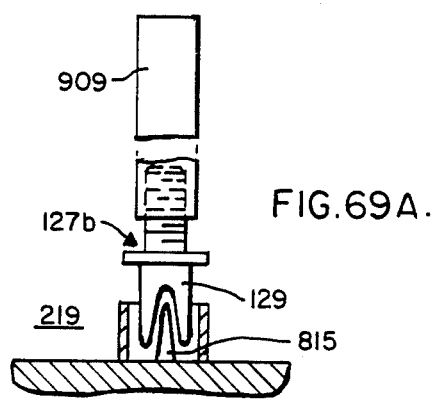
FIG. 69A (Sheet 13) is a diagrammatic view showing how a new split pin is transferred to the pin-insertion/torque tool.
Figure 69:
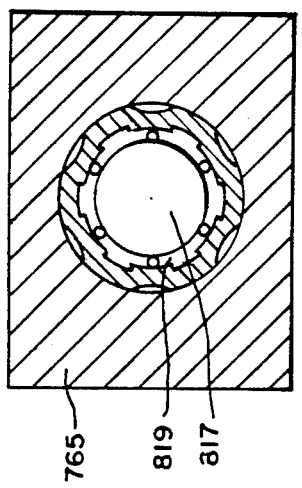
FIG. 69 is a view in transverse section taken along line LXIX—LXIX of FIG. 68.

In installing a new split pin 127b on the blade 815, the new pin is initially threaded onto the end of a long tube 909 (FIG. 69A, Sheet 13). The pin-insertion/torque tool 219 is moved to position 763 (FIG. 61) where the stop 739 and funnel 737 expose the blade 815. The tube 809 is then manipulated so that the tines 129 of the split pin which it carries span the blade 815. The tube 809 is then unscrewed and removed and the tool 219 carrying the split new pin 127b is returned to its processing position 761.

The split pin 127b on blade 815 may now be secured in the flange 125. The split pin is appropriately oriented by actuating cylinder 897 in one direction or the other. The nut 163 is deposited in the upper counterbore 147 (FIG. 6, Sheet 5, FIG. 64) by the pick-and-put tool 217. Cylinder 891 FIGS. 63, 64) is actuated to advance the split pin into the lower counterbore 149 in threading contact with nut 163. Ejection of the nut is prevented by pin 875 (FIGS. 60, 63). With the wrench 741 set in advanced position from the nut 163 by cylinder 785, the wrench is set in the angular position to thread the nut 163 onto the pin by cylinder 821. The wrench 741 is now retracted by cylinder 785 to a position in which its splines engage the splines on the nut. Cylinder 821 is now actuated to turn the wrench so that the nut 163 is threaded onto pin 127b over the angle of turn of the wrench, typically 36°. Cylinder 785 is now actuated to cause the wrench 741 to disengage the nut and be advanced away vertically from the nut. The wrench is reset by cylinder 821 and the above threading operation is repeated. The threading continues until the wrench seats on the base of the counterbore 147 and stalls. Typically about 70 operations of the wrench are required to reach the stall.

Limit switch L3SW18 is actuated on each stroke of wrench 741. On each actuation of L3SW18, a relay R52 (FIG. 86, Sheet 52) is actuated. The apparatus includes a counter 910 and a display 912 for displaying counts. The counter and display are actuated on each actuation of relay R52 through contact 2R52 of this relay. If the wrench is stalled before the appropriate number of counts is displayed, a maloperation has occurred and the new nut must be untorqued, the new nut and new pin must be discarded and the operation must be repeated. The strokes of the wrench can also be counted by the computer 199 (FIG. 8, Sheet 6). However, the separate counter has the advantage that is available even if the operation is manual or the computer is disabled. After the stall is reached, the wrench 741 is reset and precisely determined high torque is applied to tighten the nut 163. The high torque is applied by cylinder 821 through the rack 817 and pinion 777. The high torque is derived through a valve from a high presssure line whose pressure is precisely determined.

Typically the nut 163 has 10 splines uniformly spaced at 36° between adjacent splines 171 (FIG. 6) around its periphery. During the initial threading operation, the nut and wrench mutually adjusts themselves so that the splines of the wrench enter the grooves between the splines of the nut. During the first and each subsequent operation, the wrench is turned over a precisely determined angle, typically 36° so that the splines of the wrench 741, as it is lowered, precisely engage the grooves between the splines in the nut 163. The wrench is turned and raised laterally of the wall of the LGT 113 (FIG. 2) clearing the lip 913 (FIG. 4, Sheet 3) of the opening in the LGT above the nut 163. On each completion of the strokes of the wrench 741 limit switches L3SW17 and L4SW17 (FIG. 63) are actuated. In addition, the cylinder 821 has a pressure switch PT27B (FIG. 90, Sheet 56) which closes when cylinder 821 has advanced the wrench to the end of its stroke. On each stroke which occurs before the wrench 741 is stalled on low torque, switches L3SW17 and/or L4SW17 close before switch PT27B. When the wrench stalls, it stalls before the end of the stroke. Pressure switch PT27B closes but limit switches L3SW17 and/or L4SW17 do not close or close after PT27B. The closing of switch PT27B and L3SW17 and/or L4SW17 each turns on a light. When the light for limit switches L3SW17 and L4SW17 turn on and the light for PT27B does not turn on or turns on after the light for the pressure switches, the operator is informed that the wrench 741 has stalled on low torque.

Figure 90:
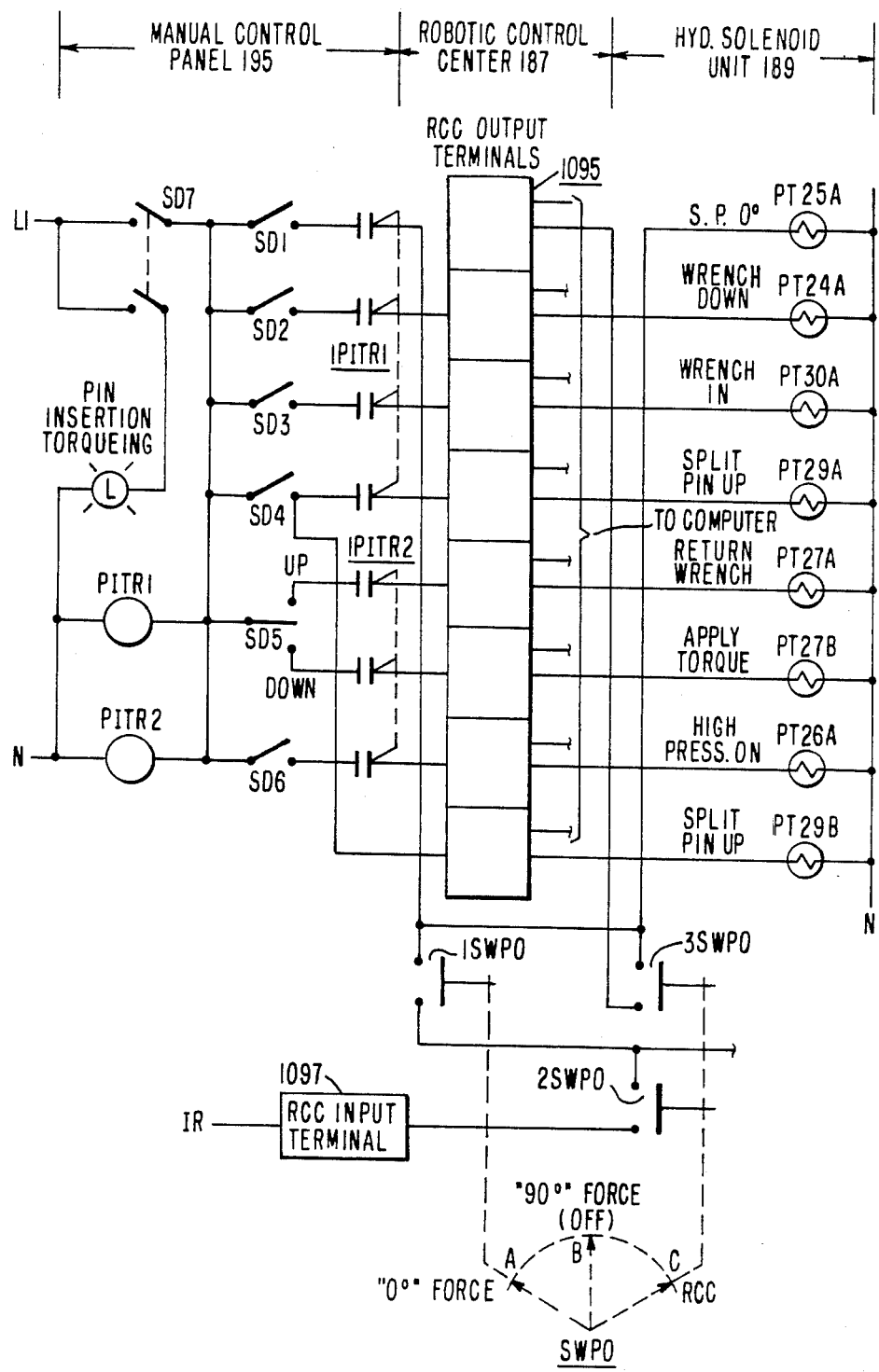
FIG. 90 is a schematic showing the manual and automatic output circuit for the pin insertion/torque tool (PT)

The same signalling occurs on high torque. In this case, the high torque is applied by energizing solenoid PT26A (FIG. 90). When the presssure reaches the preset magnitude, pressure switch PT26A closes. Before the wrench stalls on high torque limit switches L3SW17 and/or L4SW17 close before presssure switch PT26A. When the wrench 741 stalls on the precise high torque, switches L3SW17 and/or L4SW17 close but pressure switch PT26A either does not close at all or closes after the limit switches. Light signals are turned on corresponding to the operation of the switches.

It is essential that the nut 163 be secured so that it does not become separated or unthreaded from the pin. The old nut 145 which is threaded onto the old pin 127a (FIG. 5) is held by a cross pin 151 which is welded to the head or button 141 extending from the pin. This structure is not feasible for the new split-pin assembly 150 (FIG. 6, Sheet 5) because welding cannot conveniently be carried out under wter. The new pin 127b extends above the nut 163. The nut 163 as fabricated for threading to the pin has secured to it a locking cap 167 which extends about the pin 127b. After the nut is threaded onto the pin 127b, the locking cup is securely crimped in opposite flutes 169 (FIG. 6) in the pin preventing separation of the nut and pin. The grooves for one pin extend in a direction perpendicular to the flat inner boundaries of the tines 129. For the other pin 127b, displaced 180° around the flange 125 from the first pin, the fluts 169 are parallel to these inner boundaries.

Figure 82:
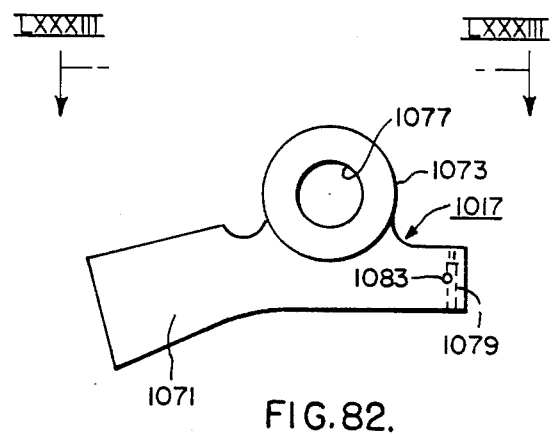
FIG. 82 (Sheet 35) is a plan view of a crimping jaw used in the crimper tool.
Figure 59:
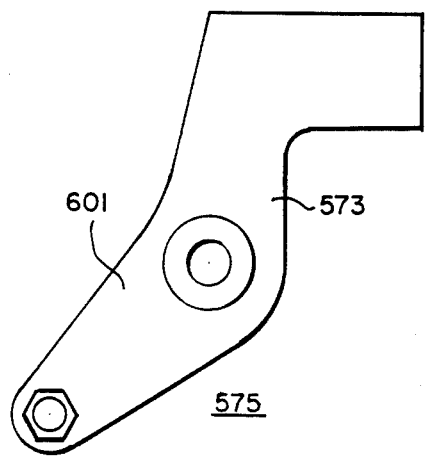
FIG. 59 (Sheet 35) is a plan view of the bell lever for pivoting the jaws of the clamp of the pick-and-put tool.
Figure 83:
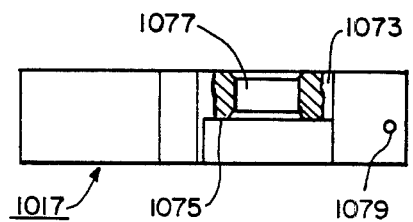
FIG. 83 (Sheet 35) is a view in side elevation taken in the direction LXXXIII of FIG. 82 showing a fragment of the crimper tool housing in section.
Figure 70:
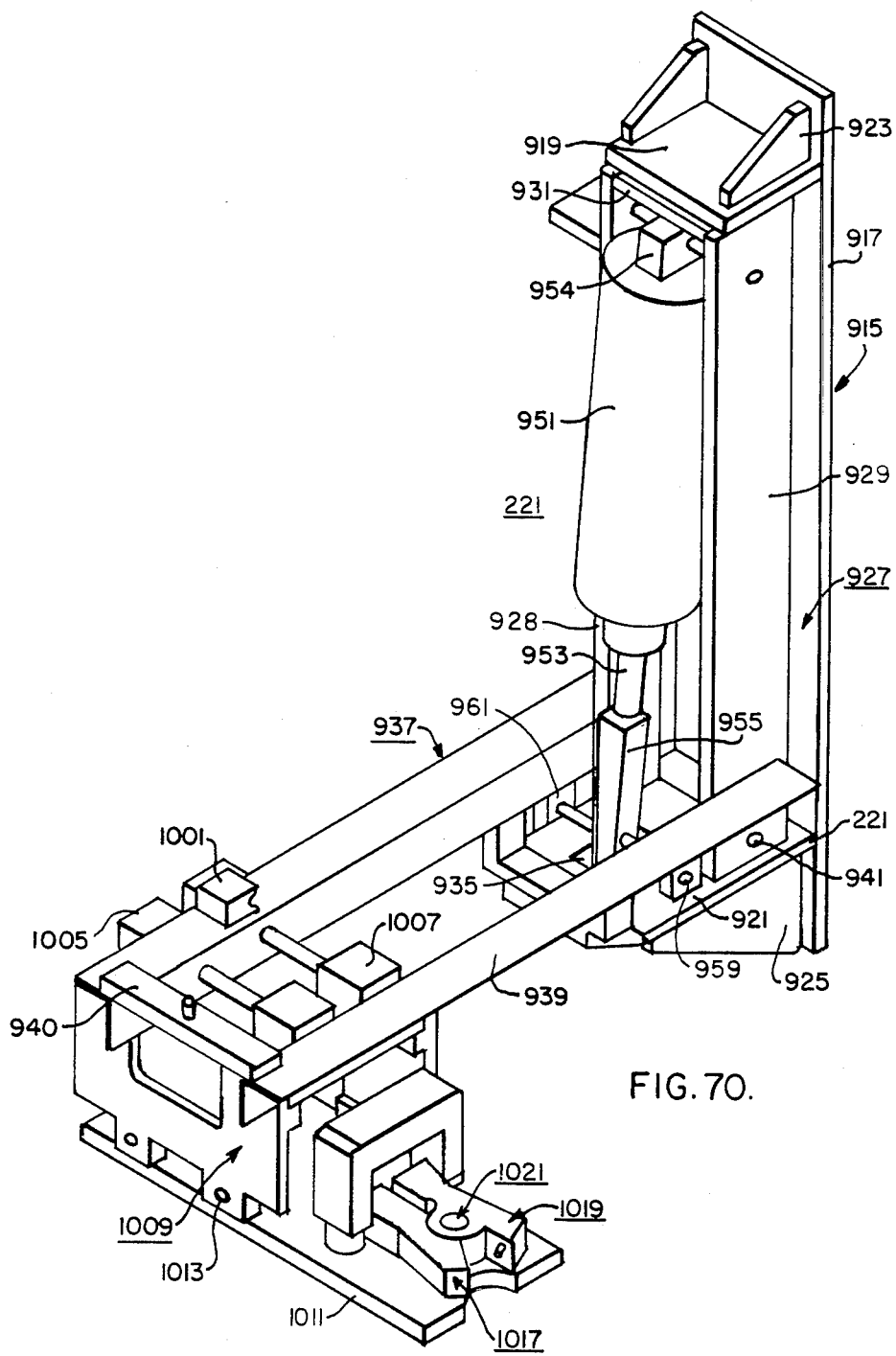
FIG. 70 is a simplified view in isometric showing generally the crimped tool with parts omitted for clarity.

The crimper 221 (FIGS. 70-80, Sheets 44-49; FIGS. 82, 83, Sheet 35) is provided for crimping the locking cup 167 to the flutes in the pin 127b. This crimper tool includes a support 915 formed of a vertical plate 917 having welded near its top and bottom horizontal plates 919 and 921 braced by trapezoidal plates 923 and 925. The vertical plate 917 is mounted on a cluster plate (not shown) which is in turn suspended from the strong-back 202. The plate 921 has a slot 935 (FIGS. 70, 75). A frame 927 having vertical sides 928 and 929 and horizontal sides 931 is mounted pivotal about a vertical axis on flanged bushings 933 (FIG. 75) secured to the top and bottom support plates 919 and 921 and engaging the horizontal sides 931 so that their centers define the axis.

Figure 81:
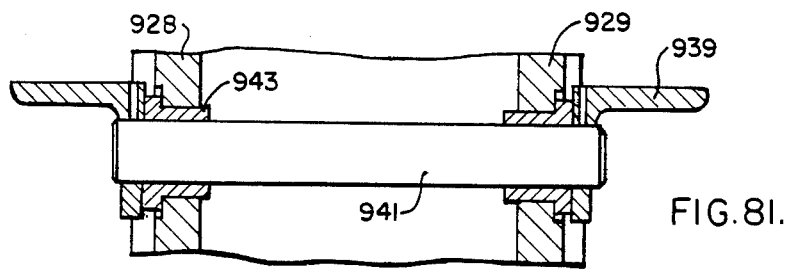
FIG. 81 is a fragmental view in section taken along line LXXXI—LXXXI of FIG. 71.

An angle support 937 formed of angles 939 braced by a cross plate 940 is mounted rotatably at one end on the frame 927 on a pin 941 (FIG. 81) extending between the vertical sides 928 and 929. The pin rides in bushings 943 in the sides 928 and 929. The angle support 937 is rotatable on the pin 941 between the operating position shown in full lines in FIG. 71 and the retracted position shown in broken lines. The angle support 937 carries a stop bracket 945 which engages stops 947 extending from the ends of the bottom plate 921 of the fixed support 915 FIGS. (71, 75). Being suspended from the frame 927, the support 927 is also pivotal about the vertical axis about which the frame is pivotal. The bracket 945 and the stops 947 prevent the angle support 937 from dropping below the plate 921. The angle support 937 also has a stop 949 which abuts the end of the top plate 919 when the angle support is in the retracted position.

The angle support 937 is rotatable between the operating and the retracted positions by a cylinder 951. The cylinder 951 is pivotally suspended on a pin 952 (FIG. 72) passing through a clevis 954 which is bolted to the upper side 931 of the frame 927. The piston rod 953 of the cylinder 951 has an extension 955 which carries a slot 957. The slot is engaged by a pin 959 carried by plates 961 (FIGS. 71, 76, 77) welded to the angles 939. The pin 959 is positioned in the slot 957 between bronze bushings 962 and collars 964 (FIG. 76). Below the slot 957 and pin 959, the piston-rod extension 955 has a cam surface 963 (FIG. 76) which extends into slot 935 in plate 921 (FIG. 75). The cam surface 963 (FIG. 76) is engaged by a pin or bolt 965 extending into the slot 935 from lower plate 921. The pin 965 is adjustably inwardly or outwardly of the cam surface 963. In any position, the pin 965 is locked by nut 968 against plate 921. When the piston rod 953 is extended, it rotates the angle support 935 downwardly about pin 941 as a pivot until the movement is arrested by bracket 945 and stops 947. The extension of the piston rod 953 then continues while the pin 959 moves upwardly along slot 957. The angle frame is now moved; i.e., pivoted about pins 933, until pin 959 engages the upper end of slot 957.

A tension spring 967 connected between an anchor 969 at the inner end of plate 917 and an anchor 971 on the vertical side 928 of the frame 927 exerts a force pulling the frame 927 and the parts connected to it inwardly. Excessive displacement of the frame is prevented by a stop 973 engaging the other side 929 of the angle frame (FIG. 78).

Figure 7:
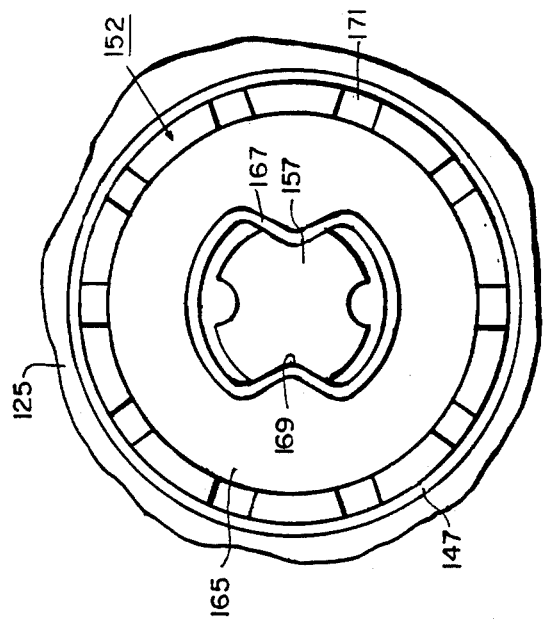
FIG. 7 is a view in end elevation enlarged taken in the direction VII—VII of FIG. 6.

An angle bracket 975 (FIG. 72) is bolted to side 928 of the frame 927. The bolts securing the bracket 975 to side 928 pass through slot 977 so that the height of the bracket 975 is adjustable. A cylinder 979 is suspended from the horizontal member of the bracket 975. A latch 981 is pivotally suspended from the side 928 on a plurality of washers 983 (FIG. 72) and a bolt 984. The latch 981 has a flat tail plate 985 which extends inwardly and a hook 987 which extends outwardly. Above the tail plate 985 a sleeve housing 989 is threaded into a horizontal plate 991 suspended from side 928. The position of the housing 989 is adjustable along plate 991. The housing may be locked in any position by nuts 993. The lower part of the housing 991 is widened providing a shoulder between the upper and lower parts. A spring pin 994 having a tapered tip extends through the housing 989. The pin 994 has a shoulder from which a stem extends into the restricted portion of the housing. A compression spring 995 acts between the shoulder in the housing 989 and the shoulder on the pin, resiliently urging the pin downwardly into engagement with the upper surface of tail plate 985 and pivoting the latch 981 counter-clockwise (as seen in FIG. 7) on the pivot 984. The force of the spring is counteracted by the cylinder 979. This cylinder has an extension 997 on its piston rod 999 which engages the lower surface of tail plate 985 and pivots the latch 981 clockwise. The angle support 937 carries at its outer end a strike or hook 1001. When the angle support is retracted, the piston rod 999 of cylinder 979 is retracted so that the latch 981 is swung to its most counter-clockwise position engaging hook 1001 securing the angle support 937 and the components which it carries in the retracted position. When the angle support is to be set in the operating position, the piston rod 999 is extended rotating the latch 979 clockwise and disengaging hook 1001.

Figure 71:
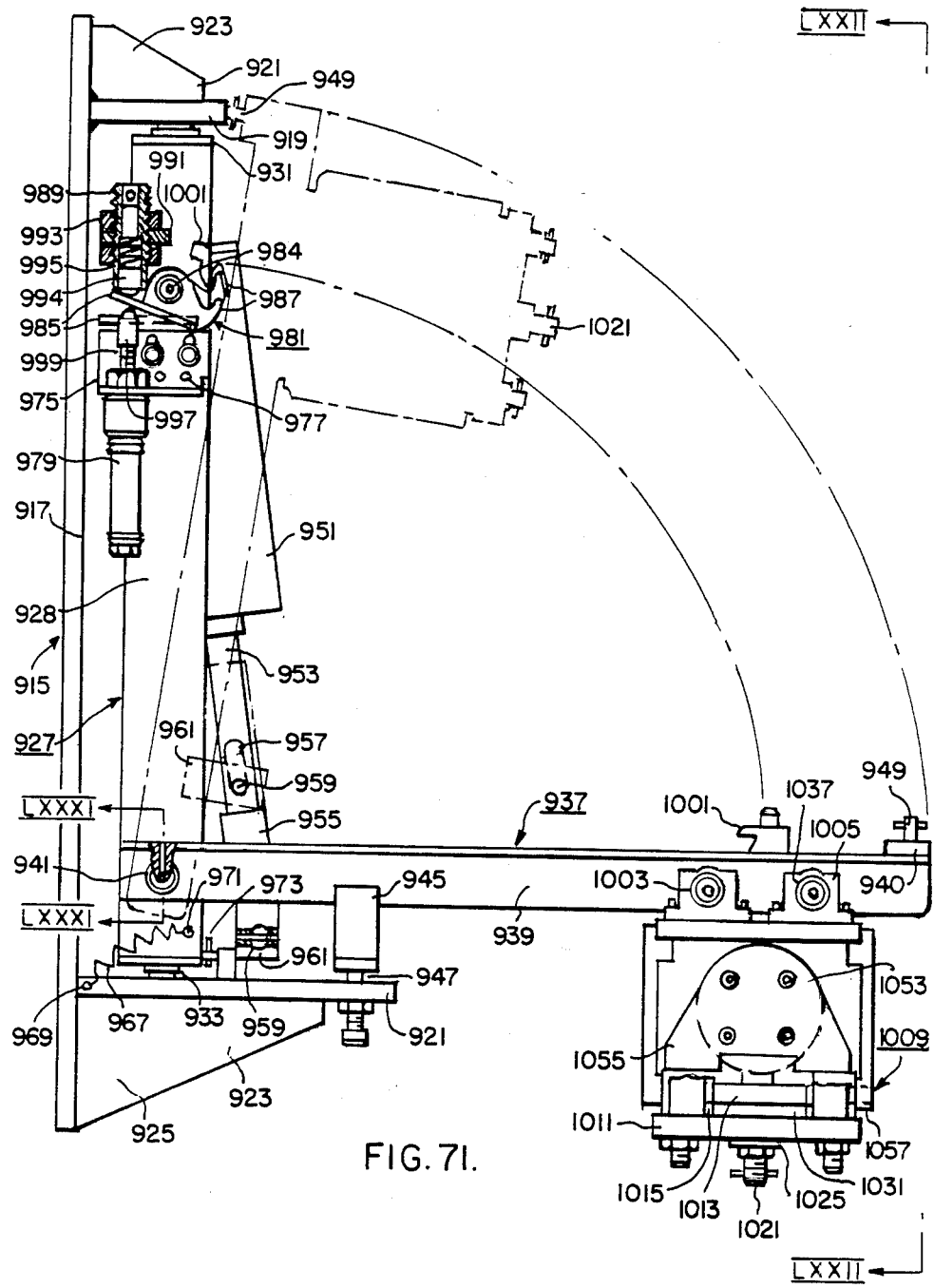
FIG. 71 is a view in front elevation of the crimper tool showing the crimper in full lines in the operating position and in broken lines in the retracted position.

Near the end remote from the support 915, guide rails 1003 are secured to the vertical members of the angles 939 (FIGS. 71, 72). Coaxial pillow blocks 1005 and 1007 are slideable along the guide rails. These pillow blocks support a carriage or housing 1009. The carriage 1009 supports a base plate 1011 on rods 1013. The rods 1013 penetrate through blocks 1015 welded to the base plate 1011 (FIG. 71). The base plate and the parts connected to it may be moved along the rods 1013 relative to carriage 1009 so that position of the base plate in the direction perpendicular to the axes of the rails 1003 (perpendicular to the plane of FIG. 72) may be set. The base plate 1011, once set, is secured in the set position by set screws 1016. The crimping jaws 1017 and 1019 are mounted pivotally on a pin 1021 secured to the outer end of the base plate. The pin 1021 is secured by a lock nut 1023 which is threaded onto the lower end of the pin and engages a washer 1025 between the nut and the plate 1011 (FIG. 72). At the top the pin 1021 is secured to an angle block 1027 by a cap screw 1029. A washer 1030 is interposed between the block 1027 and the pivoting bearings of the jaws but engages a shoulder on pin 1021 clearing the bearings. Another washer 1031 is interposed between the base plate 1011 and the pivotal bearings of the jaws and a shoulder on pin 1021.

Each guide rail carries a compression spring 1035 (FIG. 72). Each spring engages pillow block 1007 at one end and is engaged by a member 1037 clamped to the guide rail at the opposite end. The springs 1035 resiliently urge the pillow blocks 1007 and the parts connected to them including the base plate 1011 outwardly. At its outer end, the base plate 1011 has a downwardly facing shoulder 1039 (FIG. 73). Above this shoulder the base plate terminates in a cylindrical surface 1041 which has the same curvature as the nuts 163. The relative position of the crimper tool 221 and the pin-insertion/torque tool 219 on the strong-back 202 (FIG. 9B) is such that when the angle support 937 of the crimper tool is moved to the operating setting, the coaction of the pin 965 and cam surface 963 (FIG. 76) advances (pivots) the base plate 1011 outwardly so that the shoulder 1039 seats on the top of the flange 125 of the LGT 113, whose old pins 127a have been replaced by new pins 127b, and the cylindrical surface 1041 seats precisely against the new nut 163. The springs 1035 hold the surface 1041 in resilient engagement with the nut 163. The pin-insertion/torque tool 219 is, during this operation, in the retracted position with the pin 127b on the blade 815.

At the outer end the pillow blocks 1007 engage a plate 1043 (FIGS. 72, 72A) which is slideable on the rails 1003. This plate is connected to the carriage 1009. The position of the plate 1043, longitudinally of the rails 1003, is adjustable by bolts 1045 each of which is threaded into a boss 1047 on each angle 939 (FIG. 72A). Each bolt carries a block 1049 at its inner end and may be locked in any position by a nut 1051. The position of the carriage 1009 and the parts connected to it including base plate 1011, longitudinal of the rails 1003, is thus adjustable.

Figure 79:
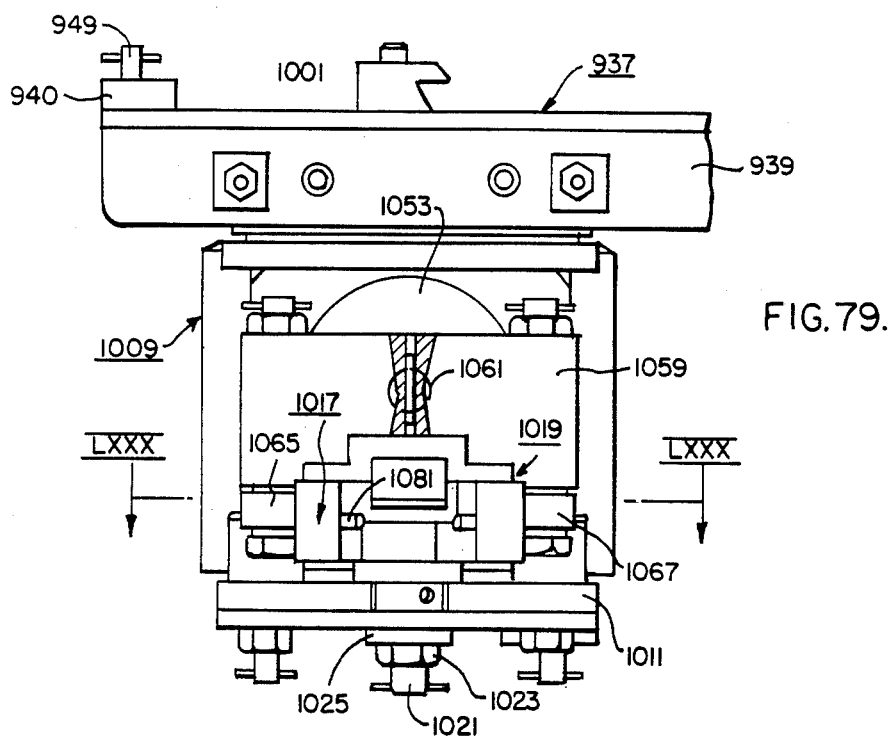
FIG. 79 is a fragmental view in end elevation, taken in the direction LXXIX—LXXIX of FIG. 72, showing the mechanism which produces the crimping.
Figure 80:
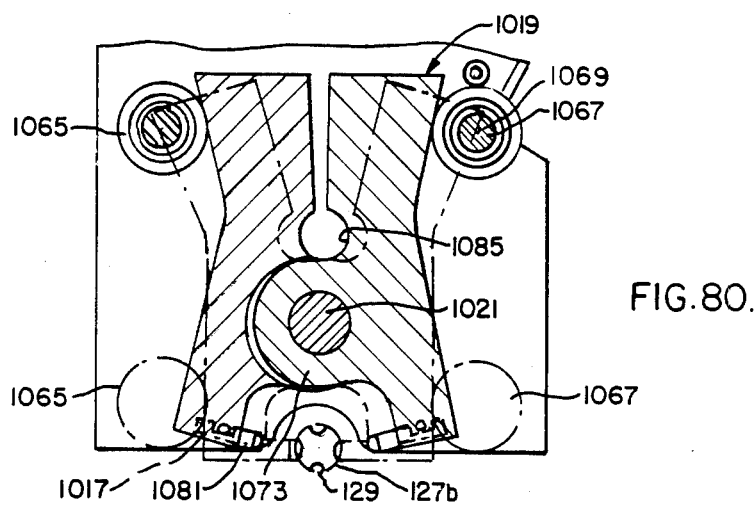
FIG. 80 is a fragmental view in transverse section taken along line LXXX—LXXX of FIG. 79.

A cylinder 1053 (FIG. 73) is supported horizontally in carriage 1009 on an angle bracket 1055. This angle bracket is bolted to spacer blocks 1057 supported on base plate 1011. A bearing yoke 1059 is mounted on an extension 1061 of the piston rod 1053 of the cylinder 1063 (FIGS. 72, 79). The bearing yoke 1059 supports rollers 1065 and 1067 on bearing screws 1069. These rollers engage cam surfaces 1071 of the jaws 1017 and 1019. In FIG. 80, the rollers 1063 and 1067 are shown in full lines in the retracted position and in broken lines in the crimping position.

The blank for jaw 1017 is shown in FIGS. 82 and 83 (Sheet 35). This jaw includes a circular hub from which arms extend. The opening in the hub is constricted at one end providing a shoulder 1075. Jaw 1019 is interlocked with jaw 1017, the constricted portion of its hub seating in the expanded portion of the hub of jaw 1017 and its lateral surface engaging shoulder 1075. The openings 1077 in the jaws are coaxial and are engaged by pin 1021 (FIGS. 72, 80). The arms of the jaw extending on each side of the hub have the cam surface 1071 on one side. At one end the jaw 1017 has an opening 1079 for a crimping pin 1081 (FIG. 80, Sheet 49). At the same end there is an opening 1083 perpendicular to opening 1079 for a locking pin 1086 (FIG. 80) for the crimping pin 1081. The cam surfaces 1071 have a contour such that the crimping jaws are opened with the rollers 1065 and 1067 retracted (full lines FIG. 80) and closed with the rollers advanced (broken lines FIG. 80). The semi-circular extension 1085 of each hub 1073 affords clearance for the closing of the jaws.

Figure 84:
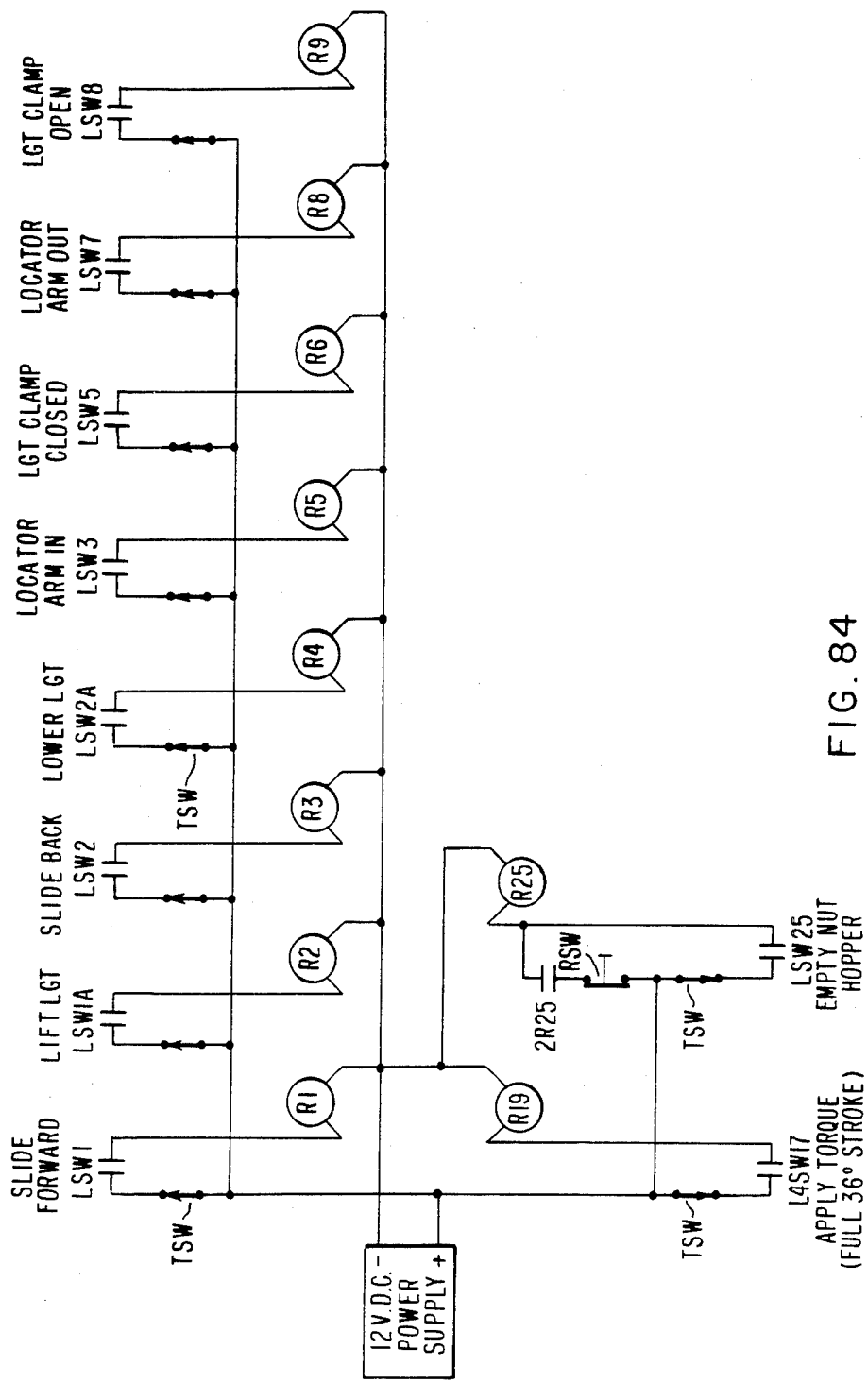
FIG. 84 (Sheet 50) is a schematic of a part of the input circuit of the apparatus in accordance with the invention.
Figure 85:
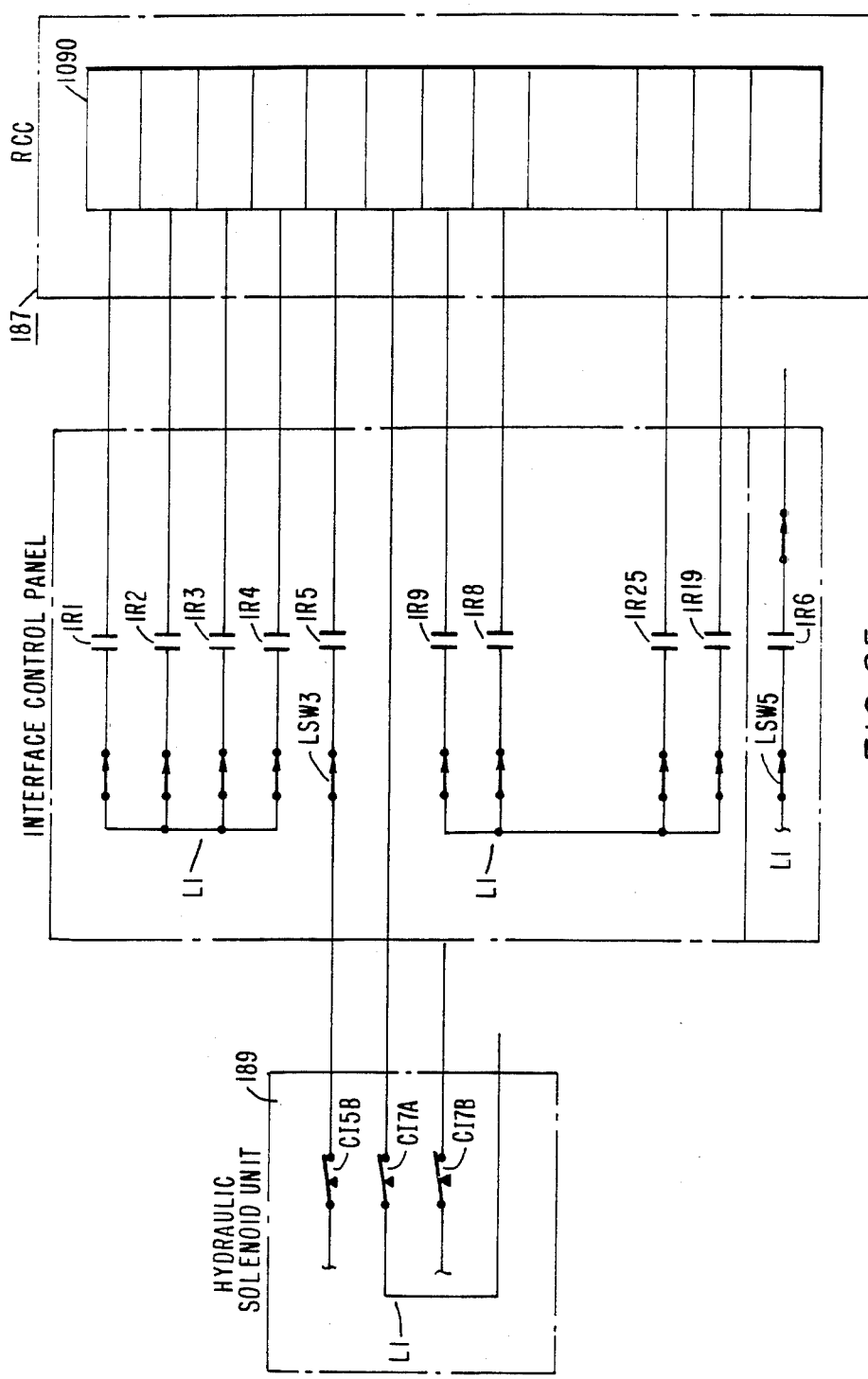
FIG. 85 is a schematic showing the circuit of the contacts of the relays of FIG. 84.

FIGS. 84 and 85 (Sheet 50) together constitute the schematics for the limit switch sensors. These switches are predominantly magnetic reed switches. On the whole, these schematics are self explanatory since the functions of each contact is identified. Each switch LSW1 through LSW25 when closed energizes a relay R1 through R25 (FIG. 84). The contact of each relay is identified by a number before the R. For example, 1R1 (FIG. 85) is the contact of relay R1. Only relay R25, the empty nut-hopper relay, has two contacts, 1R25 and 2R25. Contact 1R25 is closed when relay R25 is energized. Contact 2R25 locks in relay R25 since LSW25 is opened once the first new nut 163 is deposited in the magazine 717 (FIGS. 39, 40, 41). Relay R25 may be reset by pushbutton switch RSW on the operator's control panel 193 (FIG. 12). Switch L4SW17 which controls the torquing of the new nut 163 is operated repeatedly. A toggle switch TSW is in series with each limit switch. This toggle switch opens the circuit if a limit switch sticks in the closed position. The switches TSW are in the diagnostic interface panel 197 (FIG. 8). Since the limit switches are under water, the relay circuits are energized from a low voltage (12 volt) supply.

As shown in FIG. 85, the contacts 1R1 through 1R25 are connected to supply intelligence to the robotic control center 187 when they are closed. The contacts 1R1 through 1R25 are connected through modules 1090 to the input register IR of the computer 199 (FIG. 8, Sheet 6). The supply to these circuits is designated L1 and may be an ordinary commercial 110 volt supply. Intelligence to the computer 199 is also transmitted through pressure switches, for example, CI5B and CI7A. (CI stands for clamp-index tool.) CI5B is the pressure switch on solenoid CI5A which is closed when the solenoid advances the corresponding piston of cylinder 415 (FIG. 23, Sheet 18) to the position in which the locator arm 418 is "in". The locator arm 418 is the arm on the yoke 416 which is pivoted by cylinder 415. CI5B backs up contact 1R5. The closing of contact 1R5 only sends sensor intelligence to the robotic control center if CI5B is closed; i.e., if the arm 418 is in the "in" position 428. CI7A is a pressure switch for solenoid CI7A which controls clamping cylinder 389. With CI7A closed the robotic control center has the intelligence that the LGT is not clamped; with CI7A open the intelligence is that the LGT is clamped.

Figure 86:
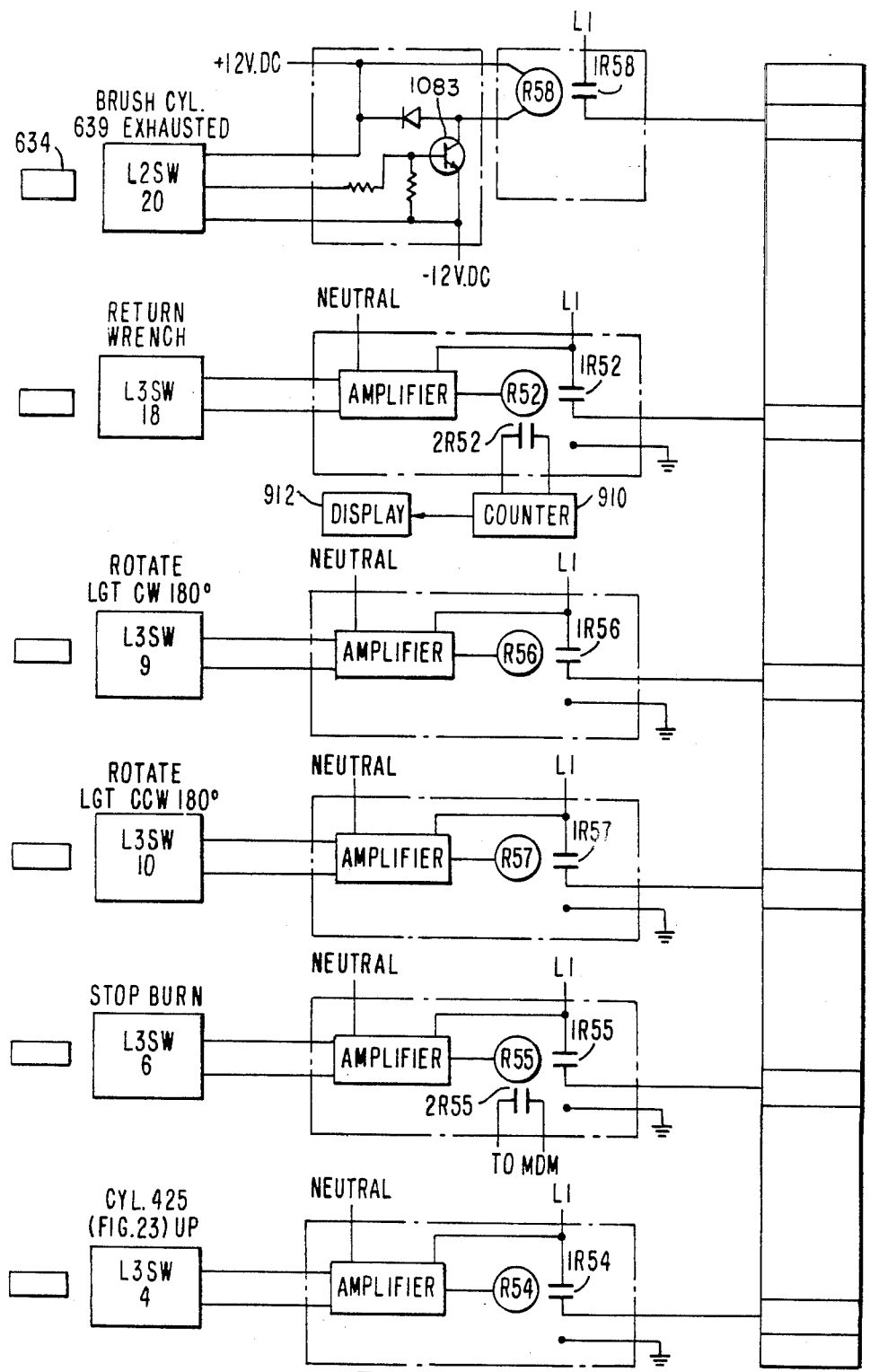
FIG. 86 is a schematic showing another part of the input circuit of the apparatus in accordance with this invention.

FIG. 86 shows the schematics for the proximity switches. Switch L2SW20 signals when the brush is set in neutral position with the cam followers 663 centered on the diagonals of the cam slots 661 (FIG. 58, Sheet 38). Switch L2SW20 is under water and is operated from a low-voltage supply. The output of L2SW20 is impressed on the base emitter input of amplifier 1096. With the switch L2SW20 actuated by magnet 634, relay R58 is energized closing contact 1R58 which transmits a signal to the robotic command center 187 through a module 1092 to input register IR. The other schematics are self-explanatory by their labelling. Relay R55 has two contacts 1R55 and 2R55. Contact 1R55 transmits a signal that the split-pin assembly has been separated. Contact 2R55 turns off the power in the arc to the MDM 213 (FIG. 9).

Figure 87:
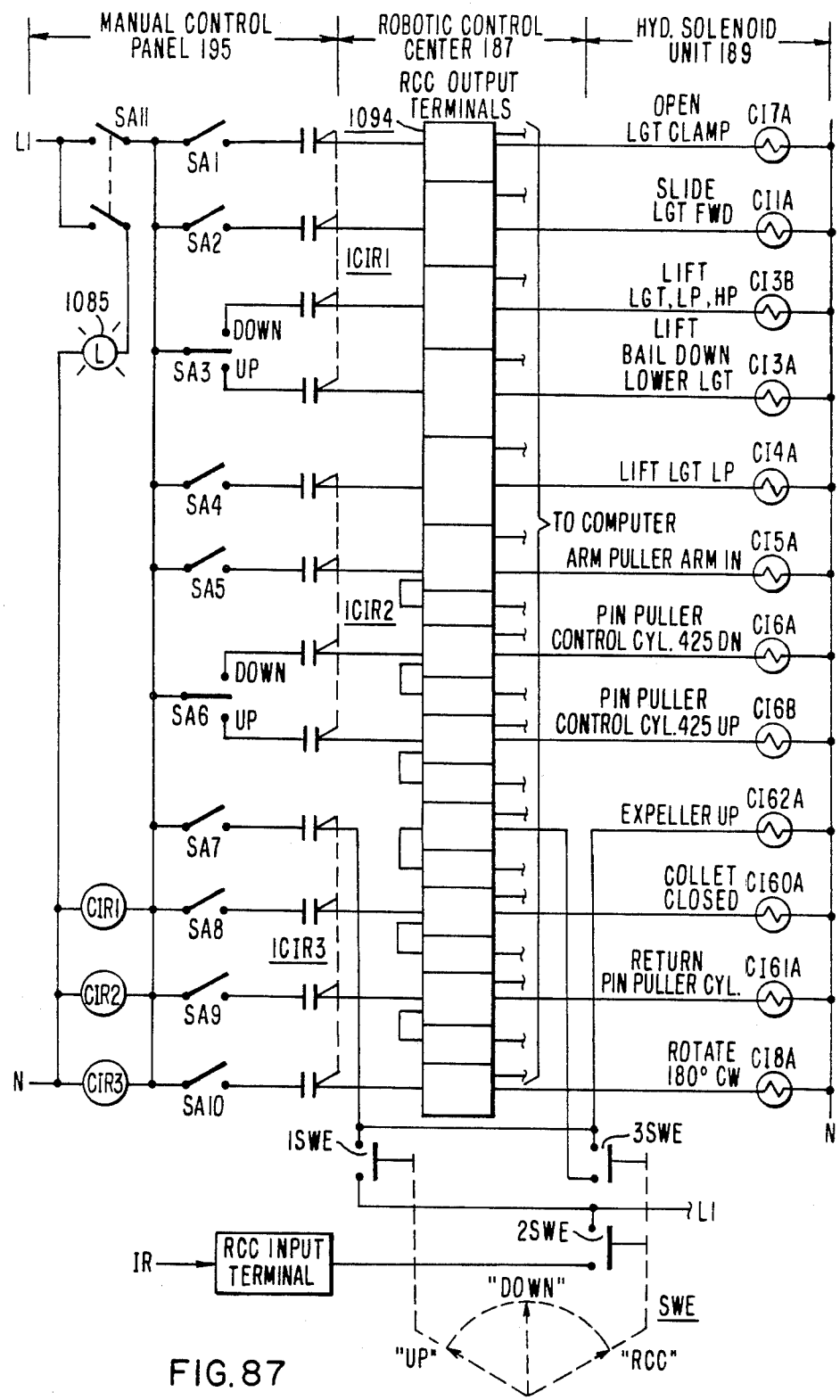
FIG. 87 is a schematic showing the manual and automatic output circuit for the clamp-and-index tool (CI)

FIG. 87 shows the circuit for operating the clamp-index tool 211 including the pin puller and expeller 375 (FIG. 23). The parts which make up this circuit are mounted in the hydraulic control unit 189, the robotic control unit 187 (FIG. 8) and the manual control panel. The solenoids and their functions are presented as labelled circles on the right. The solenoids are labelled CI (Clamp Index) followed by a designation such as 7A or 1A. The robotic control center has a bank 1094 of separate output terminals which are insulated from each other. These terminals are selectively supplied with power from line L1 through the output group OG (FIG. 8) as commanded by the computer 199. The computer responds to input signals derived from the sensors (FIGS. 85, 86). Each terminal of the bank 1092 is connected to the neutral bus N through a solenoid. When a terminal is supplied from a conductor of the output group, the corresponding solenoid is energized moving the piston of the corresponding cylinder.

The pin-puller and expeller 375 has two modes of operation: it removes a severed fragment 471 of pin 127a (FIG. 33F, Sheet 20) and it centers the LGT 113. Three position switch SWE is provided to set the pin-puller and expeller for the different operations. In the center position labelled "DOWN" the expeller 441 (FIG. 23A) is retracted. In the left-hand position, labelled "UP", the solenoid CI62A is energized from line L1 through contact 1SWE. In the right-hand position, labelled RCC, the operation is automatic. To extract a split-pin-fragment 471, input register IR is enabled to receive a signal through contact 2SWE to extract a pin and the output is enabled to energize CI62A through contact 3SWE.

The solenoids may be selectively energized manually. For this purpose switch SA11 is closed. Turning on light 1085 from line L1 and also energizing relays CIR1, CIR2 and CIR3. Multiple contacts 1CIR1, 1CIR2 and 1CIR3 are closed connecting toggle switches SA1 through SA10 to corresponding terminals of bank 1094. Now the solenoids may be selectively energized by closing selected toggle switches SA1 through SA10.

Figure 88:
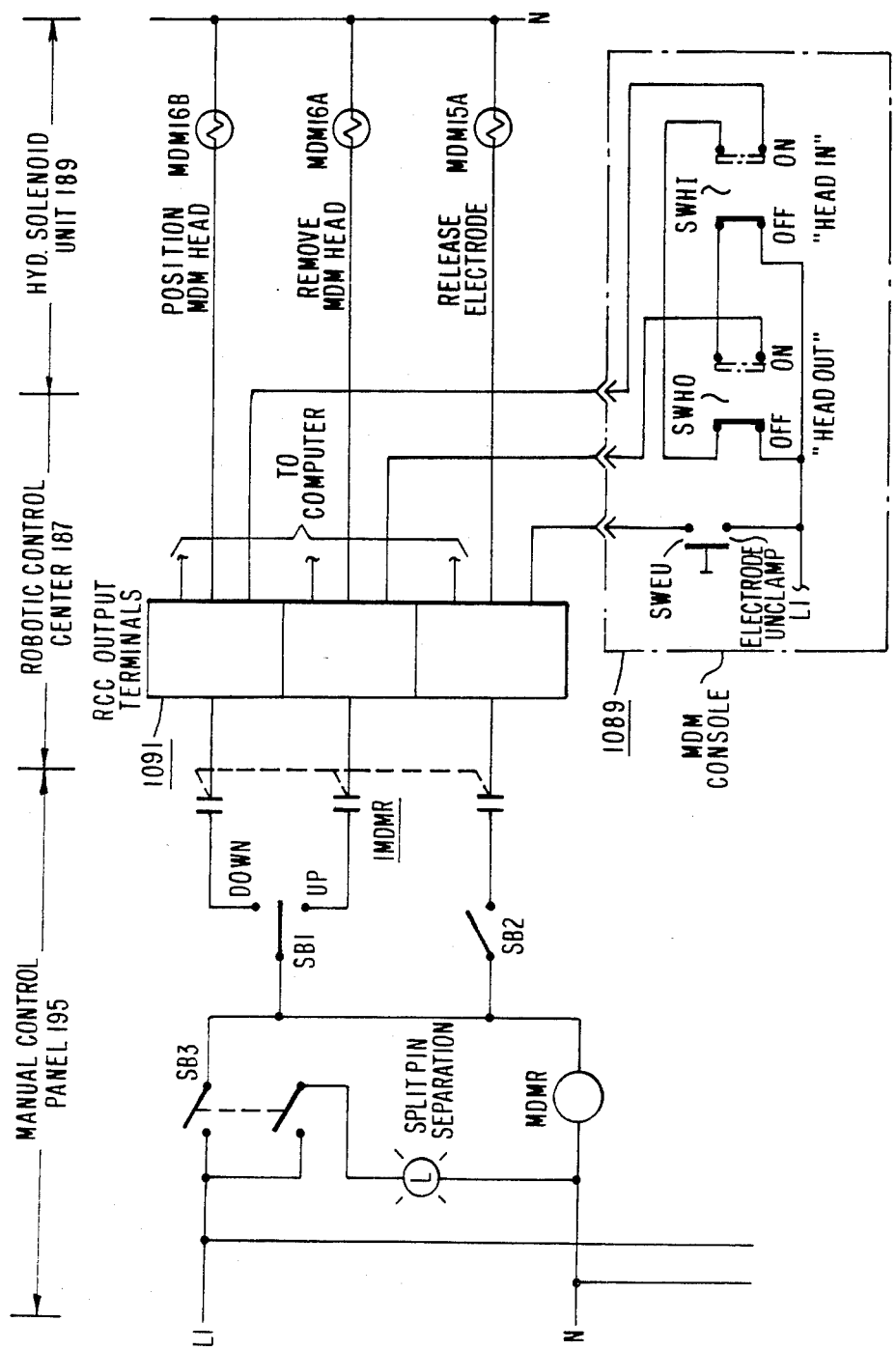
FIG. 88 is a schematic showing the manual and automatic output circuit for the MDM.

FIG. 88, which shows the circuit for the MDM 213 (FIG. 42), is similar to, and can be understood from, the above description of FIG. 87. The MDM console 1089 is the separate console or panel 194 (FIG. 8, Sheet 6). Switch SWEU when closed permits the electrode 495 to be unclamped. Two position switch SWHO when set in "ON" conditions solenoid MDM 16A to be energized through terminal bank 1091 to move MDM 213 away from the nut 145, which is threaded on pin 127a, along tracks 485. Swith SWHI when set in "ON" conditions solenoid MDM 16B to be energized to move towards the old nut 145.

Figure 92:
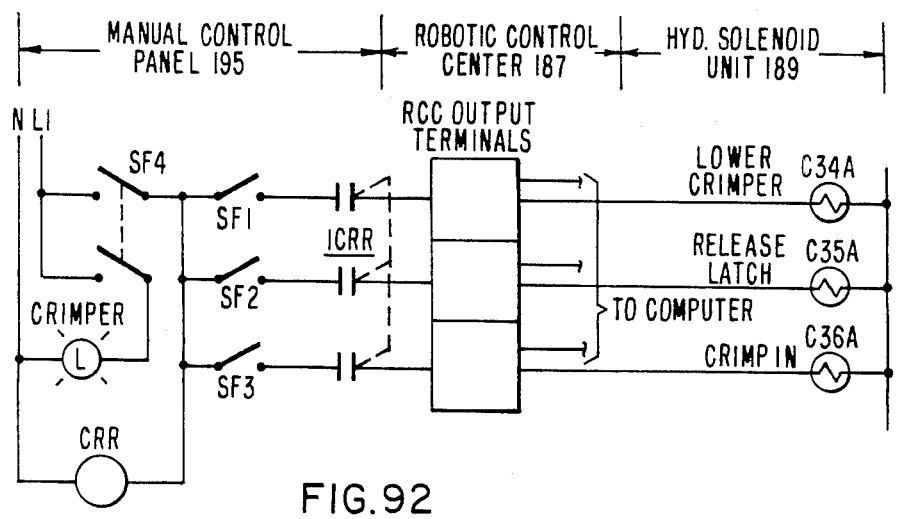
FIG. 92 is a schematic showing the manual and automatic output circuit for the crimper (C)
Figure 92A:
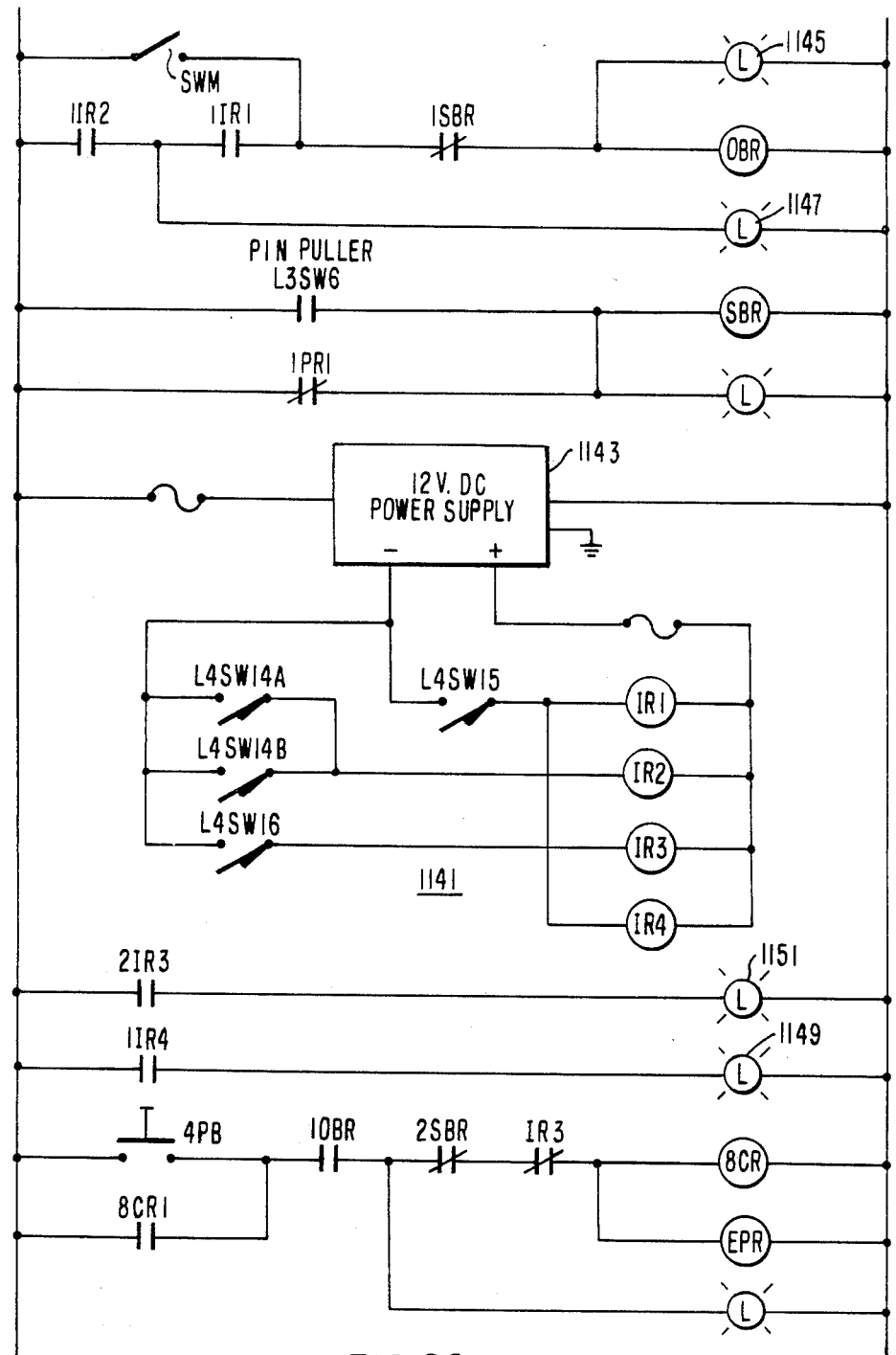
FIGS. 92A and 92B are schematics showing the essential features of the MDM circuit involved in this invention.
Figure 92B:
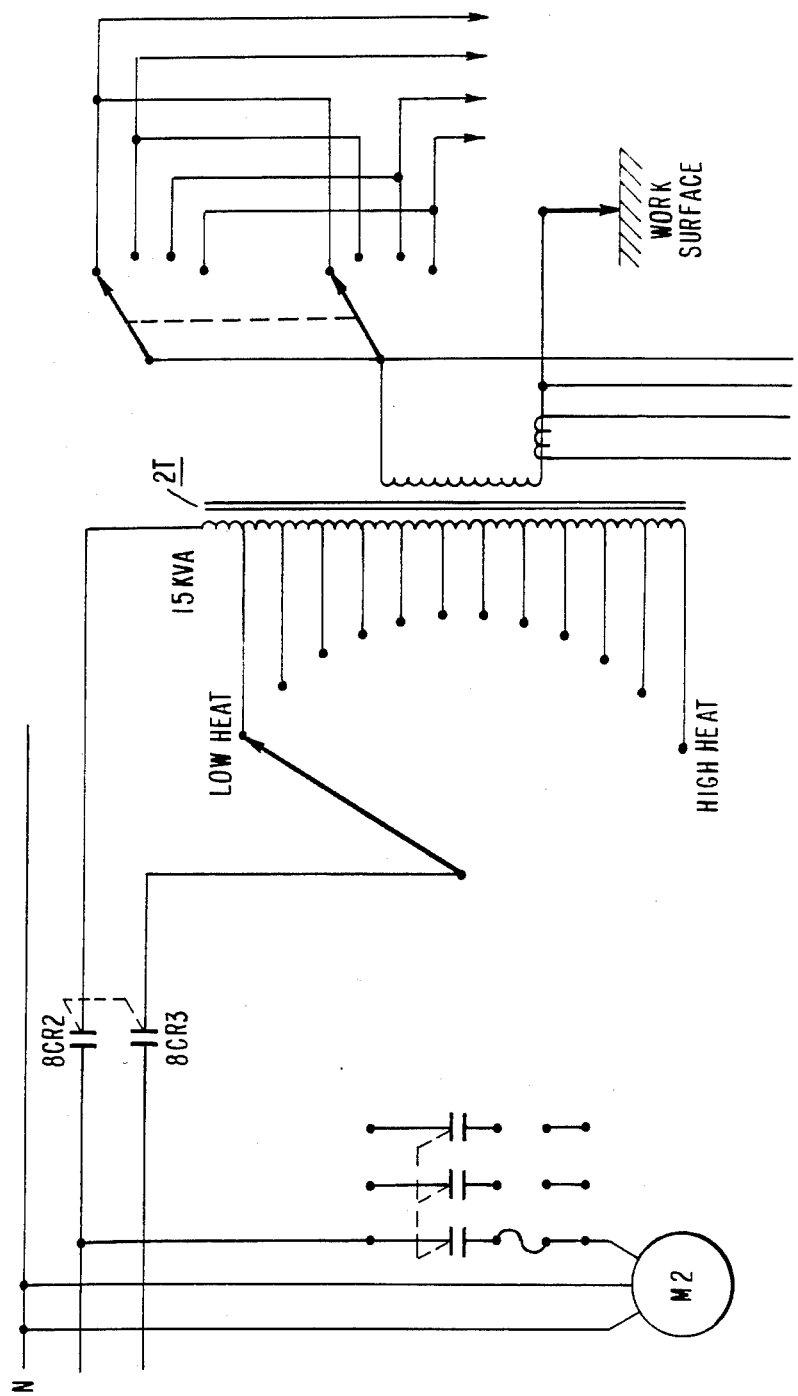

Only the parts of the MDM circuit which involves the split-pin replacement apparatus of this invention are described herein with reference to FIGS. 92A and 92B (Sheets 58 and 59). The remainder of the circuit is largely conventional. The sensor switches L4SW14A, L4SW14B, L4SW15 and L4SW16 are connected in a circuit 1141 supplied from a 12-volt supply 1143 since these switches are under water. L4SW14A, L4SW14B and L4SW15 are closed when the glass head 519 (FIG. 43A) of the MDM is properly seated against the old nut 145 and on the flange 125. The closing of L4SW15 energizes relays IR1 and IR4. The closing either of L4SW14A or L4SW14B energizes 1R2. Contacts 1IR1 and 1IR2 are closed energizing OK-to-burn relay OBR through back contact 1SBR of stop-burn relay SBR. Also, signal lights 1145 and 1147 are turned on and light 1149 is turned on through contact 1IR4. These lights and all others are on the MDM panel and the relays are in the MDM console. Contacts 1IR1 and 1IR2 may be bypassed by switch SWM also on the MDM panel. With the pumps (351, Green et al. application Ser. No. 617,854) turned on, contact 1PR1 is open and relay SBR is deenergized. Switch L4SW16 (FIG. 43) is at this time open because its actuator 496 is above the switch. Relay IR3 is deenergized and contact 2IR3 is open and back contact 1IR3 is closed. With relay OBR energized, contact 10BR is closed. On closing of pushbutton 4PB, relay 8CR is energized through back contact 2SBR and 1IR3. Relay 8CR is locked in through contact 8CR1. Relay EPR is also energized and locked in. Back contact 1EPR (not shown) is opened preventing the MDM from being raised to the surface of the pool 183 while the arc is burning. When relay 8CR is energized, contacts 8CR2 and 8CR3 are closed supplying power to transformer 2T and energizing the electrode circuit. The pump motor M2 was energized when the main circuit was turned on. When switch L4SW16 is closed by actuator 496, relay 1R3 is energized. Contact 2IR3 is closed turning light 1151 on to indicate that the electrode has bottomed. In addition, contact 1IR3 opens deenergizing relays 8CR and EPR. Contacts 8CR2 and 8CR3 open deenergizing the arc.

Figure 89:
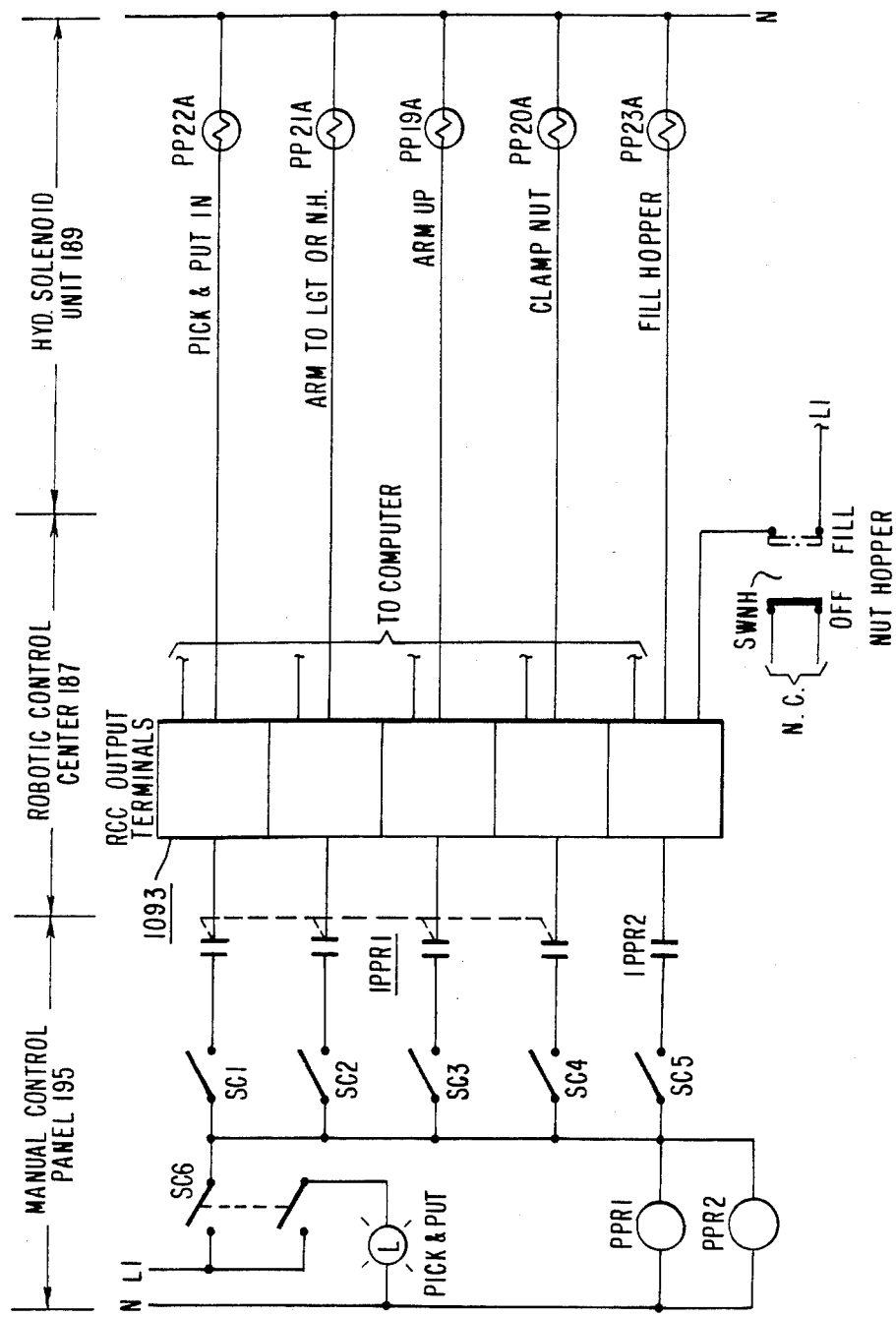
FIG. 89 is a schematic showing the manual and automatic output circuit for the pick-and-put tool (PP)

The circuit for the pick-and-put tool 217, shown in FIG. 89, can be understood from the above description of FIG. 87. Solenoids PP19A through PP23A are energized selectively through terminals 1093, as commanded by computer 199 (FIG. 8) through the OG conductors. Two position switch SWNH conditions solenoid PP23A to be energized when the nut hopper 715 (FIGS. 39, 40, 41) is being filled. The new nuts 163 are deposited through a tube from above the pool. However, as each nut is deposited arm 727 is actuated by solenoid PP23A to advance the deposited nut towards the position where the nuts are removed.

FIG. 90, which shows the circuit for the pin-insertion/torque tool, also can be understood from the above description of FIG. 87. Solenoids PT24A through PT29A and PT27B and PT29B are selectively energized on commands from computer 199 through the OG conductors and terminals 1095. The two new split pins 127b in each LGT113 are oriented with their tines 129 at 90° to each other. The orientation is effected by cylinder 897 (FIG. 62) which rotates blade 815 (FIG. 64) that carries the pin 90° from the 0° position. This operation may be carried out under the control of computer 199 or manually depending on the setting of three way switch SWPO. The manual operation is desirable in situations where untorquing is to take place. Normally switch SWPO is set in the 90° setting, position B. With solenoid PT25A deeneergized the pin 127b is in this setting. For manual operation, switch SWPO is set in position A, closing contact 1SWPO. Solenoid PT25A is energized turning pin 127b to the 0° setting. For operation under command of computer 199, switch SWPO is set in position C. Contacts 2SWPO and 3SWPO are closed. At contact 2SWPO the input register of the computer 199 is conditioned to receive an appropriate sensor signal through input terminal 1097. At contact 3SWPO solenoid PT25A is enabled to be energized by a signal through an OG conductor and the corresponding terminal of strip 1095.

Figure 91:
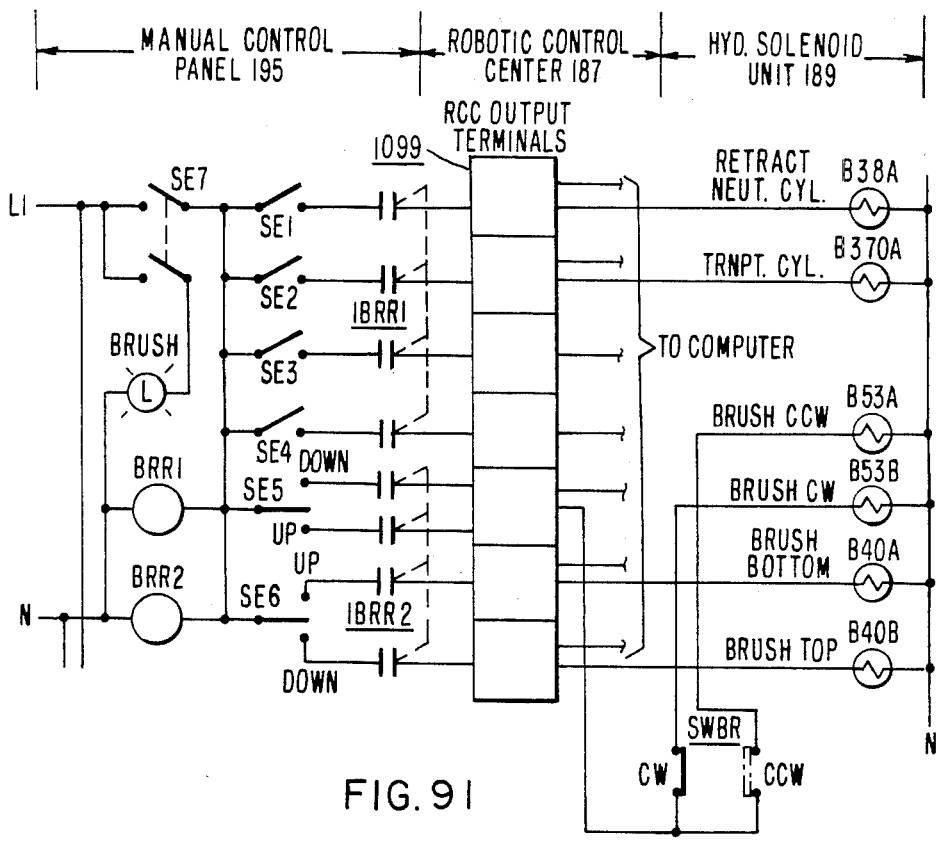
FIG. 91 is a schematic showing the manual and automatic output circuit for the brush tool (B)

The circuit for the brush tool 215 (FIG. 9) shown in FIG. 91, can be understood from the description of FIG. 87. The solenoids which control the brush tool and its cylinders are selectively energized through the terminals 1099 as commanded by the computer through the respective OG terminals. The direction of rotation of the brushes 687 and 689 (FIG. 57) is controlled by switch SWBR through solenoid B53B for clockwise rotation and through solenoid B53A for counter-clockwise rotation.

The crimper tool control circuit shown in FIG. 92 can be readily understood from the description of FIG. 87.

Figure 93A:
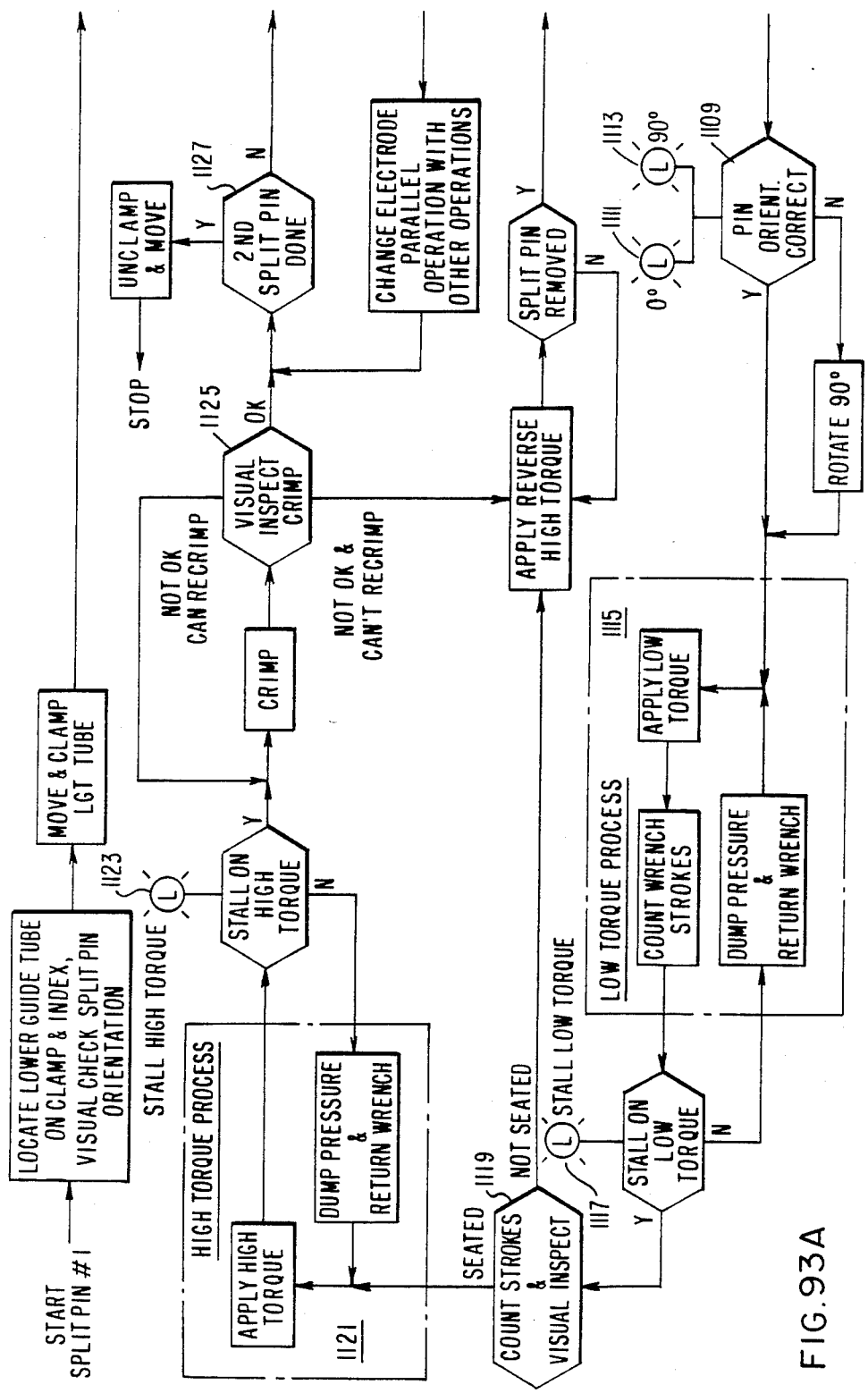
FIGS. 93A and 93B, together constitute is a diagram showing the algorithm of the operation of the apparatus according to this invention.
Figure 93B:
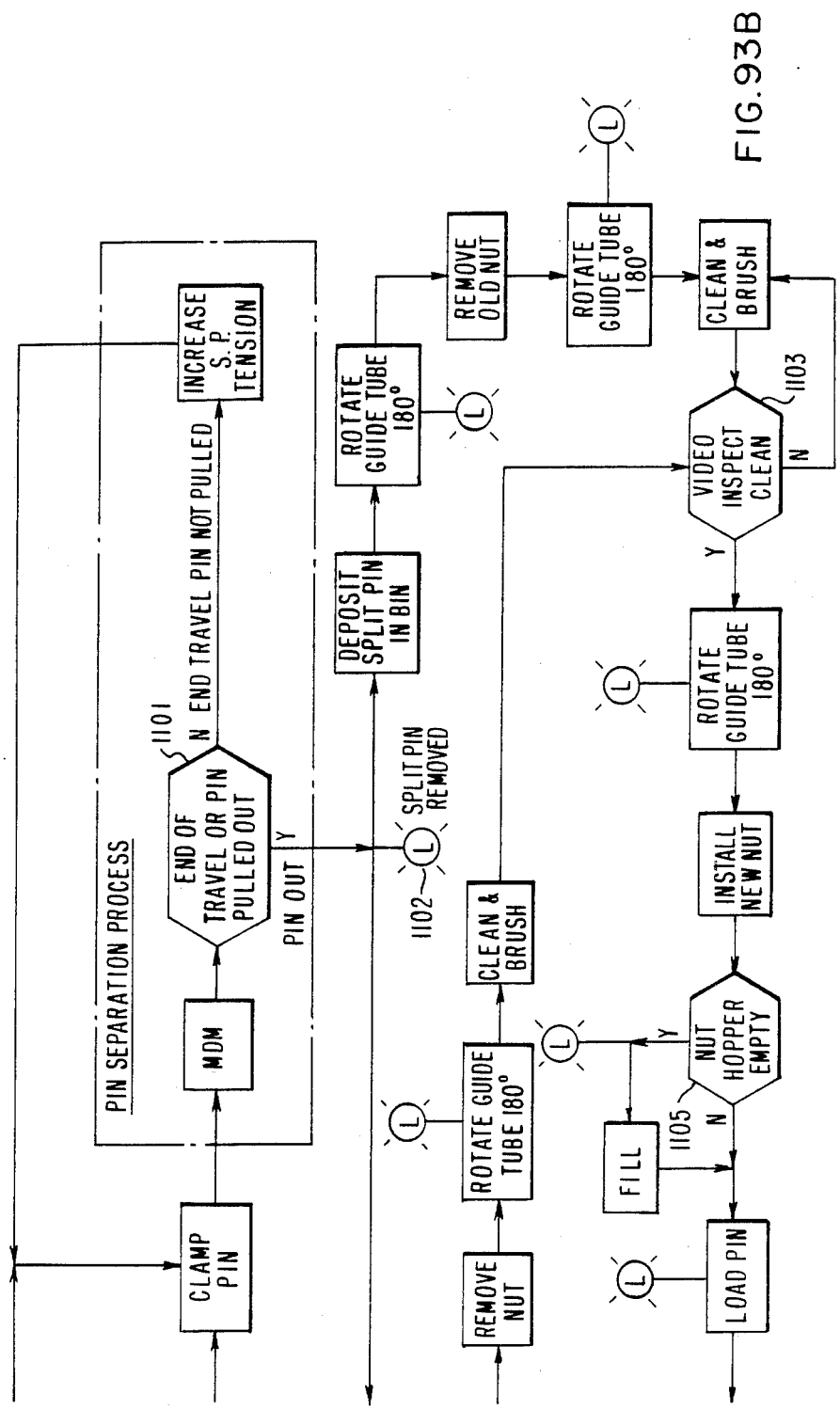

The algorithm shown in FIGS. 93A and 93B is self explanatory. The operation of each tool is initiated manually to assure reliability. The decision network 1101 (FIG. 93B) is carried out to assure that the fragment of old pin 127a has been removed before the operation is continued. If the pin has not been pulled out, limit switch L3SW6 (FIG. 23, Sheet 18) does not close and light 1102 is not turned on. In this case the tension on the pin by cylinders 423, 425 (FIG. 23) is increased to remove the old pin.

The decision network 1103 serves to verify by closed circuit TV that the upper and lower counterbores 147 and 149 (FIG. 5) in the LGT flange 125 are clean. Decision network 1105 is governed by limit switch LSW25 (FIGS. 39, 40). Light 1107 is turned on if the nut hopper 218 is empty.

Figure 99A:
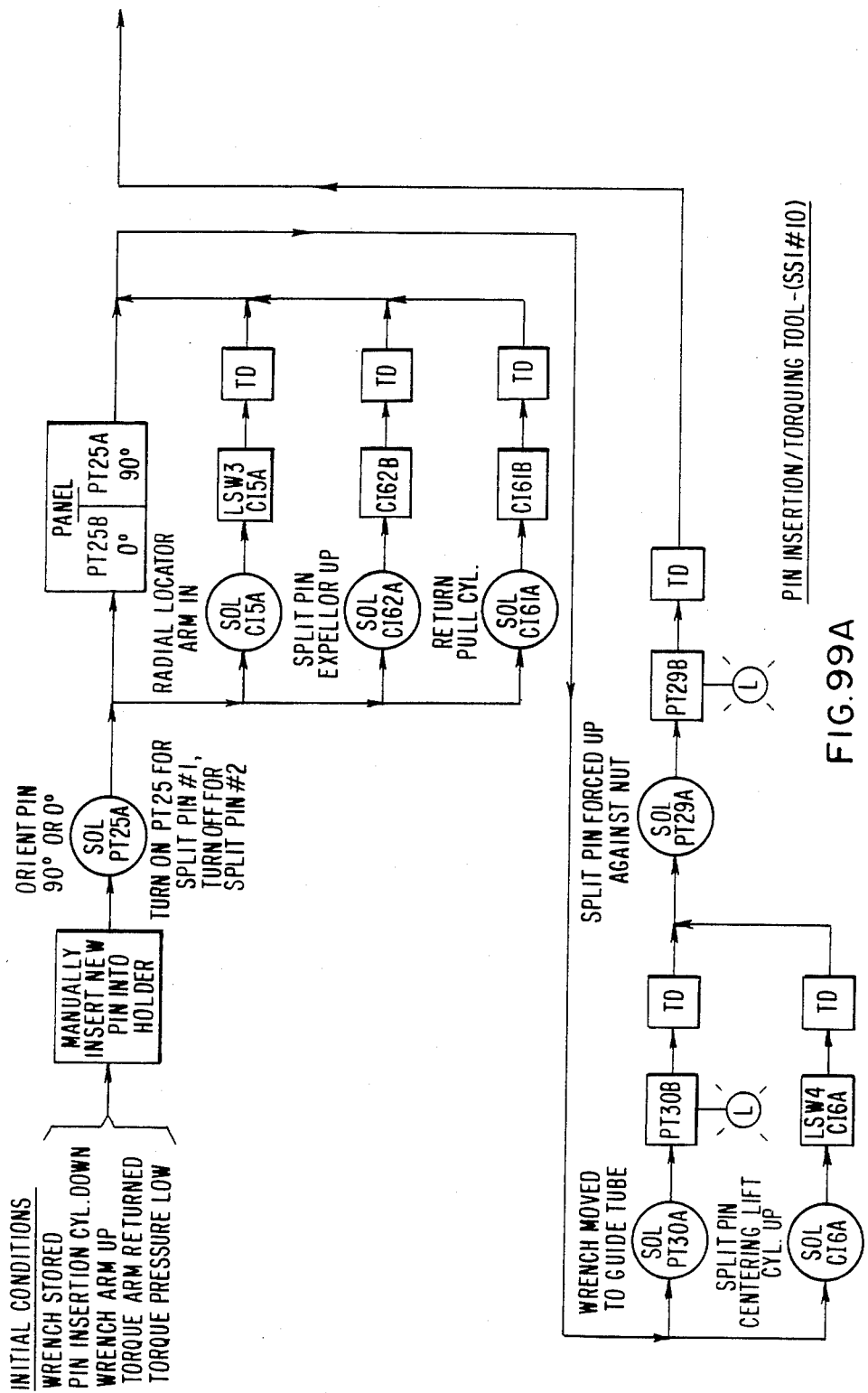
FIGS. 99A, 99B, 99C, 99D together constitute a block flow diagram showing the steps involved in the operation of the pin-insertion/torque tool.
Figure 99B:
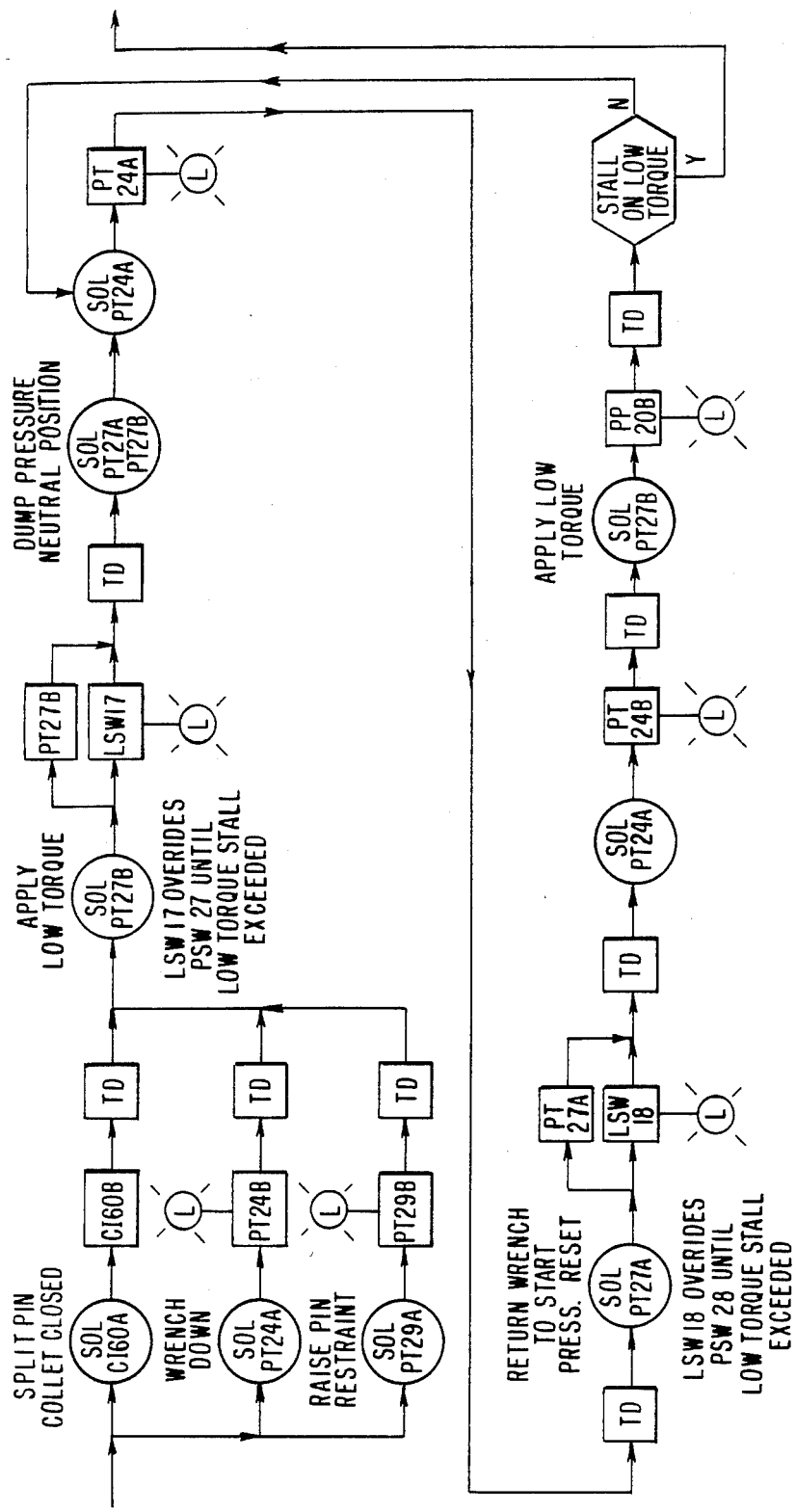

Decision network 1109 is governed by pressure switches PT25A and PT25B of solenoid PT25A (FIG. 99A, Sheet 69). Switch PT25A is closed if the orientation is at 90° and PT25B is closed if the orientation is at 10°. For 0°, light 1111 is on and for 90°, light 1113 is on.

Figure 99C:
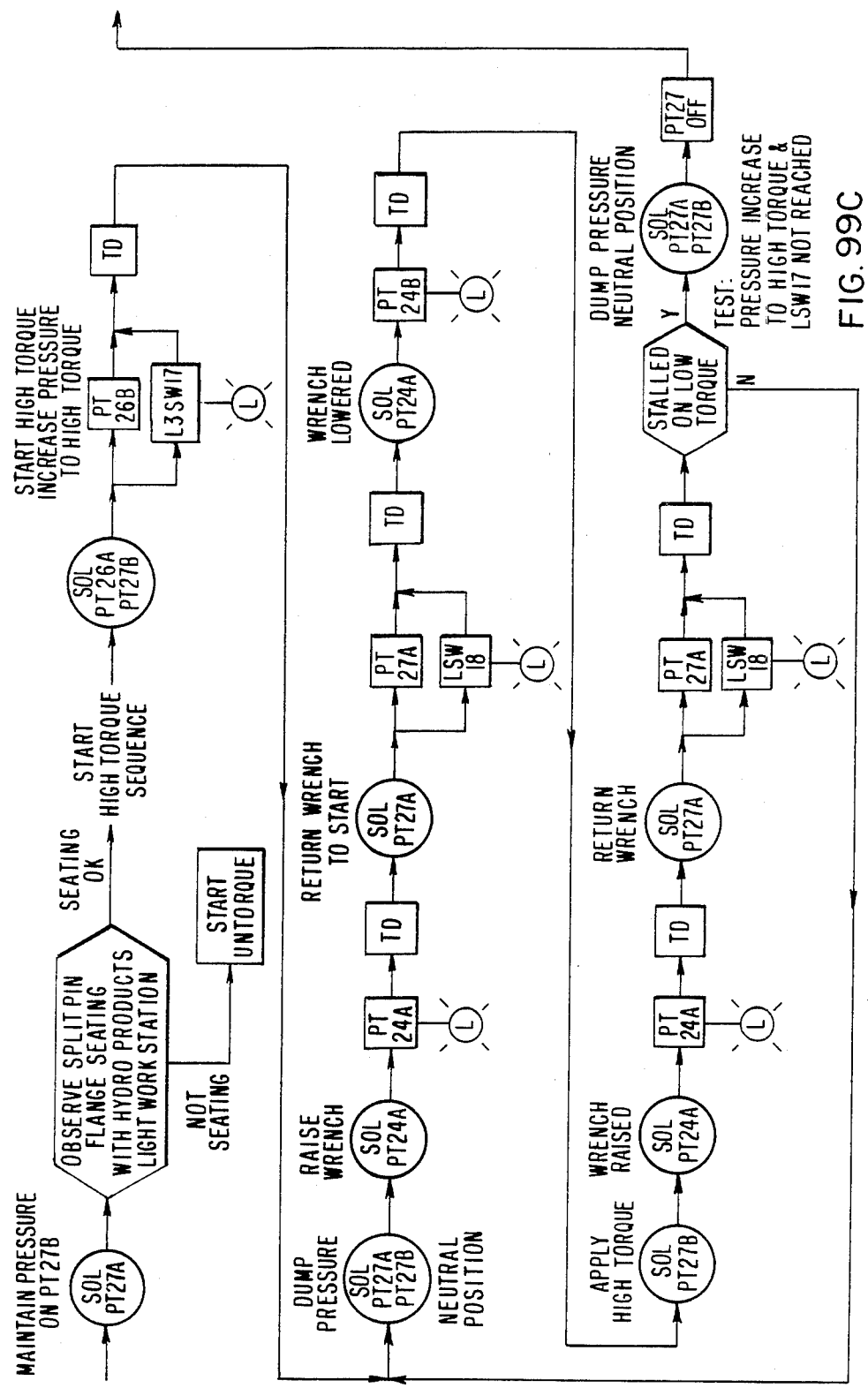
Figure 99D:
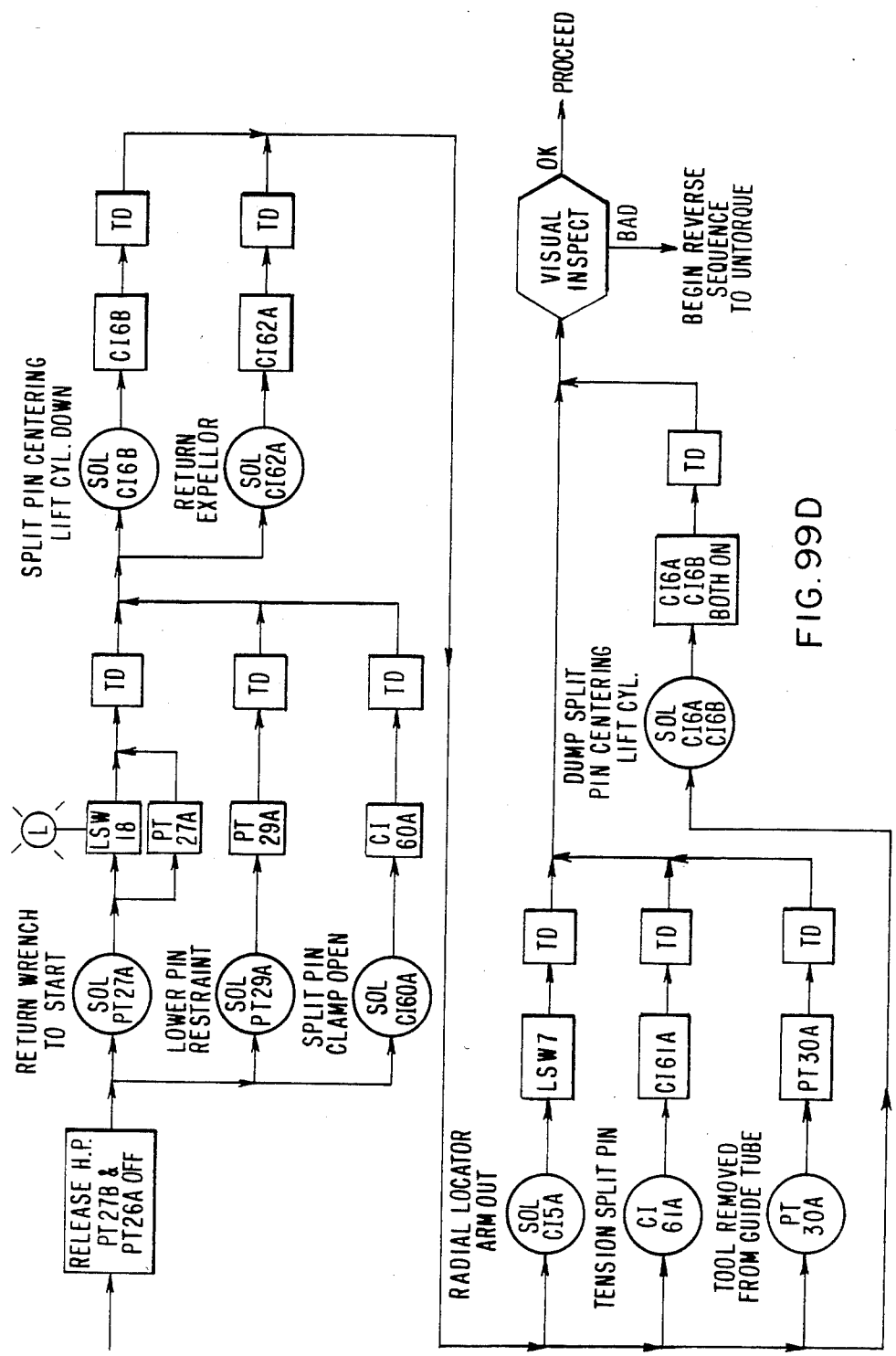
Figure 100:
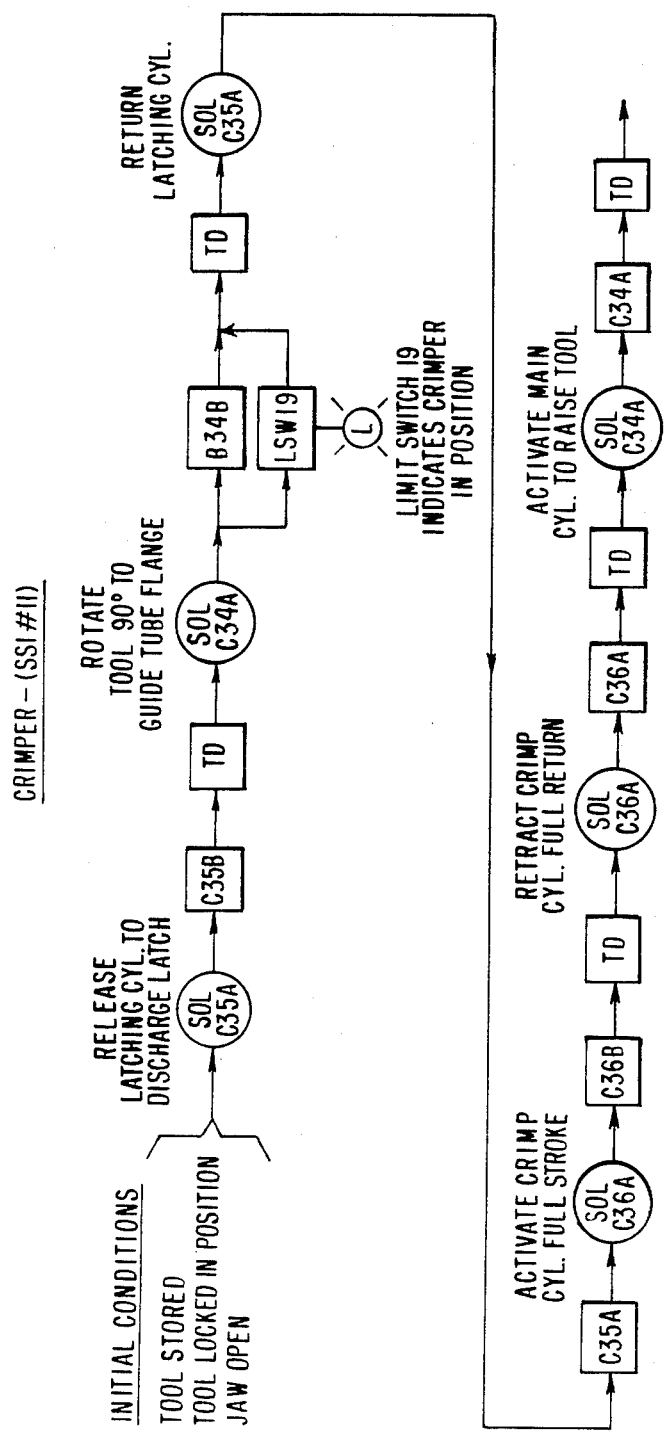
FIG. 100 is a block flow diagram showing the steps involved in the operation of the crimper tool.
Figure 101:
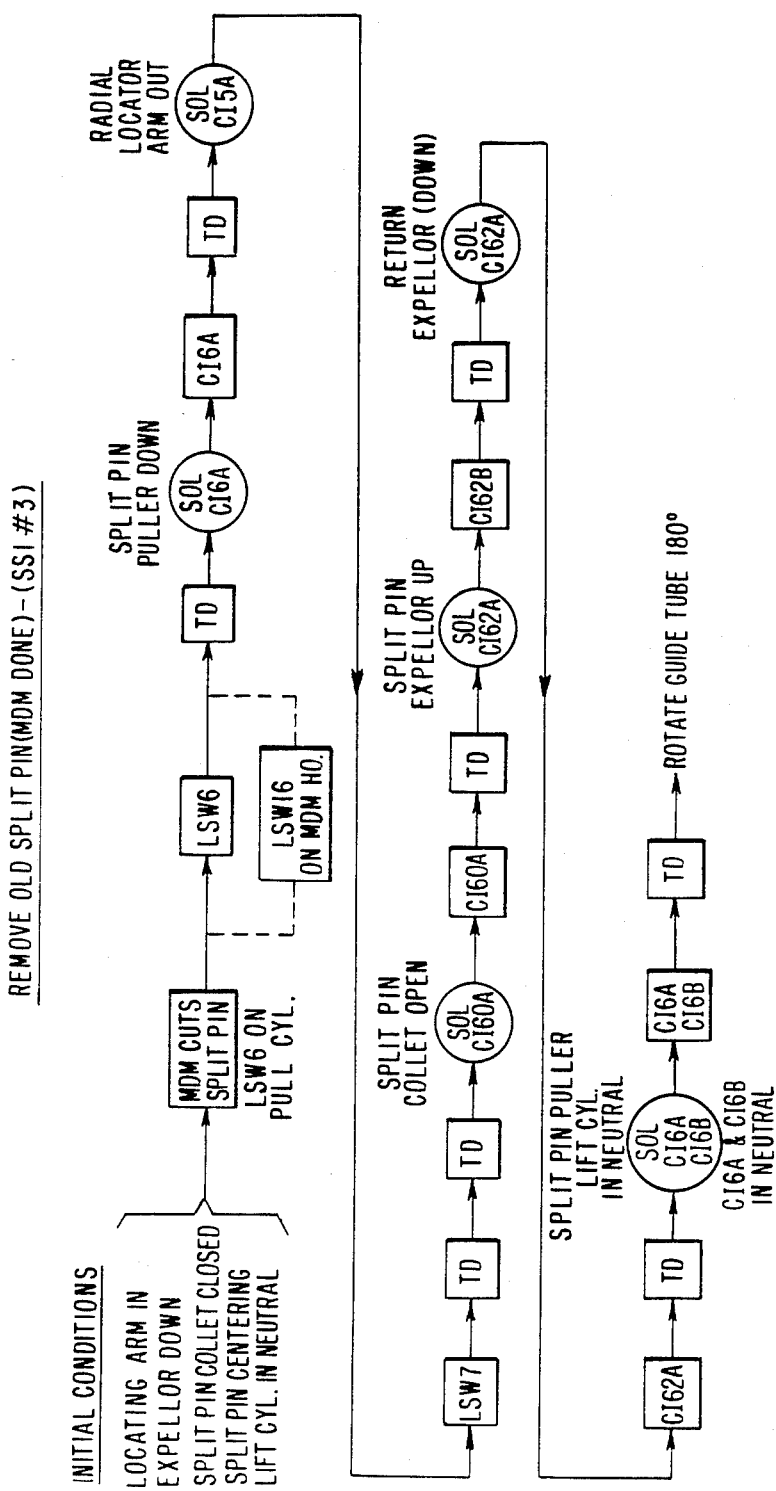
FIG. 101 is a block flow diagram showing the steps involved in the removal of the fragments of the second split pin.

Network 1115 is governed by switch L3SW17 or L4SW17 (FIG. 63) and by back pressure switch PT27B (FIG. 90). Solenoid PT27B is energized to apply the low torque to the wrench 797 (FIG. 63) and pressure switch PT27B is closed when the piston of cylinder 821 is stopped whether because the wrench reaches the end of its stroke or because the wrench is stalled. L3SW17 or L4SW17 are closed at the end of each full stroke of the wrench an in this case PT27B closes slightly after L3SW17. The occurrence of both events, i.e., switch PT27B is closed and L3SW17 or L4SW17 is energized on each stroke indicates that the wrench 797 is completing its strokes under low torque. Ultimately pressure switch PT27B is energized but L3SW17 or L4SW17 are not closed or closed before PT27B. This indicates that under low torque the wrench is unable to carry out its full stroke and is stalled. Light 1117 is turned on. Now the next decision network 1119 comes into play. The nut 163 and pin 127b are visually inspected. If nut 163 is seated, high torque is applied. If not, reverse torque is applied, the pin and nut are removed. The counterbores 147 and 149 are cleaned and the above process is repeated. Network 1121 is governed by pressure switch PT26A and switch L3SW17. The precisely determined high pressure is applied to wrench 797 by energizing solenoid PT26. PT26 (FIG. 99C) closes when the piston of cylinder 821 is stopped. The closing both of L3SW17 and PT26B indicates that the wrench has not stalled. Wrench 797 is moved through additional strokes until PT26B closes but L3SW17 or L4SW17 does not close later. Light 1123 is turned on to indicate high torque stall. If the nut 163 is properly threaded and secured to pin 127b, the crimping operation is enabled. The operation in decision network 1125 follows. The new split pin and new nut are visually inspected. If the cup 167 (FIG. 6) is not properly crimped to the pin 127b and recrimping is not feasible or practicable, reverse torque is applied, the split pin and nut are removed, the counterbores 147 and 149 are cleaned and the above torquing and crimping operations are repeated. If recrimping is feasible, the crimping operation is repeated. If the visual inspection shows that the crimping is satisfactory, the process proceeds to decision 1127. If the pin 127b is the second pin processed, the LGT 113 is unclamped and removed from the work station 181 (FIG. 9). If the second pin remains, the above process is repeated to remove the second pin. Since during the operation on the first pin the LGT was rotated 180° three times, it is not necessary to rotate the LGT for initial processing of the second pin.

The operation of each flow diagram 94A through 101 is described by a caption either above or below the diagram. Thus, FIGS. 94A and 94B are diagrams for orienting and clamping the LGT 113. In each diagram, each solenoid is represented by a circle bearing its identification. The identification includes letters such as CI (clamp index) or PP (pick and put) to describe the tool involved followed by a number and letter, such as 7A, which identify the specific solenoid involved. There are three-way solenoids identified by the same number but different letters, for example CI3A, CI3B (FIG. 94A). Two pressure switches are associated with each solenoid, one in the unenergized status and the other in the energized status of the solenoid. The former may be regarded as "back" contacts and latter as "front" contacts. When power is first impressed on the hydraulic solenoid unit but before fluid is conducted to the cylinders, all pressure switches, "front" and "back" are closed. The corresponding indicator lights on the operator's panel are turned on and the attendants can assure themselves that the hydraulic system is in proper operating condition. When hydraulic fluid is conducted into the cylinders, the "back" switches are closed and the "front" switches are open.

The pressure switches are represented, in FIGS. 94 through 101, as square blocks. Each block bears the identification of the corresponding solenoid except that for some switches the "back" switch identification is the same as for the solenoid and in the "front" switch identification the letter following the number is a "B" where the letter following the number for the corresponding solenoid is an "A" and an "A" where the letter following the number for the solenoid is a "B". Thus the "back" switch for solenoid CI61A is identified as CI61A (FIG. 94B) and the "front" switch is identified as CI61B (FIG. 94A). For some solenoids the nomenclature is reversed. The "back" switch of a solenoid labelled "A" is labelled "B" and the front switch is labelled "A". Time delay is identified by a square block labelled "TD".

With the above explanation and their labelling FIGS. 94A through 101 are largely self-explanatory. However, it will be instructive to trace this labelling for FIGS. 94A and 94B. Initially, the slide 275 (FIG. 13) is back with the rotating cylinder 285 in position #1. The LGT is in outer pins 265. The lift cylinder 311 is down. The locating arm 418 (FIG. 21) of the pin-puller and expeller 375 is "out", the expeller is down. The split pin collet 447 is open. The split pin centering lift cylinders 423 (FIG. 23) is down.

At the start, solenoid CI7A and solenoid CI61A are energized. CI7A opens the LGT clamp 381 (FIG. 22); CI61A returns the pin pull cylinder 425 (FIG. 23). Switch LSW8 and pressure switch CI61B are closed. After a time delay solenoid CI1A is energized and the rotary cylinder 285 (FIGS. 13, 17) moves slide 275 to position #2 (out) through linkage 279. Switches LSW1 and CI1B are closed. After a time delay solenoid CI3B is energized and lift cylinder 311 raises the LGT from the pins 265. Switch LSW1A is closed. Solenoid CI1A is deenergized returning cylinder slide 275 with the LGT to position #1 by reverse action of cylinder 285. Switch LSW2 is closed. After a time delay, solenoid CI3B is deenergized. The effect of this is to reduce the pressure in the lift cylinder so that the LGT settles on pins 267 under gravity. Switch LSW2A closes. When CI5A is energized the radial locator arm 418 (FIG. 21, Sheet 17) is moved "in" to position 428 where the pin puller-and-expeller 375 (FIG. 23) can process the split pin 127a. Switches LSW3 and CI5B close. After a time delay solenoids CI4A and CI3B are energized in a three-way fluid circuit applying low pressure to hold the LGT in a condition of levitation. The purpose of this step is to reduce the friction in centering the LGT when it is centered. Switch CI3B is closed. After a time delay solenoid CI7A is deenergized and solenoid CI62A is energized. The clamp 381 engages the flange 125 of the LGT. Switches LSW5 and CI7A are closed.

The clamp 381 clamps the LGT flange 125 against the members 380 and 409 positioning the flange to be centered by pin puller-and-expeller 375. By energizing solenoid CI62A expeller cylinder 437 is enabled raising the expeller. But cylinder 437 is at this time retracted because the piston of cylinder 423 is retracted. Pressure switch CI62B is closed. After a time delay solenoid CI7A is again energized and the LGT flange clamp 381 is opened permitting the LGT to center itself. Switch LSW8 (FIG. 31 Sheet 10) is closed. After another time delay solenoid CI6B is energized. The piston of cylinder 423 is raised raising cylinder 437. The expeller 441 (FIG. 23A, Sheet 17) is now in the uppermost position. If there is no old pin 127a in the flange 125, the expeller 441 centers the LGT. Switches L3SW4 and CI6A close. After a time delay solenoids CI3A and CI3B are reset so that lift cylinder 311 is in netural condition. Switch CI3B is open. After a time delay solenoid switch CI7A is deenergized and flange 125 is again clamped. Switches LSW5 and CI7A are closed. After a time delay three-way solenoids CI6A and CI6B are operated. CI6B is deenergized; also solenoids CI61A and CI62A are deenergized. The valve for cylinder 423 is in neutral. CI6A and CI6B are closed. When CI61A is deenergized tension is applied to the split pin by cylinder 425. When CI62A is deenergized the expeller 441 is retracted. The split pin 127a and its nut 145 are now set for severing. After a time delay, the MDM is brought into operation.

From the above description the flow charts shown in FIGS. 95 to 101 can be understood. To aid in the understanding of FIGS. 94A through 101, Table III below presents the relationship between the solenoids and the cylinders which they control. The respective functions performed are presented in FIGS. 87 through 92.

TABLE III

| Solenoids | Cylinder |
| --- | --- |
| CI7A | 389 (FIG. 22) |
| CI61A | 425 (FIG. 23) |
| CI1A | 285 (FIG. 16) |
| CI3B, CI3A, CI4A | 311 (FIG. 17) |
| CI5A | 415 (FIG. 23) |
| CI62A | 437 (FIG. 23) |
| CI8A | 317 (FIG. 18) |
| CI6A, CI6B | 423 (FIG. 23) |
| CI60A | 427 (FIG. 23) |
| PP22A | 545 (FIG. 49) |
| PP21A | 599 (FIG. 49) |
| PP20A | 579 (FIG. 49) |
| PP19A | 609 (FIG. 50) |
| B370A | 627 (FIG. 55) |
| B53A | Direction of Flow |
| B53B | Through Motor 675 (FIG. 57) |
| B38A | 697 (FIG. 57) |
| B40B | 639 (FIG. 58) |
| B40A | |
| PT25A | 891 (FIG. 62) |
| PT30A | 755 (FIG. 60) |
| PT24A | 785 (FIG. 62) |
| PT29A | 891 (FIG. 62) |
| PT27A | 821 (FIG. 63) |
| PT27B | Low Torque |
| PT26A | 821 (FIG. 63) High Torque |
| C35A | 979 (FIG. 71) |
| C34A | 951 (FIG. 71) |
| C36A | 1063 (FIG. 72) |

While preferred embodiments of this invention have been disclosed herein, many modifications thereof are feasible. This invention is not to be restricted except insofar as is necessitated by the spirit of the prior art.

What is claimed is:

1. Apparatus for replacing the old split-pin assemblies of a guide tube of a nuclear reactor by new split-pin assemblies, said guide tube and said old split-pin assemblies being radioactive, the said apparatus including a work station submerged in a pool of water, a plurality of tools in said work station, each tool for carrying out an operation in the replacement of said old split-pin assemblies, by new split-pin assemblies, the said tools carrying out their respective operations (each herein designated as a "main operation") in a predetermined sequence, the said apparatus also including a comand center external to said pool for controlling said tools remotely to enable each tool to carry out its main operation in its turn, each main operation of each tool including a plurality of sub-operations to be carried out in a predetermined sequence to complete a main operation of each tool, each said tool including:

(a) means for carrying out each of its sub-operations in its turn, and
   (b) means, responsive to the completion of each sub-operation, for conditioning the next sub-operation carrying-out means in the sequence to carry out automatically said next sub-operation; and the said apparatus also including means, connected to said conditioning means of each said next sub-operation and to said command center, for actuating said carrying out means to carry out said each next sub-operation automatically whereby said sub-operations following conditioning on the completion of a prior sub-operation in the sequence are carried out automatically each in its turn until the corresponding tool main operation is completed and each tool main operation is carried out each in its turn until the replacement of the old split-pin assemblies of said guide tube by new split-pin assemblies is completed.

2. The apparatus of claim 1 including manual means at the command center, connected to each tool, for conditioning the said tool to carry out its main operation on the completion of an operation of a preceding tool in the tool-operation sequence, and means, connected to said each tool, responsive to the initiation of its corresponding tool operation, for automatically enabling each sub-operation carrying-out means of said each tool, step by step, in the predetermined sub-operational sequence, to complete the tool main operation of said each tool.

3. The apparatus of claim 2 including additional manual means at the command center, connected to each tool, enabling manually the carrying out of each sub-operation carrying-out means for the main operation of said each tool, and means, at the command center, connected to the automatically carrying-out means and to the additional manual means, selectively operable, for disabling said automatically carrying-out means thereby to permit the carrying out of each said sub-operation manually by said additional manual means.

4. The apparatus of claim 1 wherein each tool includes parts which are moveable between a retracted position and an advanced position during at least certain of its sub-operation and also includes hydraulic means for moving said moveable parts as aforesaid, and also wherein the conditioning means for the sub-operation carrying-out means includes mechanically-or-magnetically operable switching means connected to a said part, and responsive to the movement of said part between a retracted position and an advanced position, for actuating the conditioning means, and the apparatus also includes pressure-actuable switching means, responsive to the operation of said hydraulic means for moving a part between a retracted position and an advanced position, for actuating the conditioning means, certain of said pressure-actuable switching means serving as redundant back-up for said mechanical-or-magnetically actuable switching means.

5. The apparatus of claim 4 wherein at least certain of the parts have mechanically-or-magnetically actuable switching means both at the retracted position and the advanced position, one of said switching means being closed and the other being opened when a said certain part is moved between an advanced position and a retracted position.

6. The apparatus of claim 4 wherein the hydraulic means actuating at least certain of said parts have pressure-actuable switch means at the retracted position and at the advanced position, one of said switch means being opened and the other being closed when said hydraulic means is actuated between its retracted position and its advanced position.

7. The apparatus of claim 1 including means, responsive to the completion of the last sub-operation of a sequence of sub-operations of a tool operation, for signalling to the command center the completion of said last sub-operation.

8. The apparatus of claim 1 wherein at least a first tool and a second tool perform main operations on a split-pin assembly in succession and said second tool requires that the guide tube whose old split-pin assemblies are being replaced be oriented differently for its operation than for the operation of said first tool, the said apparatus including means, for orienting said guide tube for main operation by said second tool, following the completion of the last processing sub-operation of the main operation of said first tool, the said orienting means including switch means connected to the command center for transmitting to said command center intelligence of the orientation of said orienting means.

9. Apparatus for replacing the old split-pin assemblies of a guide tube of a nuclear reactor by new split-pin assemblies, said guide tube and said old split-pin assemblies being radioactive, the said apparatus including a work station submerged in a pool of water, a plurality of tools in said work station, each tool for carrying out an operation in the replacement of said old split-pin assemblies, the said tools carrying out their respective operations in a predetermined sequence, the said apparatus also including a command center external to said pool for controlling said tools remotely to enable each tool to carry out its operation in its turn, at least a first tool and a second tool operating on the split-pin assemblies of said guide tube in succession, the operation of said second tool requiring that said guide tube be oriented differently than the operation of said first tool, the said apparatus including means, connected to said command center, and to be connected to said guide tube, responsive to commands from said command center for orienting said guide tube for operation by said second tool after the completion of the operation of said first tool, the said orienting means including switch means connected to said command center, for transmitting to said command center intelligence of the orientation of said orienting means.

10. The apparatus of claim 1 wherein sub-operation carrying-out means of at least certain tool operations is capable of operating in a sense such as to complete a tool operation (herein positive sense) and also of operating in the reverse sense (herein negative sense), so as to abort a tool operation and return said tool operation to a state which preceded a predetermined earlier sub-operation in the sequence, on the occurrence of a malfunction such as mechanical jamming or a hydraulic fault or the like, the said apparatus including means, operable at said command center, to be connected selectably to said sub-operation carrying-out means, for enabling a sequence of sub-operations in the negative sense.

11. The apparatus of claim 9 wherein the controlling means includes manual means at the command center actuable for enabling each sub-operational step in the negative sequence, each sub-operational step in the negative sequence being capable of being enabled only by actuation of said manual means.

12. The method of replacing the old split-pin assemblies of a guide tube of a nuclear reactor by new split-pin assemblies, said old split-pin assemblies and said guide tube being radioactive, the said method being practiced with apparatus including a work station submerged in a pool of water, a plurality of tools in said work station, each tool for carrying out an operation (herein a main operation) in the replacement of said old split-pin assemblies, each tool main operation being composed of a plurality of sub-operations, the said method comprising mounting a guide tube in said work station in position to be processed by said tools, manually actuating said tools in a predetermined sequence to process said guide tube to replace said old split-pin assemblies, by new split-pin assemblies, each said tool automatically carrying out its sub-operation in a predetermined sequence in a positive sense on manual actuation of its main operation, on the occurrence of a maloperation such as mechanical jamming or a hydraulic fault or the like during a sub-operation of a tool main operation, manually reversing the sequence of sub-operations so that they take place in a negative sense and revert the tool operation to a state preceding the sub-operation in the sequence in which said maloperation occurred, correcting the maloperation, and on correction of said maloperation, enabling said last-named tool to carry out its sub-operations in a positive sense to complete its main operation and subsequent tools in the tool-operation sequence to carry out their respective sub-operations in a positive sense to complete their main operations and thereby to complete the replacement of said old split-pin assemblies by new split-pin assemblies.

13. The apparatus of claim 1 wherein the conditioning means includes sensor means which is actuated on the completion of a sub-operation, the said apparatus including manually actuable for by-passing said sensor means on the failure undesirably of said sensor means to be actuated on the completion of a sub-operation.

14. The apparatus of claim 1 including manual means for selecting certain of the tool operations and rejecting others.

15. The method of replacing the old split-pin assemblies of a guide tube of a nuclear reactor by new split-pin assemblies, said guide tube having at least a first split-pin assembly and a second split-pin assembly, said assemblies being spaced from each other by a predetermined angle around the periphery of said guide tube, said guide tube being defined as in a first position when said first assembly is set for the start of a processing operation and in a second position when, after displacement of said guide tube, said second assembly is set for a processing operation, said guide tube and said old split-pin assemblies being radioactive, the said method being practiced with apparatus including a work station submerged in a pool of water, a plurality of tools in said work station, said tools being actuable in a predetermined sequence for carrying out a replacement of an old split-in assembly by a new split-pin assembly and each tool being actuable for carrying out an operation in said replacement in its turn in the sequence, and a command center for commanding the operation of said tools, certain of said tools being positioned to process each in its turn in the sequence, a first or second split-pin assembly being processed as the case may be with said guide tube in said first position and certain other of said tools being positioned to process each in its turn in the sequence and a first or second assembly being processed as the case may be with said guide tube in said second position; the said method comprising positioning said guide tube in said first position for replacement of said first old split-pin assembly with said tools, transmitting intelligence to said command center that said guide tube is in said first position, actuating said tools each in its turn in a series of steps to remove said first old split-pin assembly and replace it by a new split-pin assembly, during said removal and replacement displacing said guide tube by commands from said command center through said predetermined angle from said first position to said second position, a predetermined number of times, on each displacement transmitting intelligence to said command center that said guide tube is in said second position, the said number of predetermined times being such that said guide tube is in said second position when the removal and replacement of said first old split-pin assembly by a new split-pin assembly is completed, whereby said second split-pin assembly is in position for the start of the removal and replacement and said first and second split-pin assemblies are removed and replaced by a single plurality of tools.

16. Apparatus for replacing the old split-pin assemblies of a guide tube of a nuclear reactor by new split-pin assemblies, said guide tube including at least a first old split-pin assembly and a second old split-pin assembly spaced from said first split-pin assembly by a predetermined angle, said guide tube and said old split-pin assemblies being radioactive, the said apparatus including a work station submerged in a pool of water, a plurality of tools in said work station, said tools being actuable in a sequence in the replacement of an old split-pin assembly by a new split-pin assembly and each tool being actuable for carrying out an operation in said replacement in its turn in said sequence, a command center for commanding the operation of said tools, certain of said tools being positioned to perform their functions in the replacement of an old split-pin assembly by a new split-pin assembly with said guide tube in a first position and certain others of said tools being positioned to perform their functions in the replacement of an old split-pin assembly by a new split-pin assembly with said guide tube in a second position displaced from said first position by said angle, the replacement of one of the split-pin assemblies being started with the guide tube in said first position and once started being carried out completely for said one split-pin assembly, means, connected to said command center and to said tools, responsive to a command of said command center, for positioning said guide tube in said work station in said first position with said first old split-pin assembly in position to be processed by said tools, and means, connected to said command center and to said certain of said tools for actuating said certain of said tools to process said first split-pin assembly with said guide tube in said first position, means, connected to said command center and to said other of said tools, for actuating said other of said tools to process said first split-pin assembly with said guide tube in said second position, and means, connected to said command center, and to said tools for displacing said guide tube back and forth between said first and second position to complete the replacement of said first old split-pin assembly by a new split-pin assembly once the processing of said first old split-pin assembly has started.

17. Apparatus for replacing the old split-pin assemblies of a guide tube of a nuclear reactor by new split-pin assemblies, said guide tube having a first old split-pin assembly and a second old split-pin assembly spaced by a predetermined angle from said first assembly, said guide tube and said old split-pin assemblies being radioactive; the said apparatus including a work station submerged in a pool of water, a plurality of tools positioned in different regions of said work station, each tool for carrying out an operation in the replacement of said old split-pin assemblies by new split-pin assemblies, the said tools to carry out their respective operations in a predetermined sequence, a command center connected to said tools for commanding said tools to carrying out their respective operations each in its turn in the sequence, means, to be connected to said guide tube, for mounting said guide tube rotatably in said work station, and means, connected to said mounting means, and responsive to commands from said command center, for rotating said guide tube back and forth through said angle between a first position in which a said split-pin assembly is processed by certain of said tools and a second position in which said last-named split-pin assembly is processed by certain others of said tools.

18. The method of replacing the old split-pin assemblies of a guide tube of a nuclear reactor by new split-pin assemblies, said guide tube having a first old split-pin assembly and a second old split-pin assembly spaced from said first assembly by a predetermined angle, said guide tubes and said old split-pin assemblies being radioactive, the said method being practiced with apparatus including a work station submerged in a pool of water, a plurality of tools positioned in different regions of said work station, each tool for carrying out an operation in the replacement of said old split-pin assemblies, the said tools to carry out their respective operations in a predetermined sequence, the said apparatus also including a command center for commanding the operation of said tools, the said method comprising mounting said guide tube rotatably in said work station and responsive to respective commands from said command center actuating each tool in its turn in the sequence to perform its operation, the said method being characterized by rotation of said guide tube by commands from said command center back and forth through said angle between a first position in which certain of said tools perform their respective functions in the replacement of an old split-pin assembly by a new split-pin assembly and a second position in which certain others of said tools perform their function of replacing said last-named old split-pin assembly by a said last-named new split-pin assembly.

19. Apparatus for replacing the old split-pin assemblies of a guide tube of a nuclear reactor by new split-pin assemblies, each said split-pin assembly being secured in counterbores of the flange of said guide tube, said guide tube and said old split-pin assemblies being radioactive; the said apparatus including a work station submerged in a pool of water, the said work station having a plurality of tools including: a clamp-and-index tool to position an old split-pin assembly for processing, a metal-disintegration-machining tool for severing said old split-pin assembly into readily removable fragments, a brush tool for cleaning the counterbores after the fragments of a said old split-pin assembly are removed, a nut hopper for supplying new nuts for a new split-pin assembly, a pick-and-put tool for removing fragments of an old split-pin assembly from said guide tube and depositing new nuts in the flange of said guide tube, a pin-insertion/torque tool for inserting a new pin in said new nut in the guide tube and for torquing said last-named new nut on the new pin to form a new split-pin assembly and a crimping tool for crimping a locking cap on the new nut of said last-named new split-pin assembly, and apparatus also including a command center in a region which is substantially free of radioactivity, a connection between said command center and each of said tools for initiating a main operation of said each tool, each said tools including means, to be actuated following the initiation of a main operation, for automatically carrying out a plurality of sub-operations in a predetermined sequence to complete the associated main operation of said each tool, and switch means connected to each of said tools and to said command center and position on said each of said tools to transmit to said command center the status of said each of said tools while said each of said tools is carrying out its sub-operation.

20. Apparatus for replacing the old split-pin assemblies of a guide tube of a nuclear reactor by new split-pin assemblies, said guide tube and said old split-pin assemblies being radioactive, the said apparatus including a work station submerged in a pool of water, a plurality of tools in said work station, each tool for carrying out an operation in the replacement of said old split-pin assemblies by new split-pin assemblies, the said tools including a clamp-and-index tool, said clamp-and-index tool including means for clamping a guide tube for processing and also including means, connected to said clamping means, for positioning said clamping means in a first state in clamping relationship with said guide tube and in a second state in non-clamping relationship with said guide tube and sensing means, connected to said positioning means, for sensing that said clamping means is in each of said states, said clamp-and-index tool also including means for displacing said guide tube so that it is accessible for processing by the different tools of said plurality of tools, and said apparatus also including a command center connected to said tools and to said sensing means and responsive to said sensing means for controlling the operation of said tools.

* * * * *